US012241302B2

(12) United States Patent
Stuart

(10) Patent No.: US 12,241,302 B2
(45) Date of Patent: Mar. 4, 2025

(54) HINGE

(71) Applicant: Polaris IP Pty Ltd, New South Wales (AU)

(72) Inventor: Michael Christopher Stuart, New South Wales (AU)

(73) Assignee: Polaris IP Pty Ltd (AU)

( * ) Notice: Subject to any disclaimer, the term of this patent is extended or adjusted under 35 U.S.C. 154(b) by 0 days.

(21) Appl. No.: 18/031,989

(22) PCT Filed: Sep. 14, 2021

(86) PCT No.: PCT/AU2021/051056
§ 371 (c)(1),
(2) Date: Apr. 14, 2023

(87) PCT Pub. No.: WO2022/077048
PCT Pub. Date: Apr. 21, 2022

(65) Prior Publication Data

US 2023/0399884 A1 Dec. 14, 2023

(30) Foreign Application Priority Data

Oct. 15, 2020 (AU) ................................ 2020903744
Aug. 25, 2021 (AU) ................................ 2021221705

(51) Int. Cl.
*E05F 3/00* (2006.01)
*E05D 5/02* (2006.01)
(Continued)

(52) U.S. Cl.
CPC .............. *E05F 3/20* (2013.01); *E05D 5/0246* (2013.01); *E05F 1/1207* (2013.01); *E05F 5/02* (2013.01);
(Continued)

(58) Field of Classification Search
CPC ....... E05D 3/02; E05D 5/0246; E05D 5/0253; E05D 5/0261; E05D 5/0269; E05D 11/00;
(Continued)

(56) References Cited

U.S. PATENT DOCUMENTS 4,073,038 A * 2/1978 Curry .................... E05F 1/1215
16/50
9,353,565 B2 * 5/2016 Bacchetti ................ E05F 3/104
(Continued)

FOREIGN PATENT DOCUMENTS

CN 203296552 U 11/2013
CN 105909106 A 8/2016
(Continued)

OTHER PUBLICATIONS

International Search Report and Written Opinion; International Application No. PCT/AU2021/051056; Nov. 9, 2021.
(Continued)

*Primary Examiner* — Chuck Y Mah
(74) *Attorney, Agent, or Firm* — Farber LLC

(57) ABSTRACT

Provided is a hinge that includes a first leaf assembly including a first front leaf component coupled to a first rear leaf component for accommodating therebetween a portion of a panel having a first pair of holes. A first pair of fasteners may extend between the first front and rear leaf components and through the pair of holes in the panel to clamp the portion of the panel to the first leaf assembly. A second leaf assembly, hingedly coupled to the first leaf assembly about a hinge axis, may include a second front leaf component coupled to a second rear leaf component for accommodating therebetween a portion of a second panel having a second pair of holes. A second pair of fasteners may extend between the second front and rear leaf components and through the pair of holes in the second panel to clamp the portion of the
(Continued)

second panel to the second leaf assembly. A spring may be coupled to the first and second leaf assemblies to bias the first and second leaf assemblies to move from an open position to a closed position. A dampener having a longitudinal axis may slow movement of the first and second leaf assemblies to the closed position, wherein the longitudinal axis of the dampener is located between the hinge axis and the first panel.

20 Claims, 32 Drawing Sheets

(51) Int. Cl.
*E05F 1/12* (2006.01)
*E05F 3/20* (2006.01)
*E05F 5/02* (2006.01)
*E05D 3/02* (2006.01)

(52) U.S. Cl.
CPC .................. *E05D 2003/027* (2013.01); *E05D 2005/0269* (2013.01); *E05Y 2201/264* (2013.01); *E05Y 2201/41* (2013.01); *E05Y 2201/499* (2024.05); *E05Y 2900/114* (2013.01); *E05Y 2900/132* (2013.01)

(58) Field of Classification Search
CPC ...... E05D 2003/027; E05D 2005/0253; E05D 2005/0269; E05D 2005/0263; E05D 2005/0261; E05D 2201/21; E05D 2201/264; E05D 2201/41; E05D 2201/46; E05D 2201/492; E05D 7/081; E05D 7/08; E05D 5/04; E05Y 2900/132; E05Y 2900/148; E05Y 2900/114; E05Y 2600/502; E05Y 2600/60; E05Y 2201/499; E05Y 2201/264; E05Y 2201/41; E05F 1/1215; E05F 1/12; E05F 1/1207; E05F 3/04; E05F 3/20; E05F 3/18; E05F 5/02; E05F 11/385; E05F 5/06; E06B 3/54; A47K 3/362; A47K 2003/367; A47F 3/12; A47F 3/125
See application file for complete search history.

(56) References Cited

U.S. PATENT DOCUMENTS

2003/0051313 A1* 3/2003 Wu ........................ E05F 1/1215 16/298
2004/0034964 A1 2/2004 Loggen et al.
2010/0071160 A1 3/2010 Chang
2011/0239406 A1* 10/2011 Macernis .............. E05F 1/1215 16/354
2014/0068893 A1 3/2014 Hung
2016/0060932 A1* 3/2016 Stuart ........................ E05F 5/02 16/297
2016/0153224 A1* 6/2016 Salice ........................ E05D 3/16 16/65
2017/0022743 A1* 1/2017 Timothy ............... E05D 7/0009
2019/0048634 A1* 2/2019 Sevastopoulos .......... E05F 5/02
2022/0081948 A1* 3/2022 Xue ........................... E05F 3/04
2022/0186539 A1* 6/2022 Xue ........................... E05F 3/20
2022/0235594 A1* 7/2022 Laws ....................... E05D 11/08
2023/0193679 A1* 6/2023 Murauer ................... E05F 3/20 16/54

FOREIGN PATENT DOCUMENTS

CN 108756552 A 11/2018
CN 108868412 A 11/2018
CN 110259302 A 9/2019
DE 202009004855 A1 10/2010
KR 101403917 B1 * 6/2014
WO 2016124919 A1 8/2016
WO 2017139844 A1 8/2017

OTHER PUBLICATIONS

YouTube Video; Polaris Soft Close Hinge; Sep. 15, 2020: https://www.youtube.com/watch?v=JGiT7ypV100.
Extended European Search Report; EP Application No. 21878773.7; Sep. 10, 2024.

* cited by examiner

HINGE

CROSS-REFERENCE TO RELATED APPLICATIONS

This application is a national stage application, filed under 35 U.S.C. § 371, of International Patent Application No. PCT/AU2021/051056 filed on Sep. 14, 2021, which claims the benefit of Australian Provisional Patent Application No. 2020903744, filed Oct. 15, 2020, and Australian Standard patent application No. 2021221705, filed Aug. 25, 2021, the entire disclosures of which are incorporated herein by reference for all purposes.

TECHNICAL FIELD

The present invention relates to a hinge.

BACKGROUND

The Applicant developed a soft close hinge which is disclosed in PCT/AU2017/050133. The hinge was biased from an open position to a closed position using a torsional spring. The hinge included one or more dampeners which were located within an insert to slow the movement of the hinge toward the closed position. The insert was located within a special hole cut into the panel which the hinge was to be fixed thereto. The hinge was particularly advantageous for glass panels, such as pool gates and shower doors, wherein a specialised "mouse ear" profiled hole is provided in an edge of the panel which the insert would be located within. The dampener was effectively located between the faces of the glass panel within the insert, thereby reducing the overall packing size of the hinge. Furthermore, the dampening force was coplanar to the glass meaning that vibrational forces could be reduced when the hinge closed, thereby extending the life of the hinge.

Whilst the hinge disclosed in PCT/AU2017/050133 has been successful in the market, as mentioned above, this type of hinge generally requires the panel to have the specialised "mouse ear" profiled hole provided in the edge of the panel. In a number of instances where non-dampened hinges have been installed, these types of hinges are generally secured to the panel via a pair of holes which allow for a pair of bolts to pass therethrough to clamp the panel. It is not easily possible to replace such a non-dampened hinge with the hinge disclosed in PCT/AU2017/050133 because there is no "mouse-ear" profiled hole to receive the insert. Thus, either the panel needs to be cut with the specialised "mouse ear" profiled hole or a new panel needs to be installed. Both options are less than desirable.

SUMMARY

It is an object of the present invention to meet this need or to substantially overcome, or at least ameliorate, one or more disadvantages of existing arrangements.

In one aspect, there is provided a hinge comprising: a first leaf assembly including a first front leaf component coupled to a first rear leaf component for accommodating therebetween a portion of a first panel having a first pair of holes, wherein a first pair of fasteners extend between the first front and rear leaf components and through the pair of holes in the first panel to clamp the portion of the first panel to the first leaf assembly; a second leaf assembly, hingedly coupled to the first leaf assembly about a hinge axis, comprising a second front leaf component coupled to second rear leaf component for accommodating therebetween a portion of a second panel having a second pair of holes, wherein a second pair of fasteners extend between the second front and rear leaf components and through the pair of holes in the second panel to clamp the portion of the second panel to the second leaf assembly; a spring coupled to the first and second leaf assemblies to bias the first and second leaf assemblies to move from an open position to a closed position; and a dampener having a longitudinal axis, to slow movement of the first and second leaf assemblies to the closed position, wherein the longitudinal axis of the dampener is located between the hinge axis and the first panel.

In certain embodiments, the longitudinal axis of the dampener is substantially equidistantly located between the hinge axis and the first panel.

In certain embodiments, the hinge further includes a dampener assembly having a dampener housing with a cavity for housing at least a portion of the dampener.

In certain embodiments, the dampener has a substantially cylindrical body have a protrusion extending orthogonally therefrom relative to the longitudinal axis of the dampener, wherein at least a portion of the cavity resiliently deforms to receive the protrusion of the dampener within the cavity to at least partially house the dampener.

In certain embodiments, the one or more cavity walls include a pair of curved walls, wherein edges of the walls are define a gap varying in width along a longitudinal axis of the cavity, wherein the protrusion has a width that is greater that a narrowed section of the gap, wherein a sufficient force applied to the dampener causes the walls to deform in order for at least a portion of the dampener to be housed and retained within the cavity.

In certain embodiments, the gap includes a first section adjacent to the narrowed section which the protrusion is able to be received therein when progressively being inserted into the cavity, and a second section opposingly adjacent to the narrowed section which the protrusion is able to be received therein after the sufficient force is applied to the dampener to cause the resilient deformation of the walls.

In certain embodiments, the protrusion is tapered and elongated along a longitudinal axis of the dampener.

In certain embodiments, the dampener housing has an upper and lower support surface which are receivable between upper and lower ribs extending from an inner surface of the first front leaf component.

In certain embodiments, the upper and lower ribs have a threaded stem which threadably engage the first set of fasteners, wherein the upper and lower support surfaces of the dampener housing include a recess to tight fittingly accommodate a portion of the respective threaded stems.

In certain embodiments, the dampener housing has a pair of arms extending from a housing body, the pair of arms including a pair of holes for receiving therethrough the first set of fasteners.

In certain embodiments, the dampener includes a plurality of pairs of holes, wherein during installation of the hinge the first set of fasteners are selectively threaded through one of the pairs of holes which align with the pair of holes in the portion of the first panel.

In certain embodiments, the first and second leaf assemblies include a plurality of knuckles defining a barrel housing the spring, wherein a longitudinal axis of the spring being coaxial with the hinge axis, wherein the hinge further includes: a barrel cap having an inner and outer neck, wherein the outer neck has a first engaging surface, the barrel cap being received within one end of the barrel; and a spring tensioning component located within a void defined by the inner neck, the spring tensioning component being coupled to a first end of the spring, the spring tensioning component having a second engaging surface which engages with the first engaging surface to restrict rotational movement of the spring tensioning component relative to the barrel cap whilst under bias of the spring; wherein a sufficient rotational force applied to the spring tensioning component causes the rotational movement of the spring tensioning component relative to the barrel cap to increase the tension of the spring.

In certain embodiments, the first and second engaging surfaces have corresponding sawtooth profiles.

In certain embodiments, the spring includes a diametrically extending tail defining a first and second cavity with at least some of the coils of the spring, wherein the spring tensioning component includes a pair of protrusions which are received within the respective first and second cavities to enable rotational force applied to the spring tensioning component to be transferred to the spring to adjust the tension of the spring.

In certain embodiments, the spring includes a further diametrically extending tail receivable within an aperture located in a wall of the first front leaf component, the wall having protrusions extending therefrom which are receivable within cavities defined by at least some of the coils of the spring and the further diametrically extending tail to couple the spring to the first front leaf component.

In certain embodiments, the hinge further includes a striking component which is secured to an inner surface of the second front hinge component, wherein the striking component includes a striking surface which is adjacent to the dampener assembly in the closed position, wherein striking component is located between the hinge axis and the second panel.

In certain embodiments, the striking component has an upper and lower support surface which are received between upper and lower ribs extending from an inner surface of the second front leaf component.

In certain embodiments, the upper and lower ribs have a threaded stem which are configured to threadably engage with the second set of fasteners, wherein the upper and lower support surfaces of the dampener housing include a recess to tight fittingly accommodate a portion of the respective threaded stems.

In certain embodiments, each of the first and second rear leaf components include a plurality of pairs of holes to enable different spaced holes in the first and second panels to be secured to the hinge, wherein each unused hole of the first and second rear leaf components are covered with a hole cap.

In certain embodiments, each hole cap includes a planar circular body, wherein a plurality of resilient legs extending from the planar circular body and are configured to resiliently couple within the respective unused hole.

In another aspect, there is provided a hinge comprising: a first leaf assembly including a first front leaf component coupled to a first rear leaf component for accommodating therebetween a portion of a first panel having a first pair of holes, wherein a first pair of fasteners extend between the first front and rear leaf components and through the pair of holes in the first panel to clamp the portion of the first panel to the first leaf assembly; a second leaf assembly, hingedly coupled to the first leaf assembly about a hinge axis, the second leaf assembly including a mounting component to mount the second leaf assembly to a mounting structure; a spring coupled to the first and second leaf assemblies to bias the first and second leaf assemblies to move from an open position to a closed position; and a dampener having a longitudinal axis, to slow movement of the first and second leaf assemblies to the closed position, wherein the longitudinal axis of the dampener is located between the hinge axis and the first panel.

In certain embodiments, the longitudinal axis of the dampener is substantially equidistantly located between the hinge axis and the first panel.

In certain embodiments, the hinge further includes a dampener assembly having a dampener housing with a cavity for housing at least a portion of the dampener.

In certain embodiments, the dampener has a substantially cylindrical body have a protrusion extending orthogonally therefrom relative to the longitudinal axis of the dampener, wherein at least a portion of the cavity resiliently deforms to receive the protrusion of the dampener within the cavity to at least partially house the dampener.

In certain embodiments, the one or more cavity walls include a pair of curved walls, wherein edges of the walls are define a gap varying in width along a longitudinal axis of the cavity, wherein the protrusion has a width that is greater than a narrowed section of the gap, wherein a sufficient force applied to the dampener causes the walls to deform in order for at least a portion of the dampener to be housed and retained within the cavity.

In certain embodiments, the gap includes a first section adjacent to the narrowed section which the protrusion is able to be received therein when progressively being inserted into the cavity, and a second section opposingly adjacent to the narrowed section which the protrusion is able to be received therein after the sufficient force is applied to the dampener to cause the resilient deformation of the walls, the first and second sections being wider than the narrowed section of the gap.

In certain embodiments, the protrusion is tapered and elongated along a longitudinal axis of the dampener.

In certain embodiments, the dampener housing has an upper and lower support surface which are receivable between upper and lower ribs extending from an inner surface of the front leaf component.

In certain embodiments, the upper and lower ribs have a threaded stem which threadably engage the first set of fasteners, wherein the upper and lower support surfaces of the dampener housing include a recess to tight fittingly accommodate a portion of the respective threaded stems.

In certain embodiments, the dampener housing has a pair of arms extending from a housing body, the pair of arms including a pair of holes for receiving therethrough the first set of fasteners.

In certain embodiments, the dampener includes a plurality of pairs of holes, wherein during installation of the hinge the first set of fasteners are selectively threaded through one of the pairs of holes which align with the pair of holes in the portion of the first panel.

In certain embodiments, the first and second leaf assemblies include a plurality of knuckles defining a barrel housing the spring, wherein a longitudinal axis of the spring being coaxial with the hinge axis, wherein the hinge further includes: a barrel cap having an inner and outer neck, wherein the outer neck has a first engaging surface, the barrel cap being received within one end of the barrel; and a spring tensioning component located within a void defined by the inner neck, the spring tensioning component being coupled to a first end of the spring, the spring tensioning component having a second engaging surface which engages with the first engaging surface to restrict rotational movement of the spring tensioning component relative to the barrel cap whilst under bias of the spring; wherein a sufficient rotational force applied to the spring tensioning component causes the rotational movement of the spring tensioning component relative to the barrel cap to increase the tension of the spring.

In certain embodiments, the first and second engaging surfaces have corresponding sawtooth profiles.

In certain embodiments, the spring includes a diametrically extending tail defining a first and second cavity with at least some of the coils of the spring, wherein the spring tensioning component includes a pair of protrusions which are received within the respective first and second cavities to enable rotational force applied to the spring tensioning component to be transferred to the spring to adjust the tension of the spring.

In certain embodiments, the spring includes a further diametrically extending tail receivable within an aperture located in a wall of the first front leaf component, the wall having protrusions extending therefrom which are receivable within cavities defined by at least some of the coils of the spring and the further diametrically extending tail to couple the spring to the first front leaf component.

In certain embodiments, the rear leaf component includes a plurality of pairs of holes to enable different spaced holes in the panels to be secured to the hinge, wherein each unused hole of the rear leaf component is covered with a hole cap.

In certain embodiments, each hole cap includes a planar circular body, wherein a plurality of resilient legs extending from the planar circular body and are configured to resiliently couple within the respective unused hole.

In certain embodiments, the mounting component is a bracket.

In certain embodiments, the bracket has a planar profile to enable mounting the hinge to a planar mounting structure.

In certain embodiments, the bracket has a curved profile to enable mounting the hinge to a curved mounting structure.

In a further aspect, there is provided a method for retrofittable installation of a hinge configured according to the first aspect, wherein the method includes: decoupling another hinge coupled to the first and second panel; locating the first front leaf component and first rear leaf component on opposing sides of the first panel and coupling the first and front leaf components together to clamp about the portion of the first panel by locating the fasteners to extend through the holes of the first panel; and locating the second front leaf component and second rear leaf component on opposing sides of the second panel and coupling the second front and read leaf components together to clamp about the portion of the second panel by locating the second set of fasteners to extend through the holes of the second panel.

In a further aspect there is provided a method for retrofittable installation of a hinge configured according to the second aspect, wherein the method includes: decoupling another hinge coupled to the panel; mounting the second hinge leaf assembly via the mounting component to a mounting structure; and locating the first front leaf component and first rear leaf component on opposing sides of the panel and coupling the first and front leaf components together to clamp about the portion of the first panel by locating the fasteners to extend through the holes of the panel.

Other aspects and embodiments will be appreciated throughout the detailed description of one or more preferred embodiments.

BRIEF DESCRIPTION OF THE DRAWINGS

Example embodiments should become apparent from the following description, which is given by way of example only, of at least one preferred but non-limiting embodiment, described in connection with the accompanying figures.

FIG. 48 is a rear perspective view of a first portion of the second hinge leaf of FIG. 48.

DETAILED DESCRIPTION OF THE EMBODIMENTS

Figure 1:
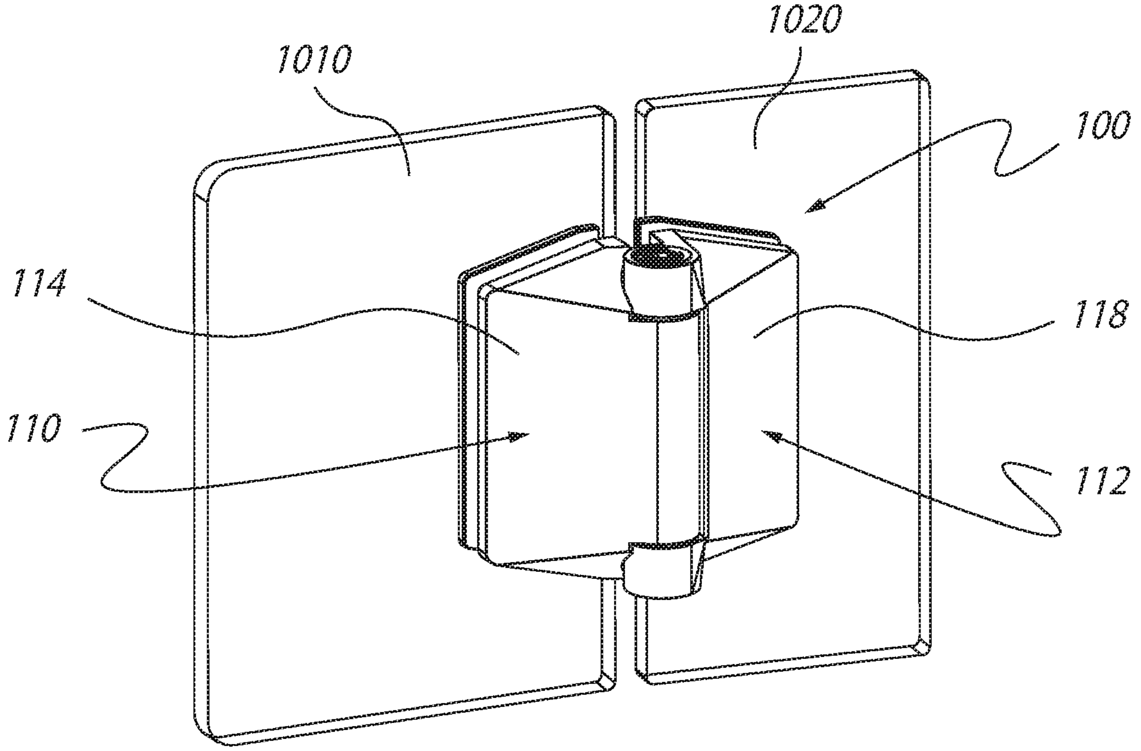
FIG. 1 is a front perspective view of an example of a hinge coupled to a pair of panels.

The following modes, given by way of example only, are described in order to provide a more precise understanding of the subject matter of a preferred embodiment or embodiments. In the figures, incorporated to illustrate features of an example embodiments, like reference numerals are used to identify like parts throughout the figures.

Figure 2:
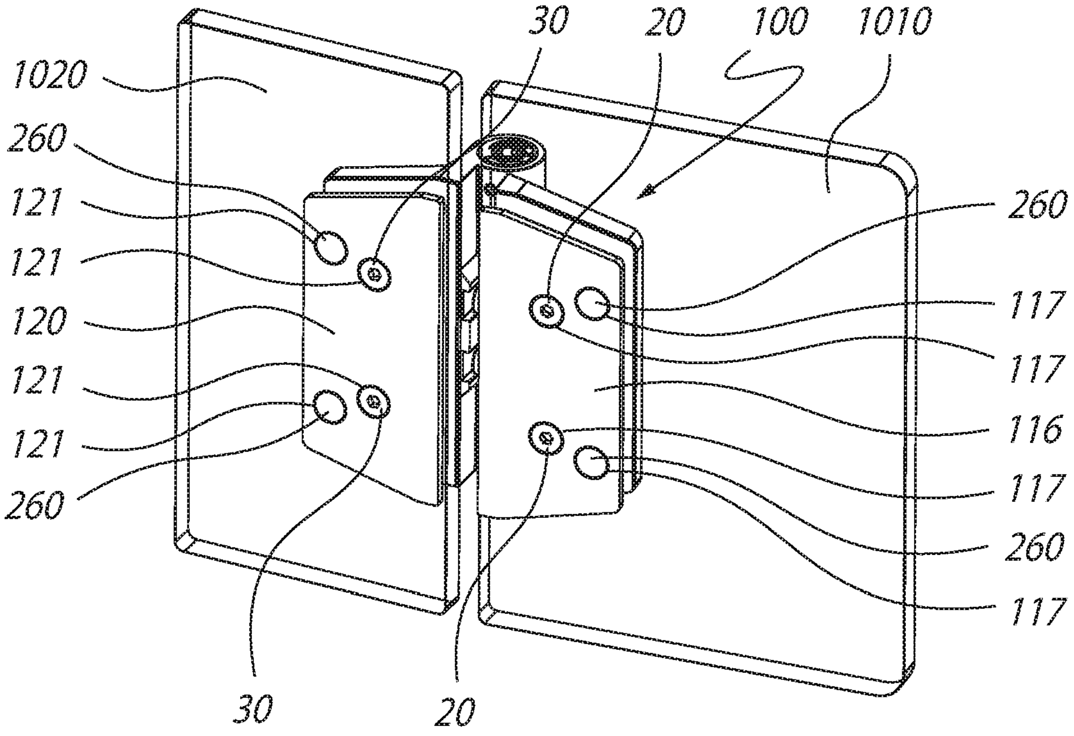
FIG. 2 is a rear perspective view of the hinge of FIG. 1.
Figure 3:
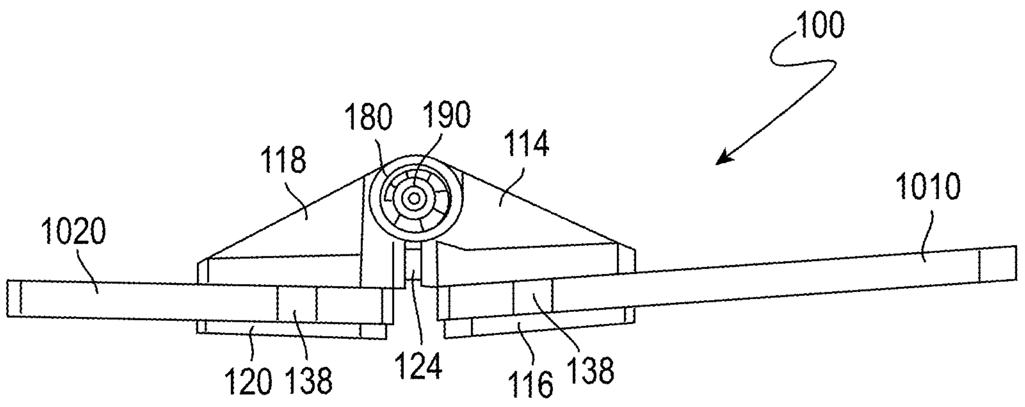
FIG. 3 is a top perspective view of the hinge of FIG. 1.
Figure 4:
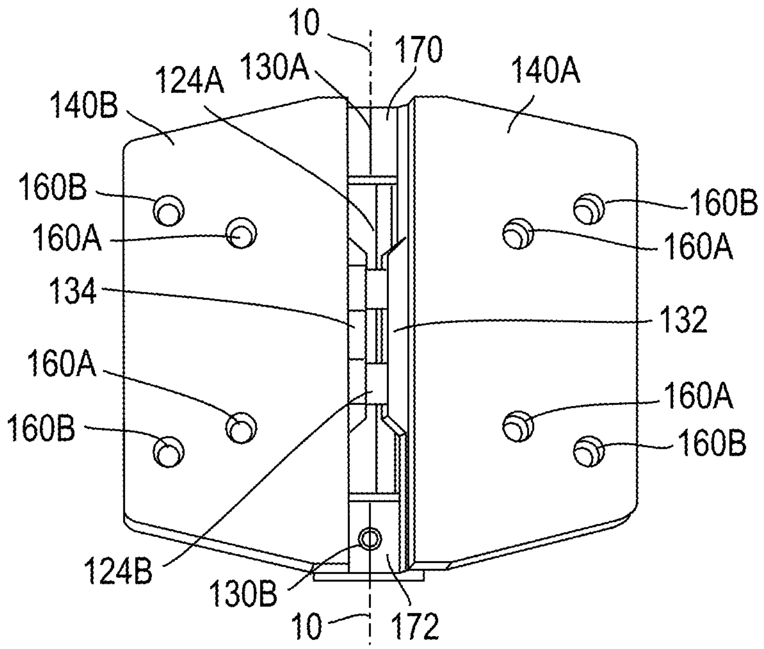
FIG. 4 is a rear view of the hinge of FIG. 3 with the rear hinge components removed.

Referring to FIGS. 1 and 2 there is shown an example of a hinge 100. The hinge includes a first leaf assembly 110 hingedly coupled to a second leaf assembly 112 about a hinge axis 10 (see FIG. 4). As shown in FIGS. 3 and 4, the hinge 100 further includes one or more dampeners 124A, 124B. As discussed below, the hinge can operate with a single dampener, thus the reference number 124 will be used to refer to a single dampener but similarly applies to a multi-dampener arrangement 124A, 124B. As shown in FIGS. 9 to 13, the hinge 100 also includes a spring 174.

Referring to FIG. 3, the first leaf assembly 110 includes a first front leaf component 114 coupled to a first rear leaf component 116 for accommodating therebetween a portion of a first panel 1010 having a first pair of holes 1015A extending orthogonally through and between opposing faces of the panel 1010 relative to the plane of the panel 1010. A first pair of fasteners 20 extend between the first front and rear leaf components 114, 116 and through the pair of holes 1015A in the first panel 1010 to clamp the portion of the first panel 1010 to the first leaf assembly 110.

The second leaf assembly 112 comprises a second front leaf component 118 coupled to second rear leaf component 120 for accommodating therebetween a portion of a second panel 1020 having a second pair of holes 1025A extending orthogonally through and between opposing faces of the panel 1020 relative to the plane of the panel 1020. A second pair of fasteners 30 extend between the second front and rear leaf components 118, 120 and through the pair of holes 1025A in the second panel 1020 to clamp the portion of the second panel 1020 to the second leaf assembly 112.

Referring to FIGS. 9 to 13, the spring 174 is operatively coupled to the first and second leaf assemblies 110, 112 to bias the first and second leaf assemblies 110, 112 to move from an open position to a closed position. The hinge 100 is shown approaching the closed position in FIG. 3. In the closed position, the first and second panels 1010, 1020 are substantially aligned and coplanar with each other. The spring 174 is preferably a torsional spring.

Figure 6:
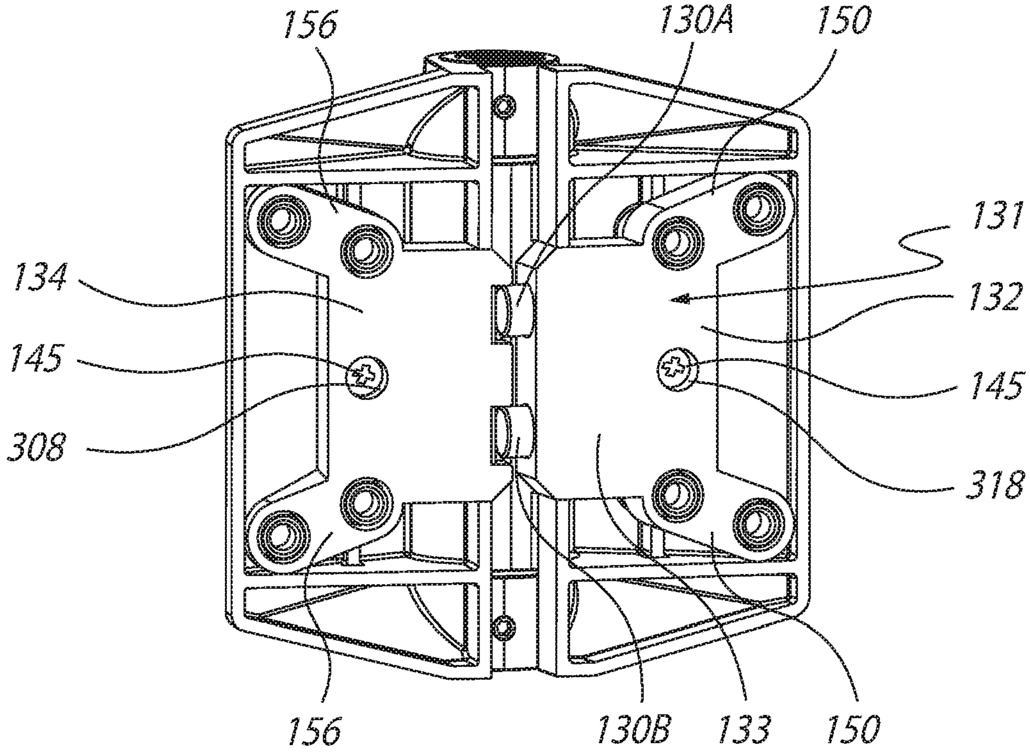
FIG. 6 is a rear view of the hinge of FIG. 5 with the front gaskets further removed.
Figure 7:
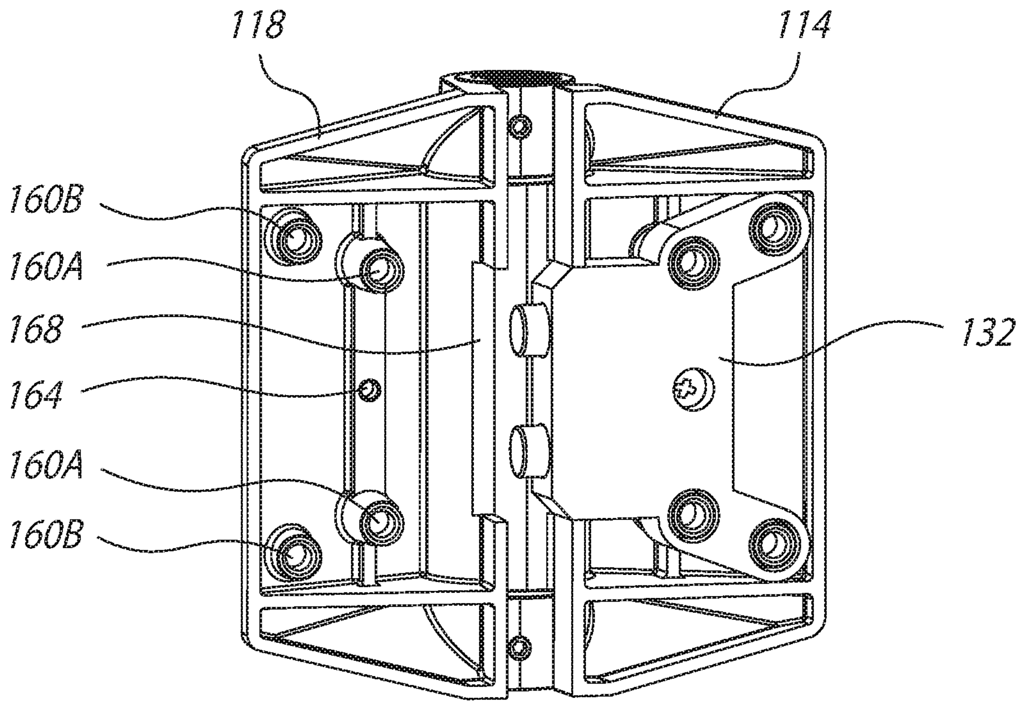
FIG. 7 is a rear view of the hinge of FIG. 6 with the striking component further removed.

As shown in FIGS. 6 and 7, the dampener 124 is configured to slow movement of the first and second leaf assemblies 110, 112 to the closed position which is under bias to move toward the closed position by the spring 174. In one form, a portion of the second hinge assembly 112 contacts the dampener 124 in an extended position when approaching the closed position, wherein the dampener 174 slowly moves to a retracted position whilst absorbing some of the momentum and force of the hinge 100 approaching the closed position. In one specific example, the longitudinal axis of the dampener 124 extends orthogonal to the hinge axis 10. In this arrangement, at least a portion of the dampener 124 protrudes outwardly from a dampener housing 132 of the first hinge assembly 110 when the hinge 100 is located in the non-closed position. When the hinge 100 approaches the closed position, the extended portion of the dampener 124 comes into contact with the portion of the second hinge assembly 112 and slowly retracts within the dampener housing 132.

Figure 21:
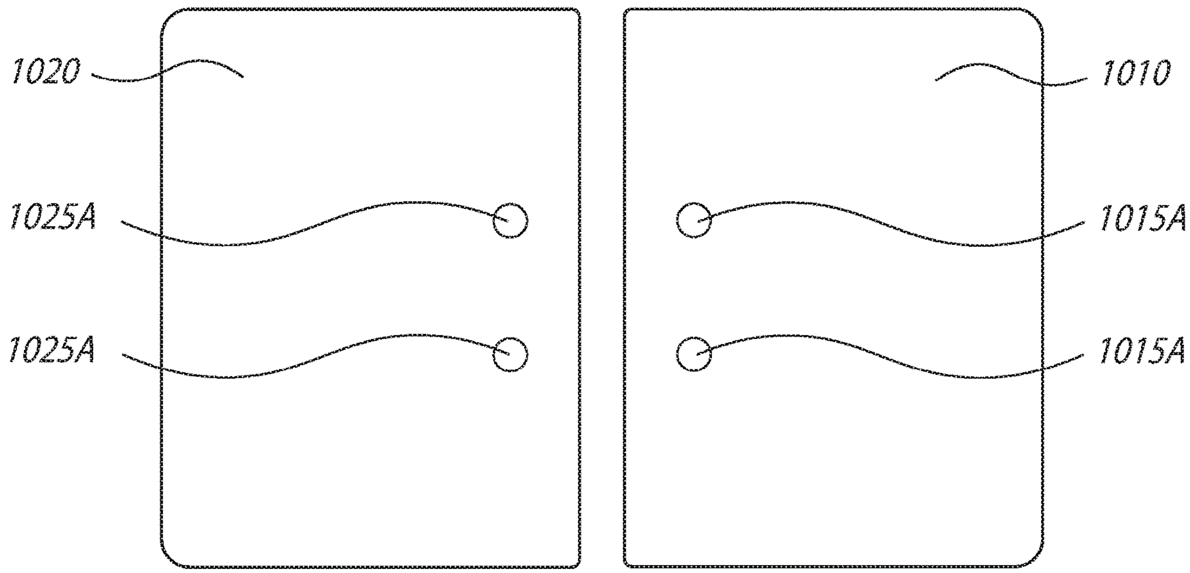
FIG. 21 is a pair of glass panels, each panel including a pair of holes for securing the hinge of FIG. 1 thereto.

Advantageously, the longitudinal axis of the one or more dampeners 124 are located between the hinge axis 10 and the first panel 1010. In a preferable form, the longitudinal axis of the dampener 124 is substantially equidistantly located between the hinge axis 10 and the first panel 1010. This arrangement means that unlike the soft close hinge disclosed in PCT/AU2017/050133 where the dampener is located coplanar with the panel, the dampener in the current hinge 100 is located behind the panel 1010 and between the hinge axis 10 and the face of the panel 1010. As such, the hinge exemplified in FIG. 1 can be installed to panels which have one or more pairs of spaced mounting holes (see FIG. 21) without the need to either replace the panel or to arrange for a "mouse ear" profiled hole to be cut into the edge of the panel. This arrangement is particularly useful for retrofittable installation of the hinge 100 of FIG. 1 to hinged panels. For example, a common problem faced is a regular hinge (i.e. non-dampened) may need to be replaced with a soft close hinge to reduce mechanical wear and tear. Generally, such hinges are relatively cheap items which are generally installed using cheap installation methods and components which generally rely upon the use of panels which include a pair of spaced holes drilled through each panel. The hinge 100 of FIG. 1 can be used to replace the existing non-dampened hinge in order to provide soft close functionality.

Figure 8:
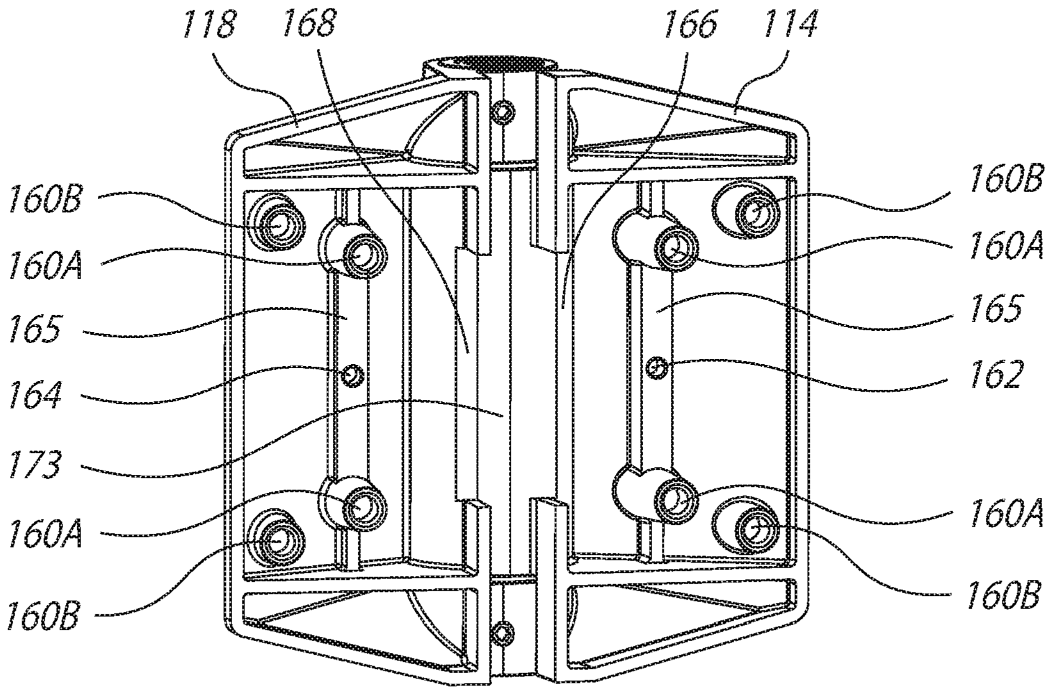
FIG. 8 is a rear view of the hinge of FIG. 7 with the dampener assembly further removed.

As shown in FIGS. 6 and 7, the dampener 124 is part of a dampener assembly 131 including a dampener housing 132 having a cavity 320 for housing at least a portion of the dampener 124. The hinge 100 may include a plurality of dampeners 124A, 124B which are at least partially housed within a plurality of respective cavities 320. However, it will be appreciated that depending upon the amount of bias provided by the spring 174, a single dampener 124 may be sufficient, in which case the dampener assembly 131 may be selectively installed to include a single dampener 124. The dampener housing 132 is secured to an inner surface of the first front leaf component 114 as shown in FIGS. 6 and 7. In particular, a screw 145 fastens the dampening assembly 131 to a threaded hole 144 provided on the inner surface of the first front hinge component 114. The threaded hole 144 is provided on a ridge 165 of the inner surface as shown in FIG. 8.

Referring to FIGS. 32 to 37, the dampener housing 132 has a pair of holes 310A which align with the pair of holes 1015A in the first panel 1010. The first pair of fasteners 20 provided in the form of a pair of threaded bolts are received through the aligned pair of holes 310A in the dampener housing 132 when passing through the holes 1015A of the portion of the first panel 1010. As shown in FIG. 8, the first front leaf component 114 includes a pair of threaded stems 160A extending from the inner surface of the first front leaf component 114 which align and are located within the pair of holes 310A in the dampener housing 132, wherein the pair of fasteners threadably fasten with the threaded stems 160A to clamp the portion of the first panel 1010 between the first front leaf component 114 and the first rear leaf component 116. A portion of dampener housing 132 protrudes out of a side surface of the front leaf component 114 via gap 166 located adjacent to the hinge axis 10.

Figure 5:
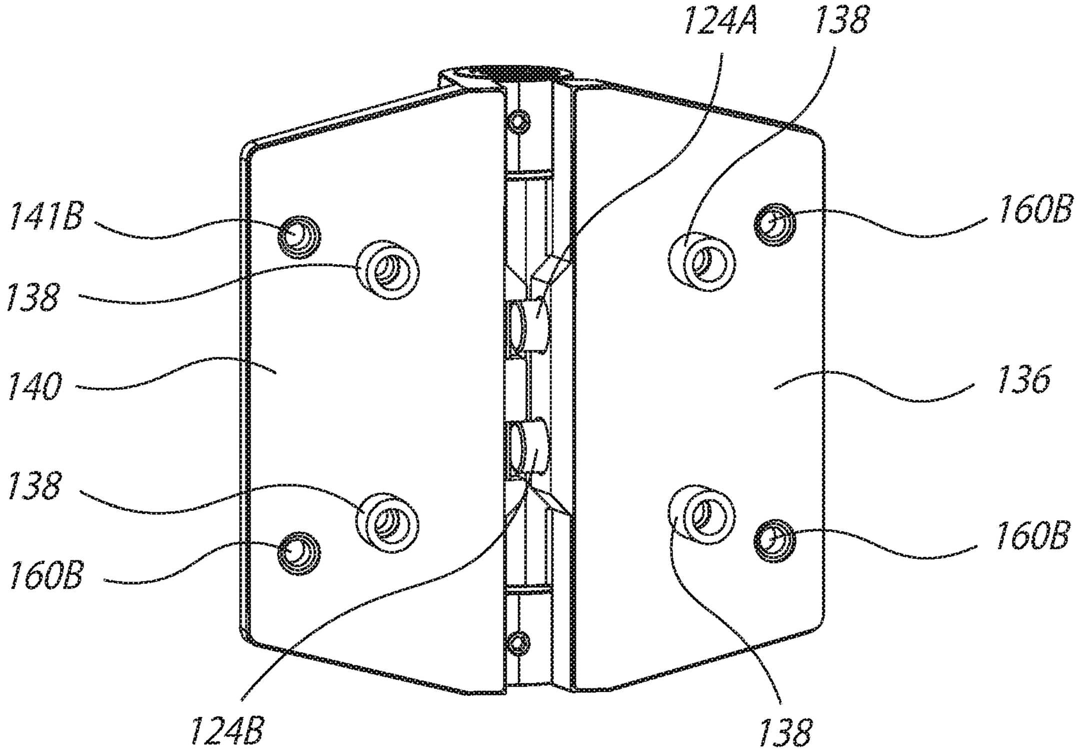
FIG. 5 is a rear view of the hinge of FIG. 4 with the rear gaskets further removed.
Figure 27:
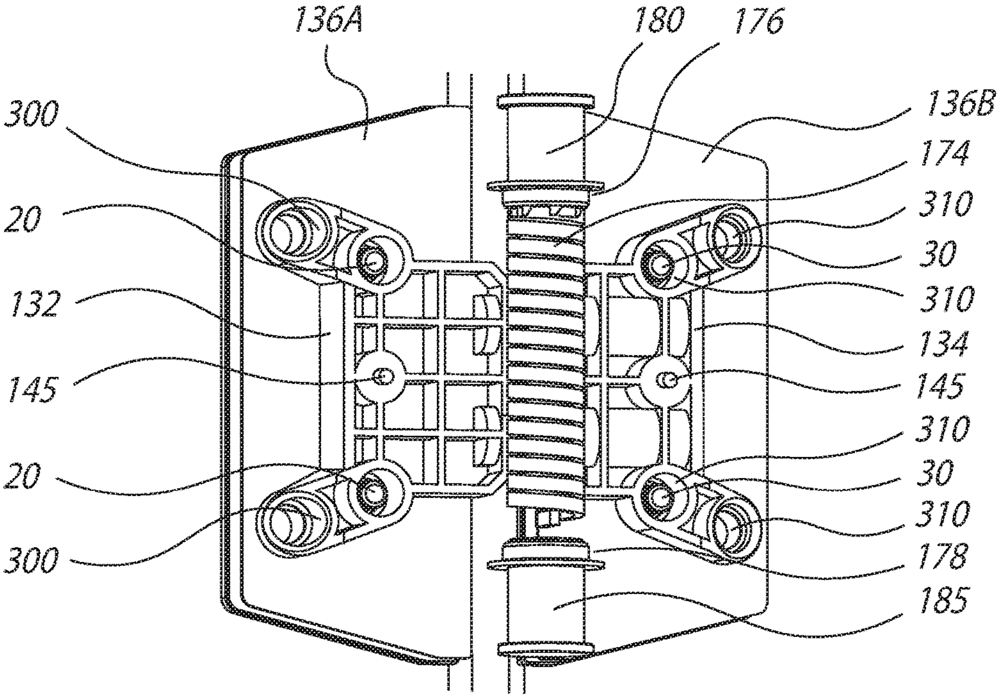
FIG. 27 is a front perspective view of the hinge of FIG. 1 with the first and second front hinge members removed.
Figure 28:
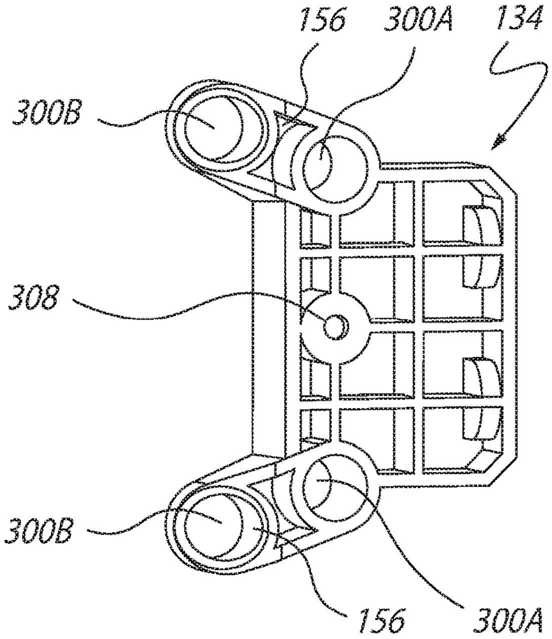
FIG. 28 is a front perspective view of the striking component of the hinge of FIG. 1.
Figure 29:
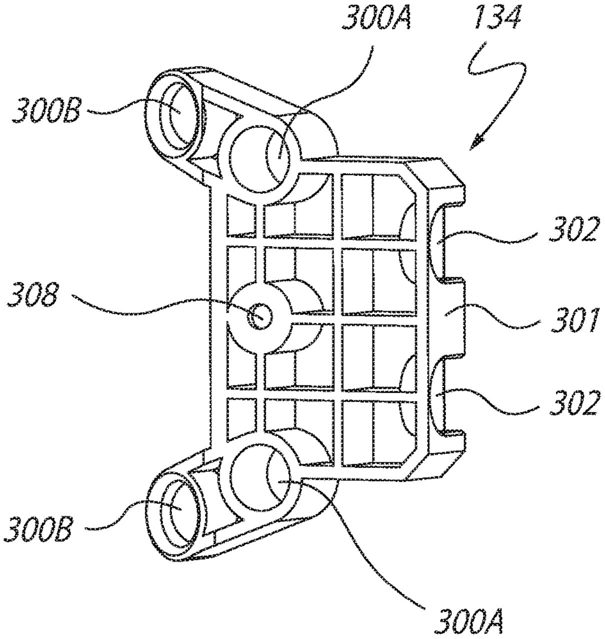
FIG. 29 is another front perspective view of the striking component of FIG. 28.
Figure 30:
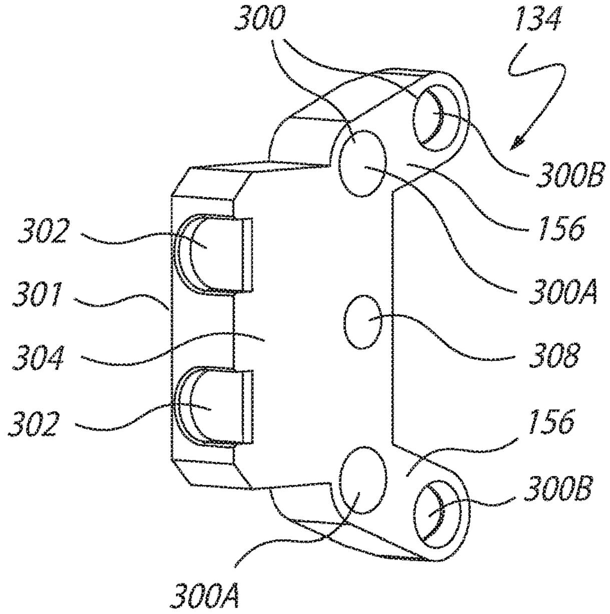
FIG. 30 is a rear perspective view of the striking component of FIG. 28.
Figure 31:
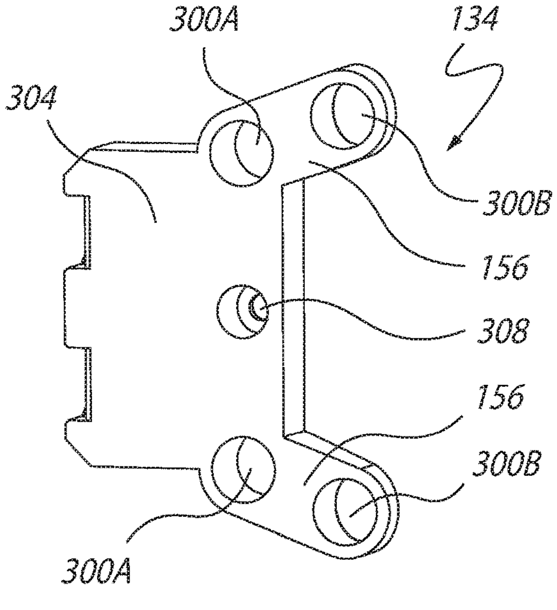
FIG. 31 is another rear perspective view of the striking component of FIG. 28.
Figure 32:
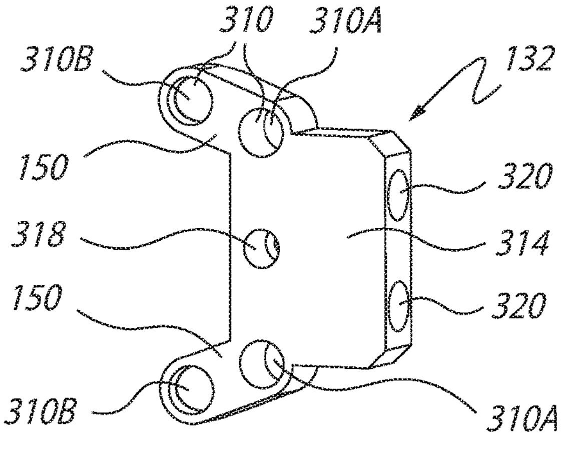
FIG. 32 is a rear perspective view of the dampener housing of the hinge of FIG. 1.
Figure 33:
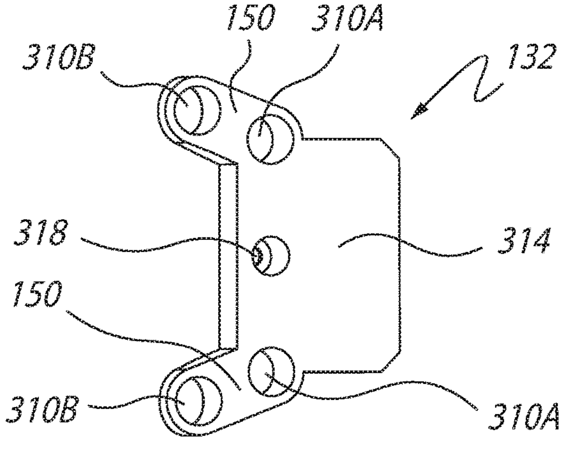
FIG. 33 is a further rear perspective view of the dampener housing of FIG. 32.

As shown in FIGS. 6, 7, 8, 32 and 33, the dampener housing 132 has a planar rear surface 314 which sits flush against the planar surface of the first panel 1010. The planar rear surface 314 of the dampener housing 132 directly clamps against a front gasket 136A, as shown in FIGS. 5 and 27, which in turn is clamped directly against the face of the first panel 1010. The front gasket 136A can be provided in the form of a soft material such as rubber, silicone, or the like which protects the panel 1010 from contacting harder surfaces of the hinge 100 which can be made from steel, particularly in applications where the panel 1010 is made of glass. The front gasket 136A includes a plurality of holes 137A for allowing the respective threaded bolts 20 to pass therethrough to clamp the front and rear leaf components 114, 116 together with the portion of the panels 1010 clamped therebetween under compression. The front gasket 136A can include a cylindrical sheath 138 extending from and surrounding the hole 137A (see FIG. 5) which protects the panel 1010 from the stems 160A and bolts 20.

Referring to FIGS. 6, 7 and 32 to 37, the dampener housing 132 has a pair of arms 150 extending from a housing body 133. The pair of arms 150 extend acutely relative to the hinge axis in a general diagonal direction away from the housing body 133. The pair of arms 150 include the pair of holes 310A of the dampener housing 132 for receiving the threaded stems 160A on the inner surface of the first front leaf component 114 and the threaded bolts 20 therein or therethrough. Whilst each arm 150 can include a single hole 310A, in a preferable configuration shown in FIGS. 6, 7 and 32 to 37, each arm 150 can include a plurality of holes 310A, 310B to allow selective use of appropriate hole spacing depending upon the spacing of existing holes drilled in the first panel 1010. In particular a first hole 310A is provided at a first end of the arm that is proximally connected to the housing body 133, and a second hole 310B is provided at a second end of the arm 150 that is located distal to the housing body 133. The first holes 310A of the arms 150 are spaced closer to the hinge axis 10 compared to the second holes 310B. Furthermore, the first holes 310A are located closer to each other along the hinge axis 10 compared to the spacing between the second holes 310B along the hinge axis 10 to thereby accommodate common spacing between holes provided in predrilled panels. This configuration thereby provides a universal retrofittable hinge 100 which can be selectively installed for various hole spacings in panels 1010, 1020. Corresponding holes 117, 121 are provided in the first and second rear leaf components 116, 120 wherein only one of the holes 171, 121 need be selected for installing the hinge 100.

Figure 25:
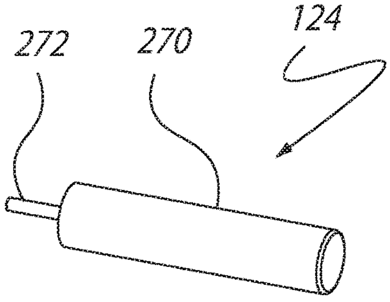
FIG. 25 is a perspective view of a dampener of the hinge of FIG. 1.
Figure 26:
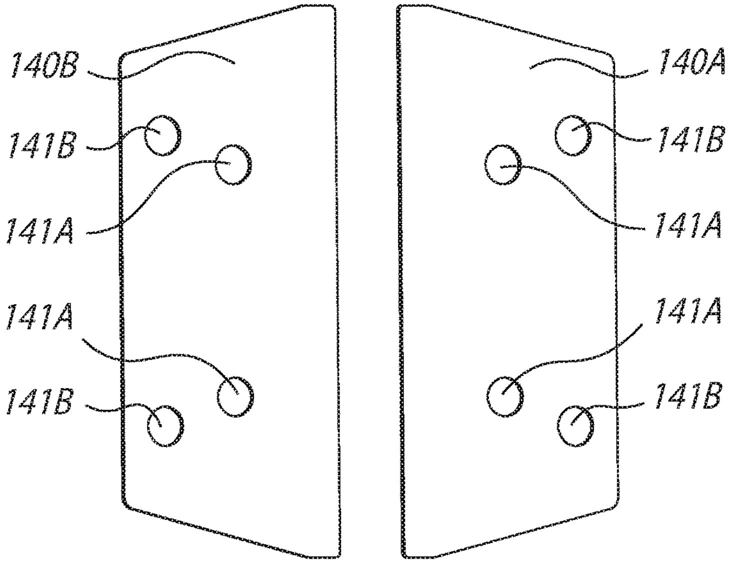
FIG. 26 is a front view of a pair of rear gaskets of the hinge of FIG. 1.
Figure 34:
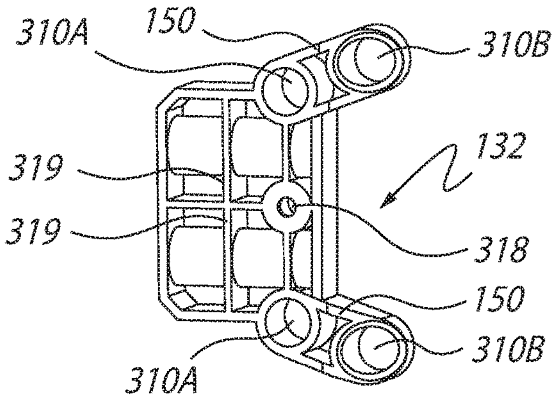
FIG. 34 is a front perspective view of the dampener housing of FIG. 32.
Figure 35:
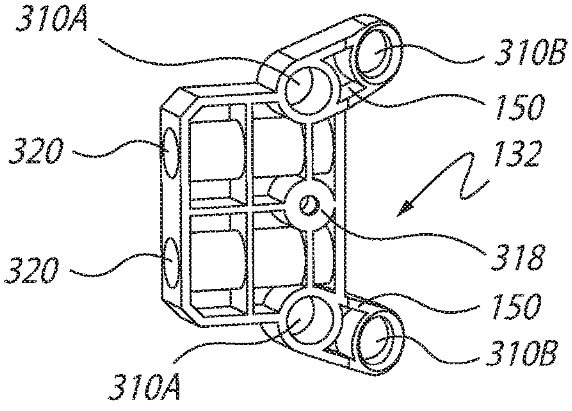
FIG. 35 is a further front perspective view of the dampener housing of FIG. 32.
Figure 36:
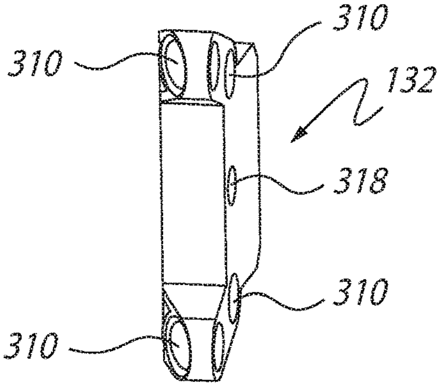
FIG. 36 is a first side perspective view of the dampener housing of FIG. 32.
Figure 37:
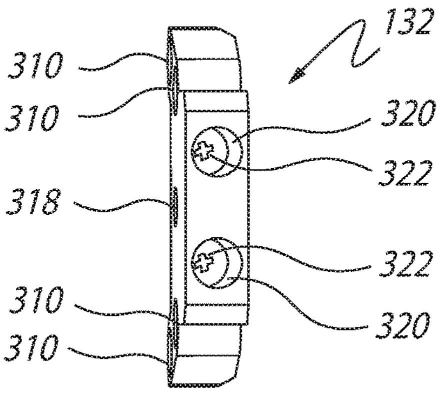
FIG. 37 is a second side perspective view of the dampener housing of FIG. 32.

As shown in FIGS. 34 and 35, the dampener housing 132 can include one or more cavities 320 for accommodating the one or more dampeners 124. Each cavity 320 includes a longitudinal axis which extends orthogonal to the hinge axis 10 as shown in FIGS. 6 and 7. Each cavity 320 is generally cylindrical in cross-section for accommodating a generally cylindrical body 170 of the dampener 124 as shown in FIG. 25. Each dampener 124 includes a first dampener portion 172 provided in the form of a pin which extends and retracts within a second portion 170 of the dampener 124 provided in the form of the dampener body or cylinder. Each dampener 124 is generally provided in the form of a hydraulic dampener, wherein the dampener body 170 contains a hydraulic fluid which is used to provide the dampening functionality. The dampener body 170 contains a spring or biasing mechanism and operatively coupled to the first dampener portion to bias the first dampener portion to extend from the second dampener portion. As shown in FIG. 7, a portion of the dampener body 170 extends from the cavity 320 when the hinge 100 is moved from the open position to the closed position. When the hinge 100 moves toward the closed position, the end of the dampener body 170 comes into contact with the second hinge assembly 112 causing at least a portion of the dampener body 170 to retract within the cavity 320 as the dampener pin 272 is received within the dampener body 170 under bias of the spring 174. As shown in FIG. 37, the end wall of each cavity 320 includes a small hole 322 to receive and resiliently retain the tip of the dampener pin 272 and thus the dampener 124. In one form, the small hole 322 can be provided in the form of a pair of orthogonal slits having a generally cross profile provided in the end wall of the cavity 320, wherein the tip of the pin 272 is resiliently received in the centre of the cross-shaped hole 322. When the hinge 100 moves from the closed position to the open position, a portion of the dampener 124 extends and protrudes outwardly from the dampener housing 132. As shown in the figures, a majority of the dampener body 170 of a respective dampener 124 is housed within the respective cavity 150 in the closed position, and upon moving the hinge to an open position, a majority of the dampener body 170 is located outside the respective cavity 150. When the hinge 100 is moved to an open position under an external force (i.e. a user opens a hinge gate which includes the hinge 100), a portion of the dampener body 170 extends from the cavity 320 under the bias of a spring contained within the dampener body 170.

As shown in FIGS. 34 and 35, the front surface of the dampener housing 132 has a plurality of ribs 319 which extend parallel and orthogonal to the hinge axis 10. A junction between orthogonal ribs 319 provides a screw hole 318 which travels from the front to rear surfaces of the dampener housing 132 to allow a threaded screw 145 to extend therethrough to releasably secure the dampening assembly 131 to the inner surface of the first front hinge component 114 via threaded hole 144. The front surface of the dampener housing 132 also includes an outer wall of the cavity 320 at least partially housing the dampener 124.

Referring to FIGS. 6, 7, 27 to 31, the hinge 100 further includes a striking component 134 which is secured to an inner surface of the second front hinge component 118 via a screw 145 which is located within hole 308 and threadably fastens with a threaded hole 164. The striking component 134 is located between the hinge axis 10 and second panel 1020. The striking component 134 includes a striking surface 301 which is located in an adjacent and opposing relationship to the protruding dampener ends of the dampener assembly 131 in the closed position. The striking surface 301 includes one or more indents 302 which the end of the dampener body 170 is configured to contact when moving toward the closed position. Similar to the dampener housing 132, the striking component 134 has a planar rear surface 304 which sits flush against the portion of the second panel 1020. In particular, the planar rear surface 304 of the striking component 134 directly clamps against a gasket 136B which in turn is directly clamped against the panel 1020. As mentioned above, the gasket 136B can be made from a soft material such as rubber or silicone which protects the panel 1020 from the harder surfaces of the hinge 100, but also provides a clamping surface having a high coefficient of friction which is highly advantageous for clamping the second panel 1020.

Similar to the dampening housing 132, the striking component 134 includes a plurality of holes 300. Each hole 300 receives therein or therethrough a threaded stem 160A, 160B extending from the inner surface of the second front hinge leaf component 118. A second set of fasteners 30 are received through corresponding holes 121 in the rear second leaf component 120 and threadably fasten with one of the pair of the threaded stems 160A, 160B of the second front hinge leaf component 118 to clamp the portion of the second panel 1020 between the second front and second rear leaf components 118, 120.

As shown in FIG. 6, a portion of striking component 134 protrudes out of the second front leaf component 118 via gap 168 in a side surface of the striking component 134. As described above, a portion of the dampener housing 132 protrudes from the front leaf component 114. This spacing between the protruding portions of the dampener housing 132 and the striking component 134 minimises torque applied to the dampener 124 when contacting the second hinge assembly 112.

As will be appreciated from the above description of the dampening assembly 131 and the striking component 134, the dampener assembly 131 and striking component 134 have a similar shape, albeit the cavities 320 are not being provided in the striking component 134, such that the dampener assembly 131 and striking component 134 have substantially matching perimeter profiles. This arrangement is advantageous as portions of tooling for manufacturing the dampener component 132 and striking component 134 can be duplicated.

The hinge 100 also includes a pair of rear gaskets 140A, 140B. The rear hinge leaf components 116, 120 directly clamp against the rear face of the panels 1010, 1020. The rear gaskets 140A, 140B can be provided in the form of a soft material such as rubber, silicone, or the like which protects the panels 1010, 1020 from contacting harder surfaces of the hinge 100 which can be made from steel, particularly in applications where the panel 1010 is made of glass. The rear gaskets 140A, 140B includes a plurality of holes 141A, 141B for allowing the respective threaded bolts 20, 30 to pass therethrough to clamp the front and rear leaf components 114, 116, 118, 120 together with the portion of the panels 1010, 1020 clamped therebetween under compression. The rear gaskets 140A, 140B can include a cylindrical sheath 138 extending from and surrounding the hole 141A which protects the panels 1010, 1020 from the stems 160A, 160B and bolts 20, 30.

Figure 9:
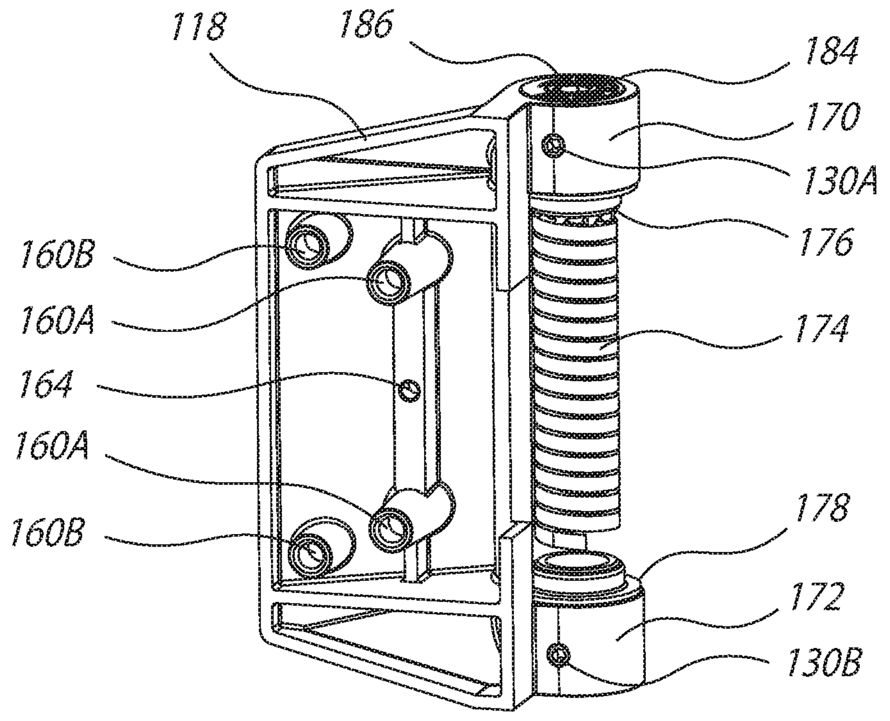
FIG. 9 is a rear view of the hinge of FIG. 8 with one of the front hinge members further removed.
Figure 10:
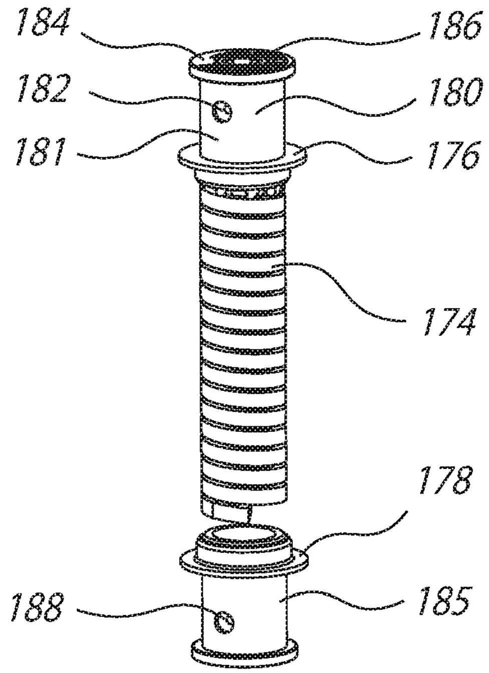
FIG. 10 is a schematic of components located within the barrel of the hinge of FIG. 1.
Figure 17:
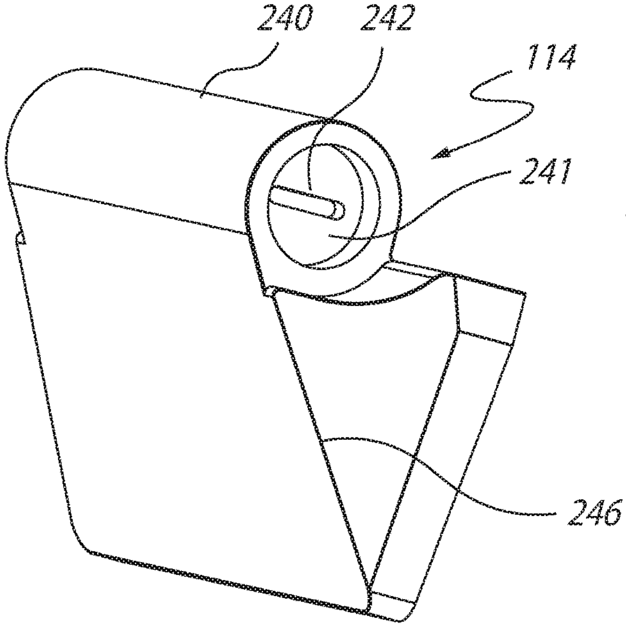
FIG. 17 is a bottom perspective view of a first front hinge member of the hinge of FIG. 1.
Figure 18:
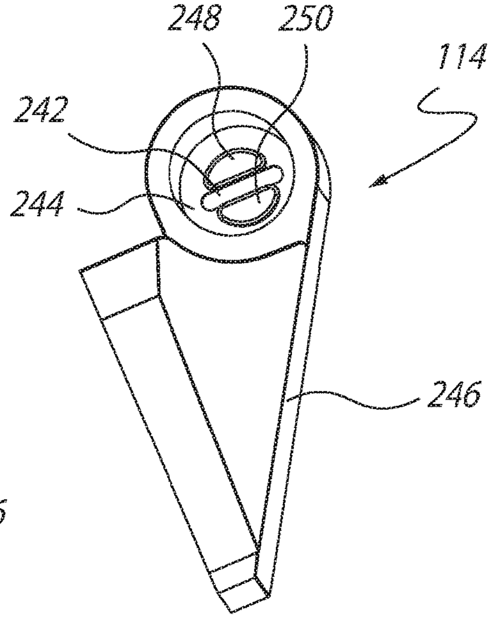
FIG. 18 is a top perspective view of the first front hinge member of FIG. 17.
Figure 19:
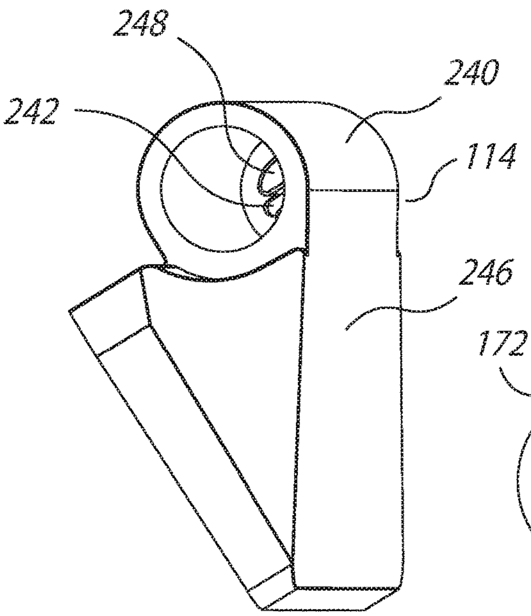
FIG. 19 is a further top perspective view of the first front hinge member of FIG. 17.
Figure 20:
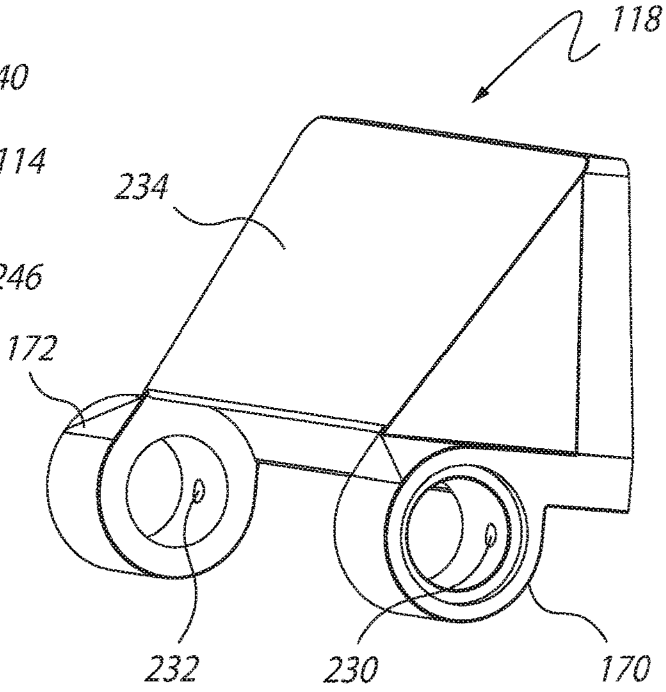
FIG. 20 is a top perspective view of the second front hinge member of the hinge of FIG. 1.

Referring to FIGS. 1 and 2, the second hinge leaf assembly 112 includes a plurality of knuckles, specifically top and bottom knuckles 170, 172, and the first leaf assembly 110 includes a further knuckle, specifically an intermediate knuckle 240. The knuckles 170, 172, 240 are coaxially aligned to define a barrel 173 (see FIG. 8) housing the spring 174 as shown in FIG. 9. The intermediate knuckle 240 has a length that corresponds to the spacing between the top and bottom knuckles 170, 172. As shown in FIGS. 17 to 19, the first front leaf component 114 includes a generally triangular prism body 246 having the intermediate knuckle 240 extending from an inner side surface. As shown in FIG. 20, the second front leaf component 118 has similar triangular prism body 234 having the top and bottom knuckles 170, 172 extending from an inner side surface. The knuckles 170, 172 have a substantially ring-like profile. As shown in FIG. 10, a pair of bushes 176, 178 can be located between the adjacent surfaces of the end and intermediate knuckles 170, 172, 240 to minimise friction between the first and second leaf assemblies 110, 112 during rotational movement.

Referring to FIGS. 9 and 10, the hinge 100 includes a top and bottom barrel cap 180, 185 to substantially enclose the barrel 173 of the hinge 100. As shown in FIG. 10, the end knuckles 170, 172 include a hole 230, 232 extending through the ring-shaped wall. The top and bottom barrel caps 180, 185 also include a hole 182, 188 in an outer neck 181 which aligns with the holes 230, 232 in the top and bottom knuckles 170, 172. A fastener, such as a grub screw 130A, 130B, can be received through the aligned holes 230, 232 in the top and bottom knuckles 170, 172 with the holes 182, 188 in the top and bottom barrel caps 180, 185 such that the top and bottom caps 180, 185 are coupled to the second hinge leaf assembly 112. Thus, the barrel caps 180, 185 do not rotate relative to the second hinge leaf assembly 112 in the event that the grub screws 130A, 130B are in place.

Figure 14:
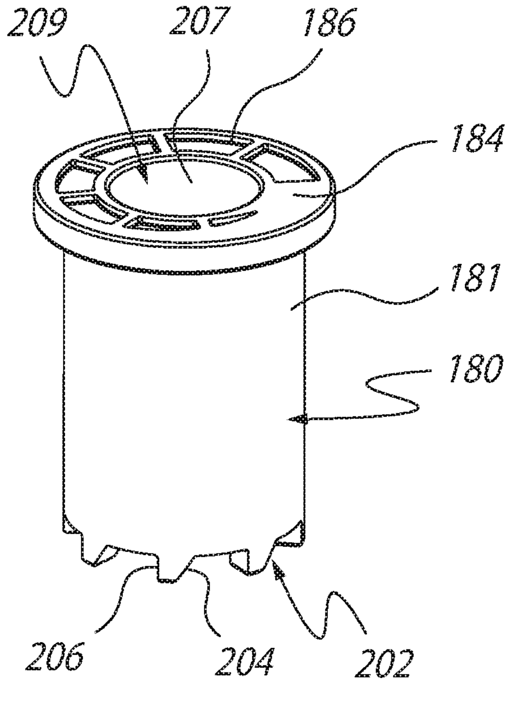
FIG. 14 is a top perspective view of the top cap of the hinge of FIG. 1.

As shown in FIG. 14, the top barrel cap 180 includes an outer neck 181 and an inner neck 207, wherein the inner neck 207 has a void 209 which houses a neck portion 218 of a spring tensioning component 190. The upper surface 184 of the cap 180 includes a plurality of markings 186 indicative of the tensioning direction and tensioning gradation of the spring 174. The bottom edge of the neck 181 of the top barrel cap 180 includes a first engaging surface 202 provided in the form of a sawtooth profile.

Figure 11:
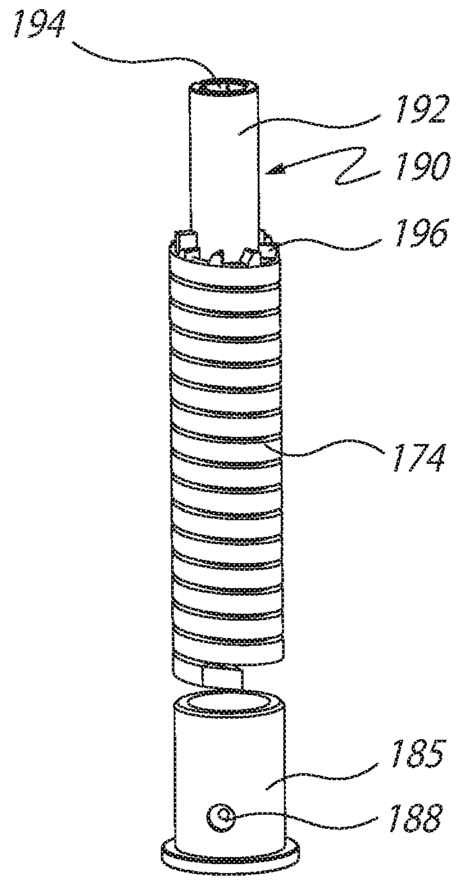
FIG. 11 is a schematic of the components located within the barrel of hinge of FIG. 1, with the top cap removed.
Figure 12:
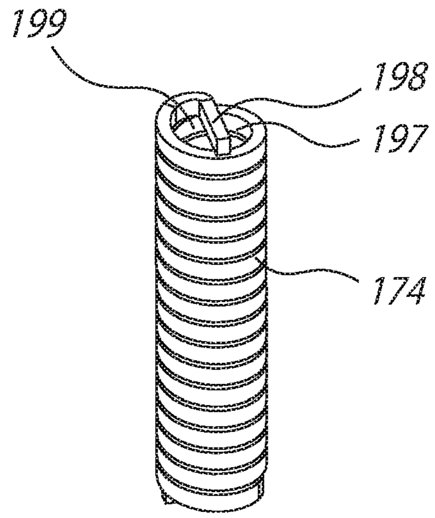
FIG. 12 is a top perspective view of the spring of the hinge of FIG. 1.
Figure 13:
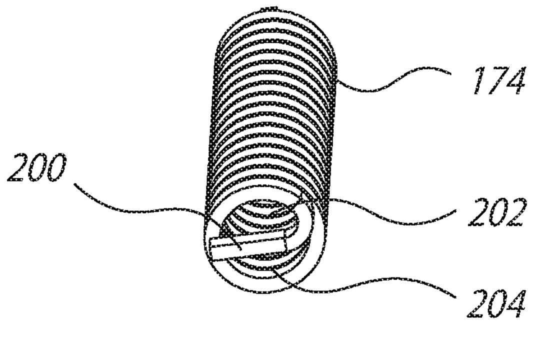
FIG. 13 is a bottom perspective view of the spring of FIG. 12.
Figure 15:
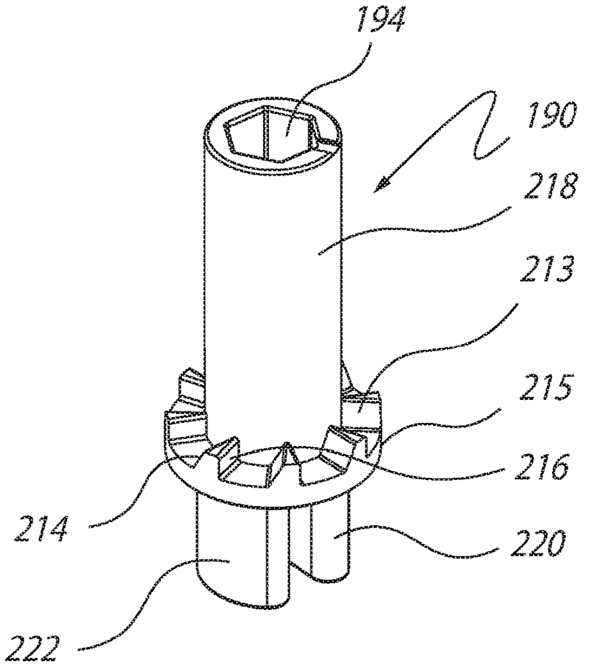
FIG. 15 is a top perspective view of the spring tensioning assembly of the hinge of FIG. 1.

As shown in FIGS. 11, 12, 15 and 16, there is shown the spring tensioning component 190 which cooperates with the top barrel cap 180. The spring tensioning component 190 is located within the inner neck 207 of the top barrel cap 180. The spring tensioning component 190 has a neck 218 which extends from a shoulder 215. An upper surface of the shoulder 215 has a second engaging surface 213 which cooperatively engages with the first engaging surface 202 of the neck 181 of top barrel cap 180 to restrict rotational movement of the spring tensioning component 190 relative to the top barrel cap 180. As shown in FIG. 11, the spring tensioning component 190 is coupled to a first end of the spring 174. In particular, the spring 174 includes a diametrically extending tail 198 defining a first and second cavity 197, 199 with coils of the spring 174. The spring tensioning component 190 includes a pair of protrusions 220, 222 which are received within the respective first and second cavities 197, 199 of the spring 174 to enable the rotational force applied to the spring tensioning component 190 to be transferred to the spring 174 to adjust the tension of the spring 174. The protrusions 220, 222 have a "D-shaped" cross-sectional profile. The spring 174 includes a further diametrically extending tail 200 received within an aperture 242 located in a wall 241 extending across the intermediate knuckle 240 of the barrel 173 which is part of the first hinge leaf assembly 110 as shown in FIGS. 17 to 19. The wall 241 extending across the lower end of the intermediate knuckle 240 includes upwardly extending protrusions 248, 250 which are received within corresponding cavities 202, 204 defined by coils of the spring and the further diametrically extending tail 200 to couple the spring 174 to the barrel 173. As shown in FIG. 15, the upper end of the neck 218 of the spring tensioning component 190 includes a tool hole 194 to allow an operator to apply a rotatable force to the spring tensioning component 190 to adjust the tension of the spring 174. In use, a user applies a rotational force to the spring tensioning component 190 via a tool like an Allen key or the like. When a rotational force is applied, the trailing edges 214 slide over the leading edges 204 to allow the rotational movement of the spring tensioning component 190 relative to the top barrel cap 180, which in turn increases the tension of the spring 174. Each tooth of the first engaging surface 202 has a substantially vertical trailing edge 206 which cooperates with a substantially vertical leading edge 216 of a respective tooth of the second engaging surface 213. The vertical edges 206, 216 engage against each other and restrict rotational movement of the top barrel cap 180 relative to the spring tensioning cap 190 which is under bias from the spring 174. In the event that a downward force is transferred by the user along the hinge axis 10 to compress the spring 174 within the barrel 173 to disengage the first engaging surface 202 from the second engaging surface 213, the spring tension can be decreased as the spring tensioning component 190 can rotate under bias from the spring 174 relative to the top barrel cap 180.

Figure 22:
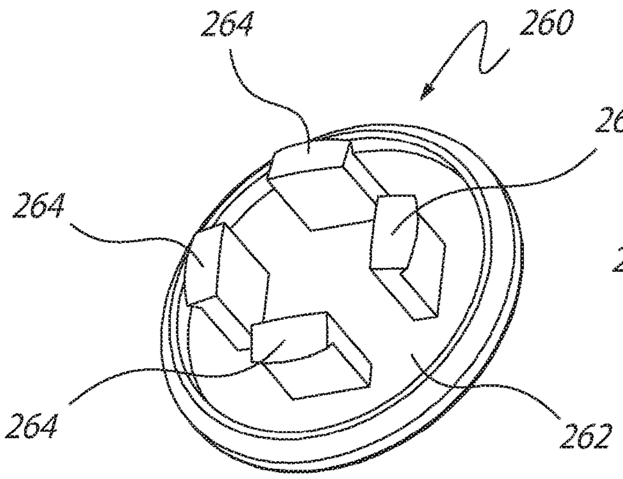
FIG. 22 is a rear perspective view of a cover clip of the hinge of FIG. 1.
Figure 23:
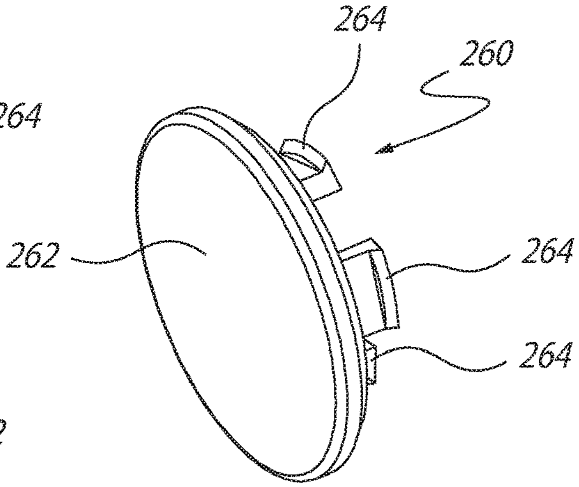
FIG. 23 is a front perspective view of the cover clip of FIG. 22.
Figure 24:
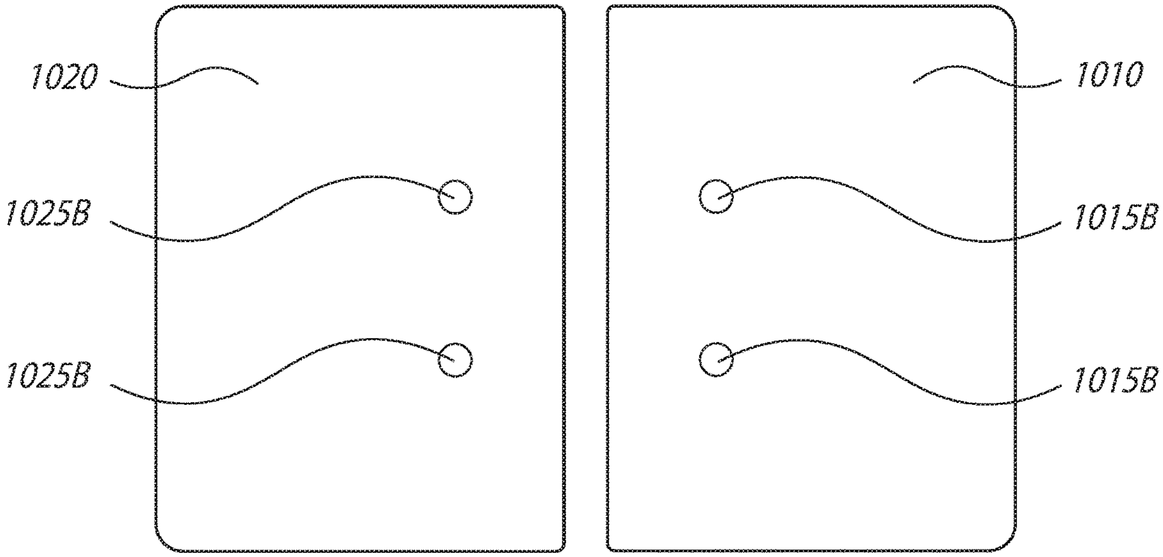
FIG. 24 is a further pair of panels, each panel including a pair of holes for securing the hinge of FIG. 1

As discussed above, each of the first and second rear leaf components 116, 120 include a plurality of hole pairs 117, 121 (see FIG. 2) to enable the hinge 100 to be mounted to panels 1010, 1020 having differently spaced holes. As such, at least one pair of holes 117, 121 provided by the first and second rear leaf components 116, 120 may not be used once the hinge 100 is installed. In one form, each unused hole may be covered with a hole cap 260 as shown in FIGS. 2, 22 and 23. Each hole cap 260 includes a planar circular body 262, wherein a plurality of resilient legs 264 extend from the planar circular body 262 and are configured to resiliently couple within the respective unused hole.

During retrofittable installation of the hinge 100 configured according to FIG. 1, the method initially includes decoupling another hinge coupled to the first and second panel 1010, 1020. The method next includes locating the first front leaf component 114 and first rear leaf component 116 on opposing sides of the first panel 1010 and coupling the first and front leaf components 114, 116 together to clamp about the portion of the first panel 1010 by locating the fasteners 20 to extend through the holes 1015 of the first panel 1010 and tightening the fasteners 20. The method next includes locating the second front leaf component 118 and second rear leaf component 120 on opposing sides of the second panel 1020 and coupling the second front and read leaf components 118, 120 together to clamp about the portion of the second panel 1020 by locating the second set of fasteners 30 to extend through the holes 1025 of the second panel 1020 and tightening the fasteners 30. The spring tensioning component 190 can then be adjusted accordingly to ensure that the hinge 100 returns to the closed position under appropriate bias from the spring 174 whilst being sufficient dampened by the dampening assembly 131. It will be appreciated that the order of these steps can be performed in different orders. For example, the second hinge assembly 112 can be coupled to the second panel 1020 prior to the first hinge assembly 110 being coupled to the first panel 1010.

Figure 47:
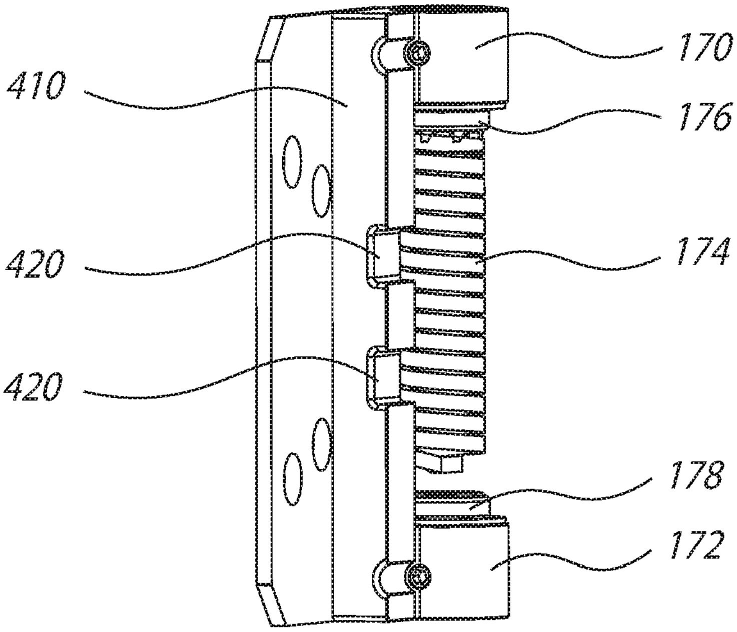
FIG. 47 is a rear perspective view of the hinge of FIG. 46 with the front hinge member of the first hinge leaf further removed.
Figure 48:
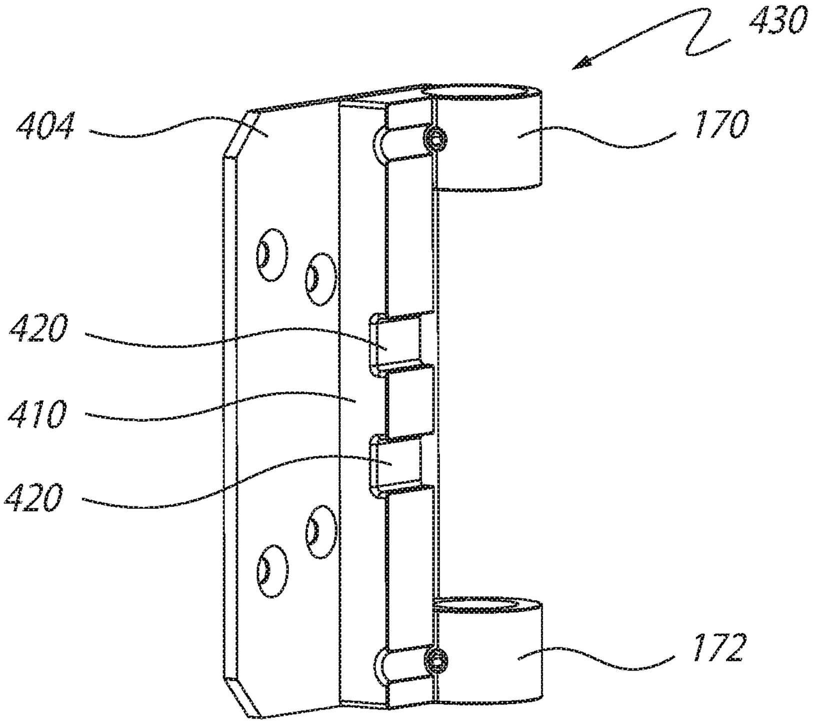
FIG. 48 is a rear perspective view of a second hinge leaf of the hinge of FIG. 38.
Figure 49:
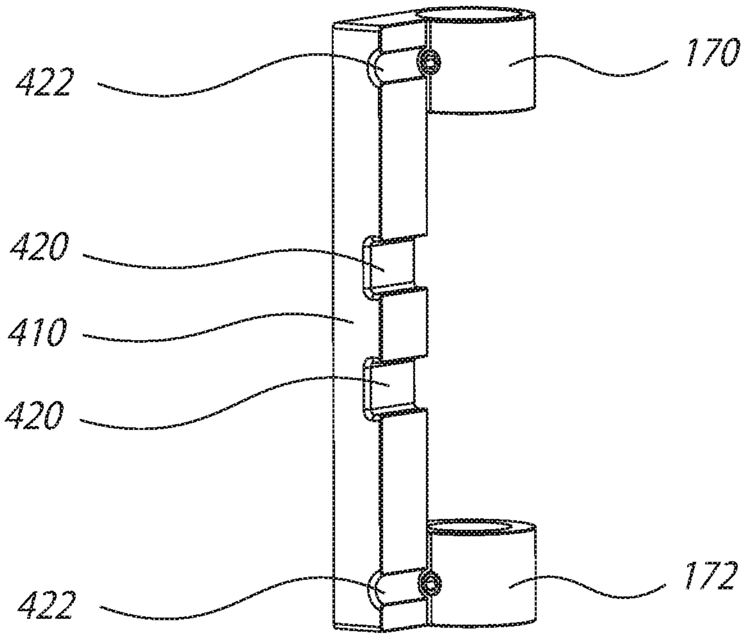
FIG. 49 is a front perspective view of the first portion of the second hinge leaf of FIG. 48.
Figure 50:
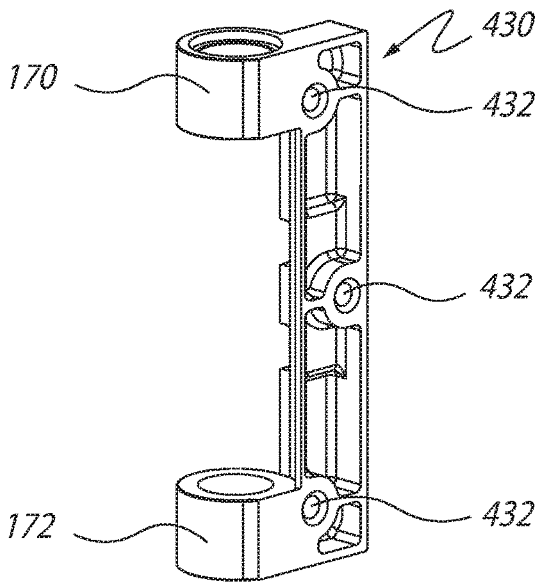
FIG. 50 is a rear perspective view of the first portion of the second hinge leaf of FIG. 48.

Referring to FIGS. 38 to 42, there is shown a further example of a hinge 400. The hinge 400 includes a first leaf assembly 110, a second leaf assembly 402, a spring 174 (see FIG. 47), and a dampener 124. The first leaf assembly 110 includes a front leaf component 114 coupled to a rear leaf component 116 for accommodating therebetween a portion of a first panel 1010 having a first pair of holes 1015. A first pair of fasteners 20 extend between the front and rear leaf components 114, 116 and through the pair of holes 1015A in the first panel 1010 to clamp the portion of the first panel 1010 to the first leaf assembly 110. The second leaf assembly 402 is hingedly coupled to the first leaf assembly 110 about a hinge axis 10. The second leaf assembly 402 includes a mounting component 404 to mount the second leaf assembly 402 to a mounting structure separate to the hinge 400. The spring 174 is coupled to the first and second leaf assemblies 110, 402 to bias the first and second leaf assemblies 110, 402 to move from an open position to a closed position. The dampener 124 has a longitudinal axis and is configured to slow movement of the first and second leaf assemblies 110, 402 to the closed position.

Advantageously, the longitudinal axis of the dampener 124 is located between the hinge axis 10 and the first panel 1010. In a preferable form, the longitudinal axis of the dampener 124 is substantially equidistantly located between the hinge axis 10 and the first panel 1010. As such, the hinge 400 can be installed to a panel 1010 which has a pair of mounting holes 1015A rather than a “mouse ear” profiled hole. This arrangement is particularly useful for retrofittable installation of the hinge 400 to a panel 1010 where another hinge is uncoupled from the panel 1010 which does not include the “mouse ear” profiled hole.

Figure 38:
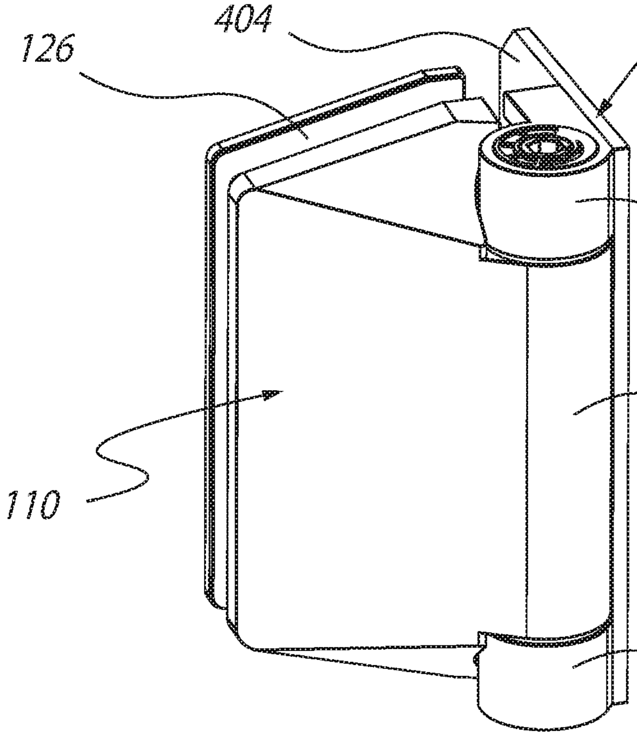
FIG. 38 is front perspective view of another example of a hinge for coupling to a single panel and mounted to a mounting surface.
Figure 39:
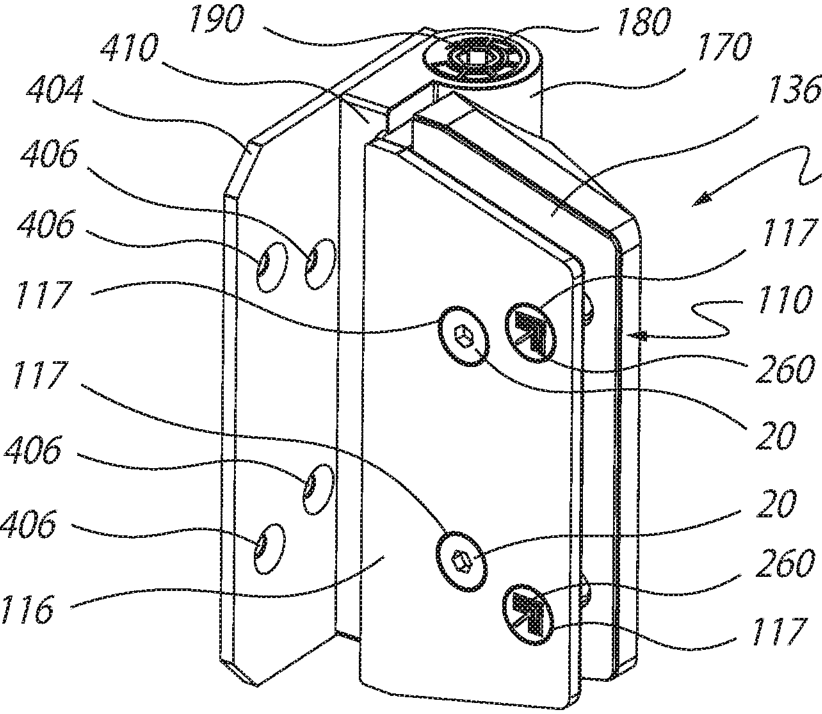
FIG. 39 is a rear perspective view of the hinge of FIG. 38.
Figure 40:
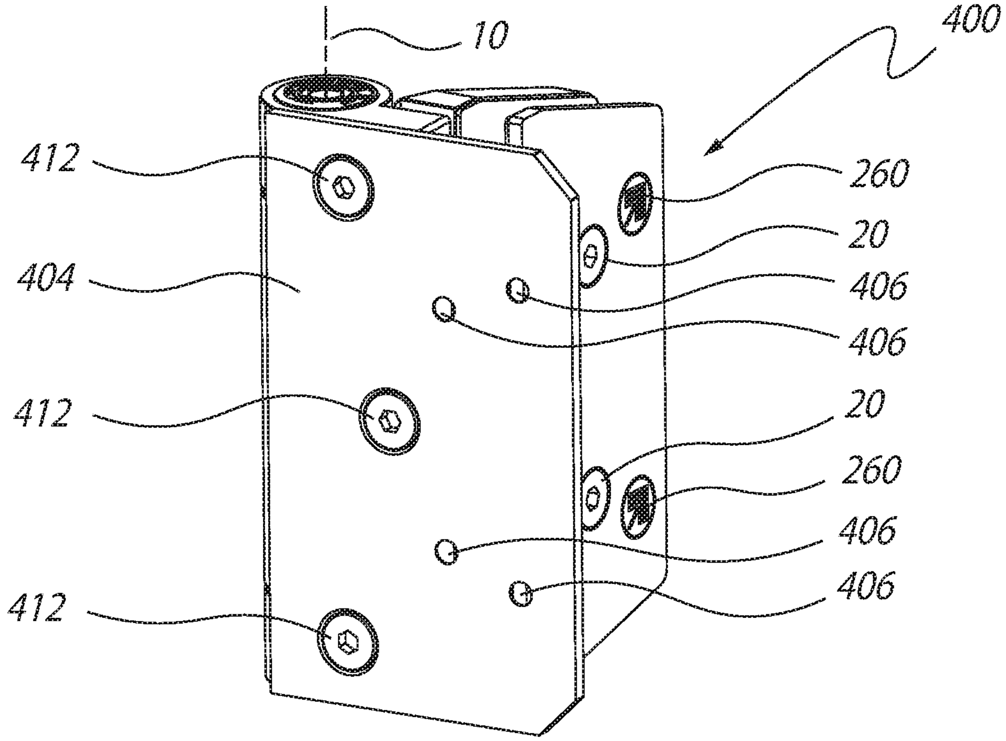
FIG. 40 is a further rear perspective view of the hinge of FIG. 38.
Figure 41:
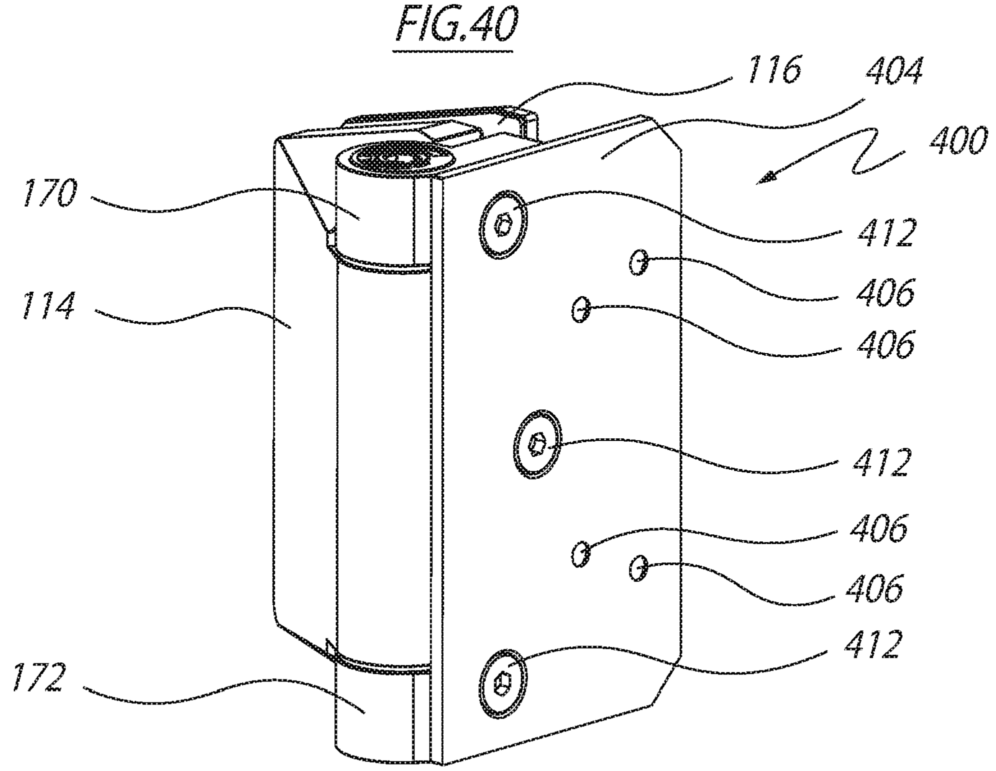
FIG. 41 a further front perspective view of the hinge of FIG. 38.
Figure 42:
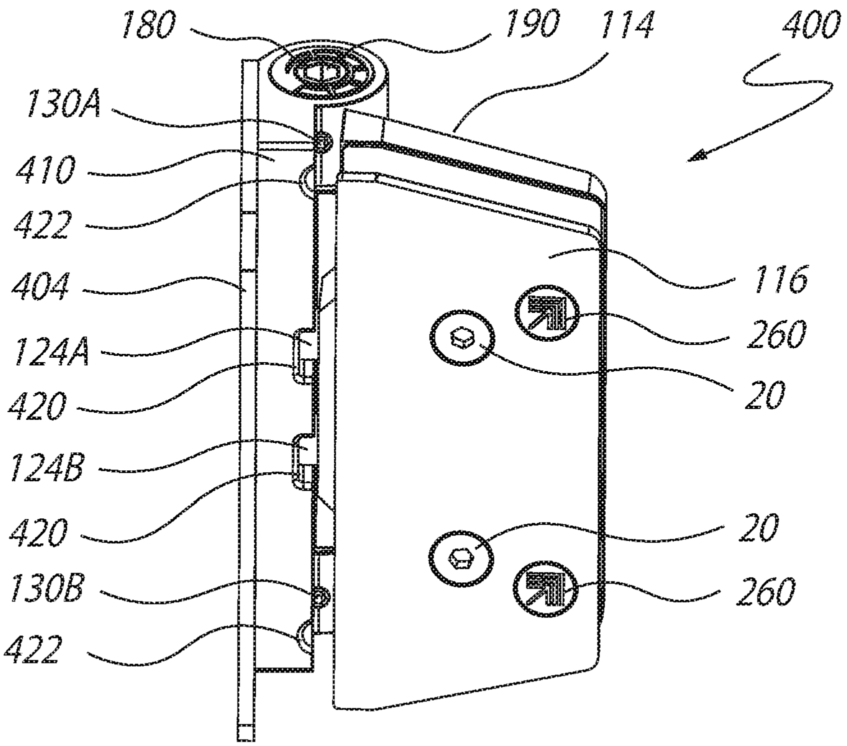
FIG. 42 is a side perspective view of the hinge of FIG. 38.
Figure 43:
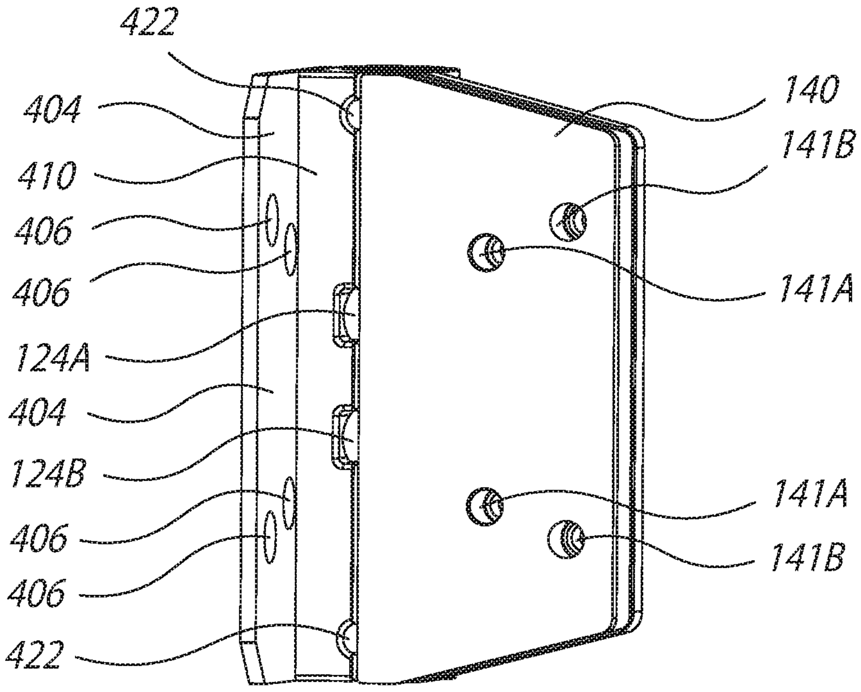
FIG. 43 is a rear perspective view of the hinge of FIG. 38 with the rear hinge member of the first hinge leaf removed.
Figure 44:
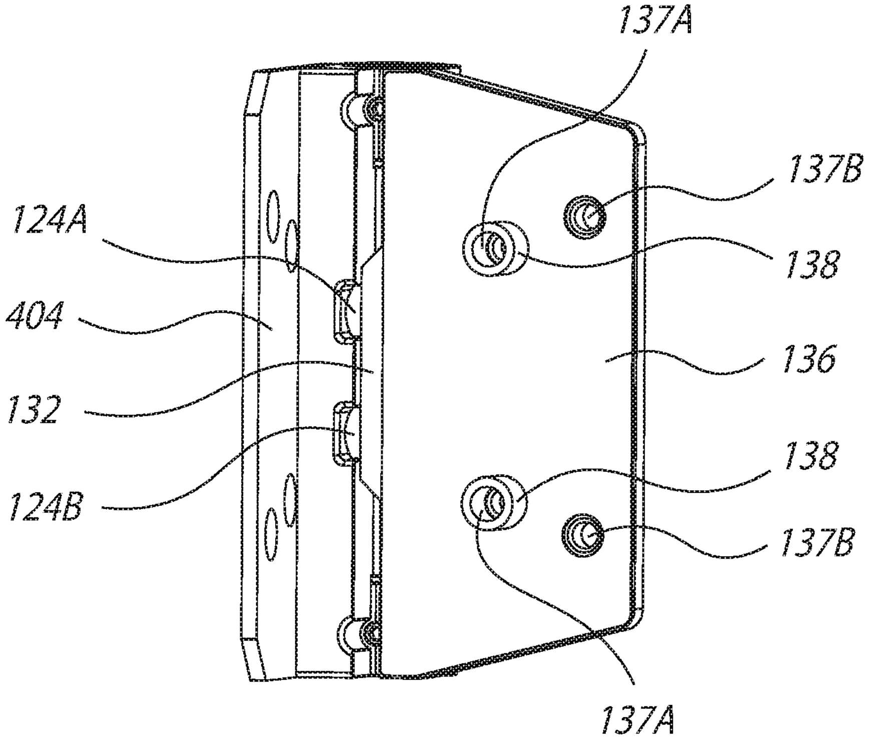
FIG. 44 is a rear perspective view of the hinge of FIG. 43 with the rear gasket further removed.
Figure 45:
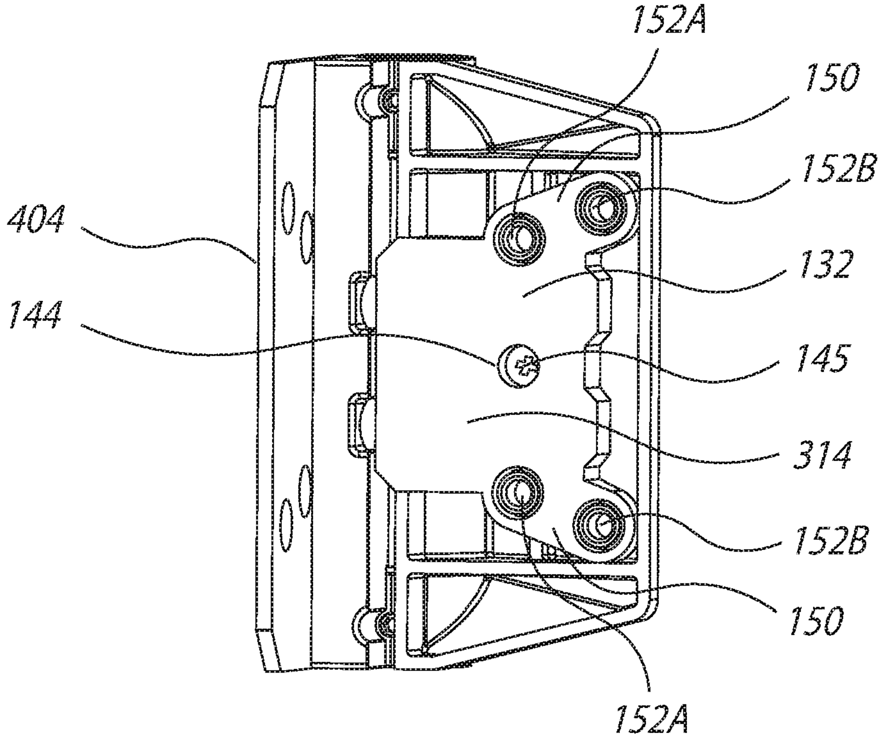
FIG. 45 is a rear perspective view of the hinge of FIG. 44 with the front gasket further removed.
Figure 46:
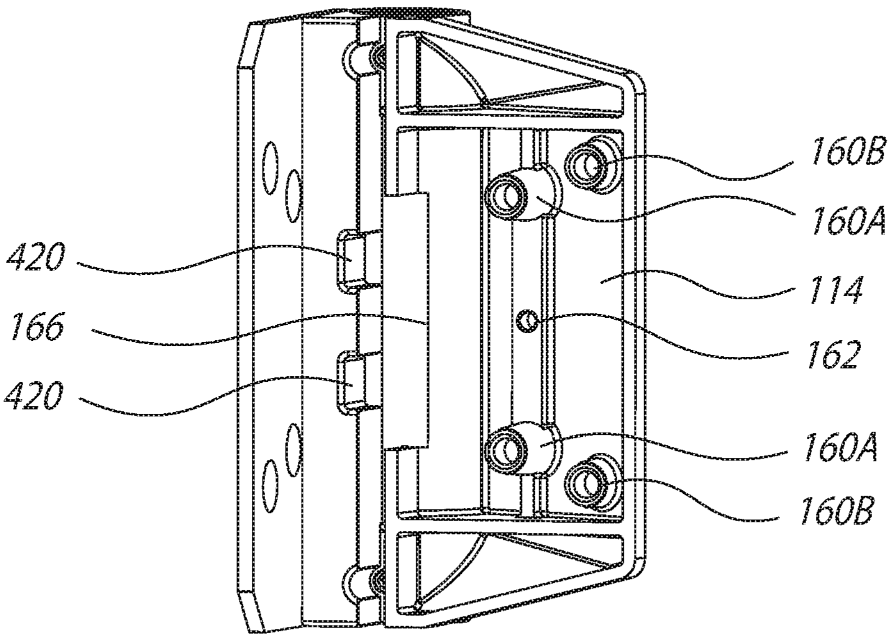
FIG. 46 is a rear perspective view of the hinge of FIG. 45 with the dampener assembly further removed

The hinge 400 of FIG. 38 can be used for hingedly securing a glass panel 1010 to a mounting structure, such as a swimming pool fence or a wall. In other arrangements, the hinge 400 of FIG. 38 can be secured to other mounting structures such as posts or the like.

As can be seen from FIGS. 38 to 47, the first hinge leaf assembly 110 of hinge 400 has the same configuration as that of the first hinge leaf assembly 110 of the hinge 100 discussed in relation to FIG. 1. It will be noted that integers of the first hinge leaf assembly 110 of FIG. 38 use the same reference numerals as those of FIG. 1 and therefore should be considered to function in the same manner. Similarly, the spring tensioning arrangement 190 and barrel arrangement of hinge 100 operate in the same manner for hinge 400. Again, like reference numerals have been used to indicate that these integers operate in the same manner between embodiments of the hinges 100 and 400.

The dampener 124 of hinge 400 is part of a dampener assembly 131 including a dampener housing 132 having a cavity 320 for housing at least a portion of the dampener 124. The hinge 400 may include a plurality of dampeners 124A, 124B which are at least partially housed within a plurality of respective cavities 320. However, it will be appreciated that depending upon the amount of bias provided by the spring 174, a single dampener 124 may be sufficient, in which case a single dampener 124 may be selectively installed. This may mean that one of the cavities 320 is left empty. The dampener housing 132 is secured to an inner surface of the first front leaf component 114 as shown in FIGS. 6 and 7. In particular, a screw 145 fastens the dampening assembly 131 to a threaded hole 144 provided on the inner surface of the first front hinge component 110. The threaded hole 144 is provided on a ridge 165 of the inner surface of the front hinge component 110.

The dampener housing 132 has a pair of holes 152A which align with the pair of holes 1015A in the panel 1010. The first pair of fasteners 20 provided in the form of a pair of threaded bolts are received through the aligned pair of holes 152A in the dampener housing 132 when passing through the holes 1015A of the portion of the panel 1010. The front leaf component 114 includes a pair of threaded stems 160A which align with and are located within the pair of holes 152A in the dampener housing 132, wherein the pair of fasteners 20 are progressively tightened and threadably fasten with the threaded stems 160A to clamp the portion of the panel 1010 between the front leaf component 114 and the rear leaf component 116. A portion of dampener housing 132 protrudes out of the front leaf component 114 via gap 166.

The dampener housing 132 has a planar rear surface 314 which sits flush against the planar surface of the panel 1010. The planar rear surface 314 of the dampener housing 132 directly clamps against a gasket 136, which in turn is clamped directly against the face of the panel 1010. A rear gasket 140 is directly clamped between an opposite face of the panel 1010 and an inner surface of the rear hinge leaf component 116. The gaskets 136, 140 can be provided in the form of a soft material such as rubber, silicone, or the like which protects the panel 1010 from contacting harder surfaces of the hinge 400 which can be made from steel, particularly in applications where the panel 1010 is made of glass. Each gasket 136, 140 includes a plurality of holes 137, 141 for allowing the respective threaded bolts 20 to pass therethrough to clamp the front and rear leaf components 114, 116 together with the portion of the panels 1010, 1020 clamped therebetween under compression. The front or rear gaskets 136, 140 can include a cylindrical sheath extending from and surrounding the hole 138, 142 which protects the panel 1010 from the threaded stems 160A and bolts 20.

The dampener housing 132 has a pair of arms 150 extending from a housing body 133. The pair of arms 150 extend acutely relative to the hinge axis 10 in a general diagonal direction away from the housing body 133 relative to hinge axis 10. The pair of arms 150 include the pair of holes 300A of the dampener housing 132 for receiving the threaded stems 160A extending from the inner surface of the front leaf component 114 and the threaded bolts 20 therein or therethrough. Whilst each arm 150 can include a single hole 300A, in a preferable configuration each arm 150 can include a plurality of holes 300A, 300B to allow selective use of appropriate hole spacing depending upon the spacing of existing holes drilled in the panel 1010. In particular a first hole 300A is provided at a first end of the respective arm 150 that is proximally connected to the housing body 133 for receiving threaded stem 160A, and a second hole 300B is provided at a second end of the respective arm 150 that is located distal to the housing body 133 for receiving threaded stem 160B. The first holes 300A of the arms 150 are spaced closer relative to the hinge axis 10 compared to the second holes 300B. Furthermore, the first holes 300A are located closer to each other along the hinge axis 10 compared to the spacing between the second holes 300B along the hinge axis to thereby accommodate common spacings between holes provided in predrilled panels. This configuration thereby provides a universal retrofittable hinge 400 which can be selectively installed for various common hole spacings in panels 1010, 1020.

The dampener housing 132 can include one or more cavities 320 for accommodating the one or more dampeners 124A, 124B. Each cavity 320 includes a longitudinal axis which extends orthogonal to the hinge axis 10. Each cavity 320 is generally cylindrical in cross-section for accommodating a generally cylindrical body 170 of the dampener 124 as shown in FIG. 25. Each dampener 124 includes a first dampener portion 172 provided in the form of a pin which extends and retracts within a second portion 170 of the dampener 124 provided in the form of the dampener body or cylinder. Each dampener 124 is generally provided in the form of a hydraulic dampener, wherein the dampener body 170 contains a hydraulic fluid which is used to provide the dampening functionality. The dampener body 170 contains a biasing mechanism such as a spring which biases the dampener pin 172 to extend outward from the dampener body 170. A portion of the dampener body 170 extends from the cavity 320 when the hinge 100 is moved from the open position to the closed position. When the hinge 400 moves toward the closed position, the end of the dampener body 170 comes into contact with the second hinge assembly 112 causing at least a portion of the dampener body 170 to retract within the cavity 320 as the dampener pin 172 is received within the dampener body 170 under bias of the spring 174. The end wall of each cavity 320 includes a small hole 322 to receive and resiliently retain the tip of the dampener pin 172 and thus the dampener 124. In one form, the small hole 322 can be provided in the form of a pair of orthogonal slits having a generally cross profile provided in the end wall of the cavity 320, wherein the tip of the pin 172 is resiliently received in the centre of the cross-shaped hole 322. When the hinge 400 is moved to the open position from the closed position under an external force (i.e. a user opens a hinge gate which includes the hinge 600), a portion of the dampener body extends from the cavity 320 under the bias of a spring contained within the dampener body 170.

The front surface of the dampener housing 132 has a plurality of ribs 319 which extend parallel and orthogonal to the hinge axis 10. A junction between orthogonal ribs 319 provides a screw hole 318 which travels from the front to rear surfaces of the dampener housing 320 to allow a threaded screw 145 to extend therethrough to releasably secure the dampening assembly 131 to the inner surface of the front hinge component 114. The front surface of the dampener housing 132 also includes an outer wall of the cavity at least partially housing the dampener 124.

The front leaf component 114 of the first hinge assembly 110 includes a generally triangular prism body 246 having an intermediate knuckle 240 extending from a side surface of the body 246.

The second hinge leaf assembly 430 includes a plurality of knuckles 170, 172, specifically top and bottom knuckles 170, 172 which extend from an elongate body 410. The top and bottom knuckles are spaced to accommodate the intermediate knuckle 240 therebetween. The knuckles 170, 172, 240 are coaxially aligned, wherein the intermediate knuckle 240 is located between the top and bottom end knuckles 170, 172, to define a barrel 173 housing the spring 174 and spring tensioning component 190. A pair of bushes 174, 176 can be located between the adjacent surfaces of the end and intermediate knuckles 170, 172, 240 to minimise friction between the first and second leaf assemblies 110, 112 during rotational movement.

The elongate body 410 of the second hinge assembly 402 provides a striking surface which is configured to contact the dampener 124 when approaching the closed position. The striking surface includes one or more indents 420 which the one or more dampeners 124 of the dampener assembly 131 are configured to contact when moving toward the closed position.

The rear surface of the elongate body 410 has a groove 422 at the top and bottom ends thereof which align with the holes in the outer wall of the top and bottom knuckles 170, 172 to allow for an operator's tool to access and engage the grub screws 130A, 130B of the upper and lower knuckles 170, 172 due to close proximity to the elongate body 410. For example, a shaft of a screwdriver could be at least partially accommodated within the groove 422 to allow access to grub screws 130A, 130B.

Figure 51:
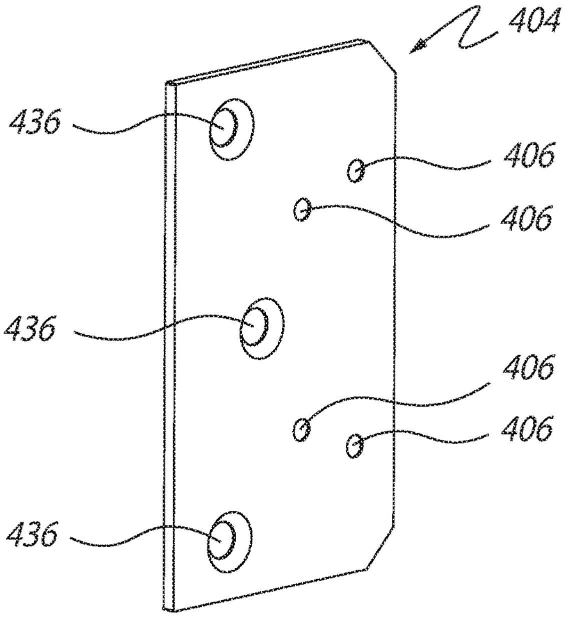
FIG. 51 is a perspective view of the second portion of the second hinge leaf of FIG. 48.
Figure 52:
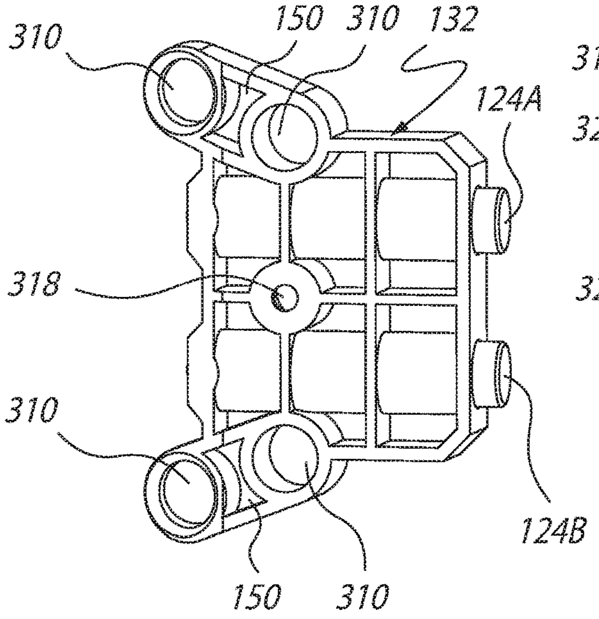
FIG. 52 is a front perspective view of the dampener assembly of the hinge of FIG. 38.
Figure 53:
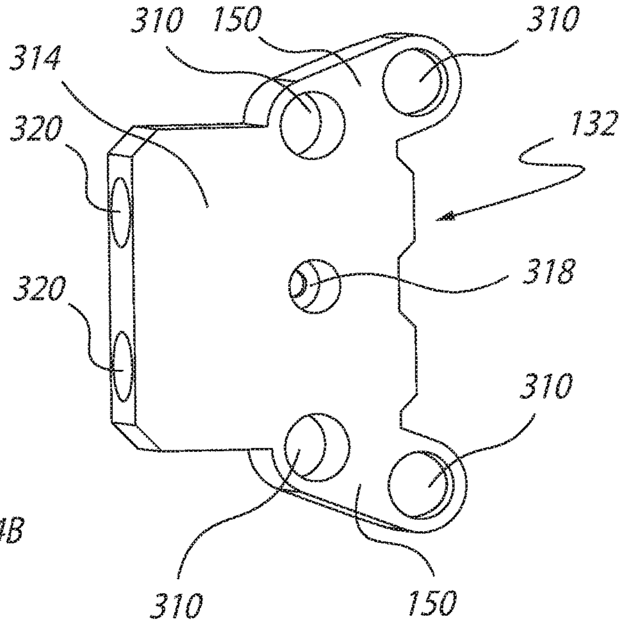
FIG. 53 is a rear perspective view of a dampener housing of the hinge of FIG. 38.
Figure 54:
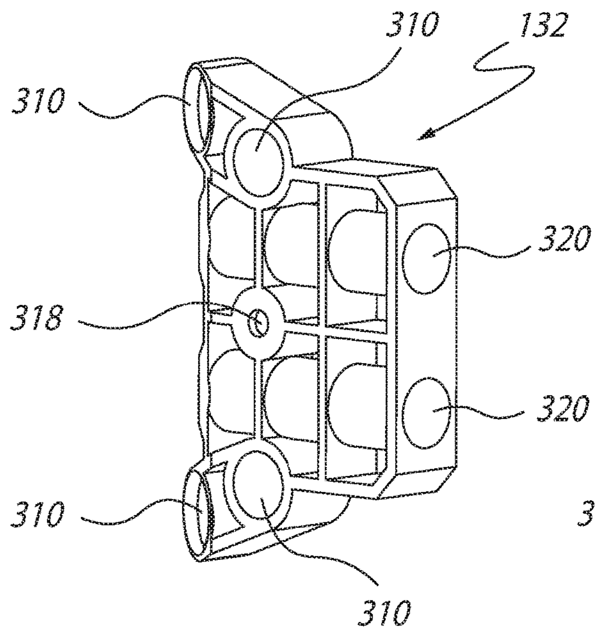
FIG. 54 is a front perspective view of the dampener housing of FIG. 52.
Figure 55:
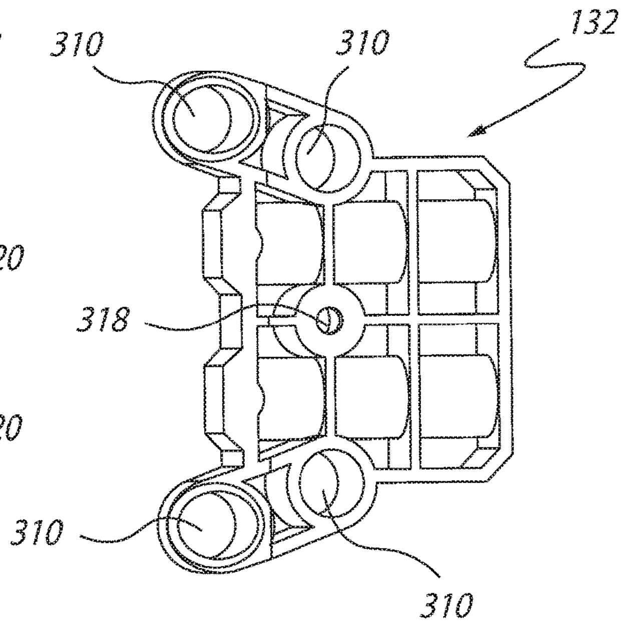
FIG. 55 is a further front perspective view of the dampener housing of FIG. 52.
Figure 56:
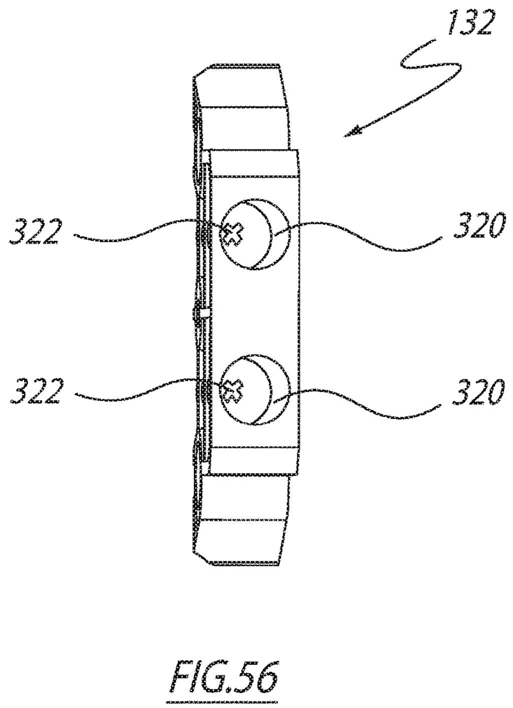
FIG. 56 is a first side perspective view of the dampener housing of FIG. 52.
Figure 57:
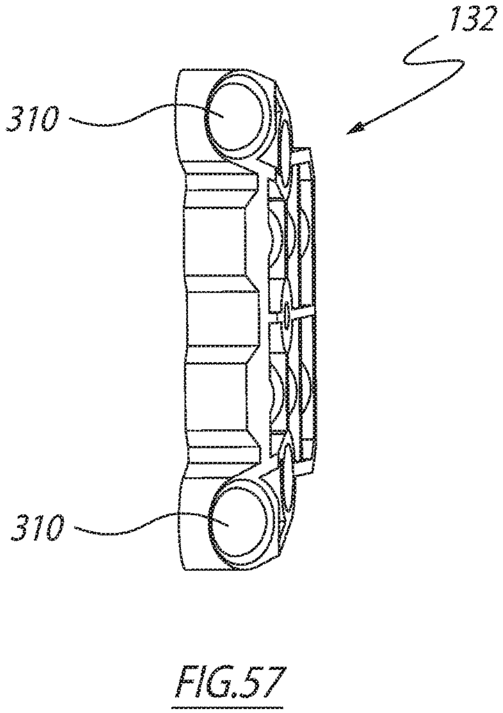
FIG. 57 is a second side perspective view of the dampener housing of FIG. 52.
Figure 58:
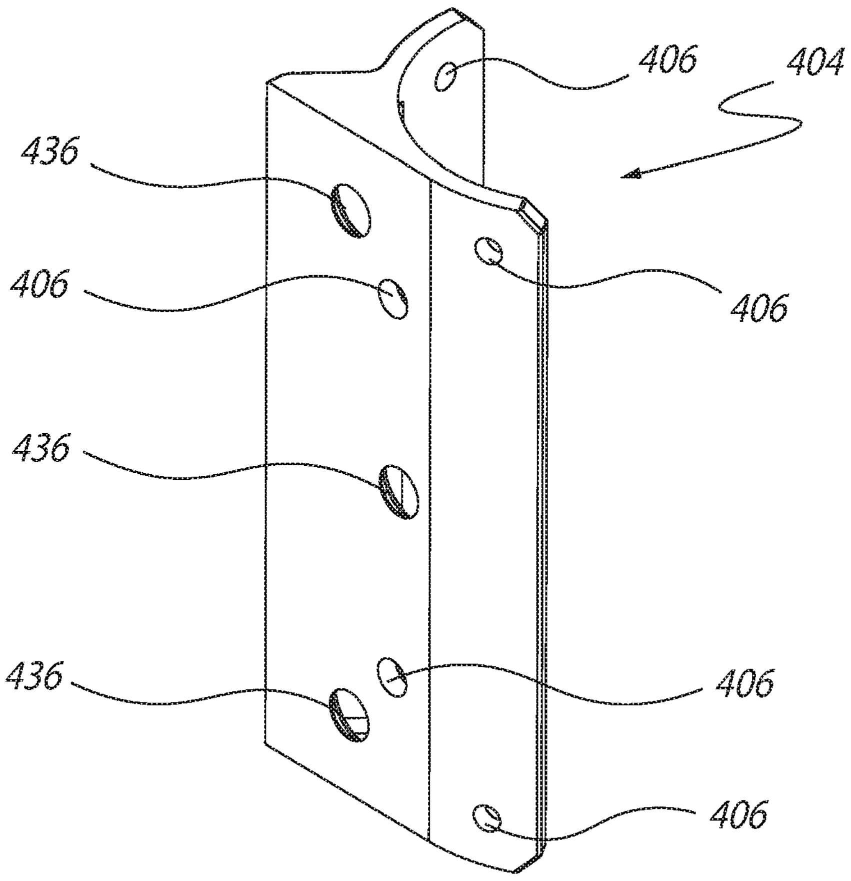
FIG. 58 is an alternate example of a second portion of the second hinge leaf of the hinge of FIG. 38.

Referring to FIG. 51, the mounting component 404 is releasably coupled to the elongate body 410 via fasteners 412 received by holes 436 to a side surface of the elongate body 410. The mounting component 404 is a bracket having a planar profile, as shown in FIG. 51, to enable mounting of the hinge 400 to a planar mounting structure, such as a wall or the like. However, as shown in FIG. 58, the mounting component 404 may be a bracket having a curved profile to enable mounting of the hinge 400 to a curved mounting structure such as a post or pole having a curved outer surface. Other shaped mounting components 404 having differently shaped mounting surfaces will also be appreciated by those skilled in the art. The mounting component 404 includes a plurality of holes 436 to allow the coupled mounting component 404 to be mounted to the mounting structure.

The barrel and spring tensioning arrangement of hinge 400 are configured in the same manner as previously described in relation to hinge 100. Therefore, the barrel and spring tensioning arrangement of hinge 400 will now be described with reference to FIGS. 10 to 19.

In particular, as shown in FIG. 10, the hinge 400 includes a top and bottom barrel cap 180, 185 to substantially enclose the barrel 173 of the hinge 400. The end knuckles 170, 172 include a hole 230, 232 extending orthogonally relative to the hinge axis 10 through the ring-shaped wall. The top and bottom barrel caps 180, 185 also include a hole 182, 188 in an outer neck 181 which aligns with the holes 230, 232 in the top and bottom knuckles 170, 172. Fasteners such as grub screw 130A, 130B, can be received through the aligned holes 230, 232 in the top and bottom knuckles 170, 172 with the holes 182, 188 top and bottom barrel caps 180, 185 such that the top and bottom caps 180, 185 are coupled to the second hinge leaf assembly 112. Thus, the barrel caps 180, 185 do not rotate relative to the second hinge leaf assembly 112 in the event that the grub screws 130A, 130B are fastened.

The top barrel cap 180 includes an outer neck 181 and an inner neck 207, wherein the inner neck 207 has a void 209 which houses a neck portion 218 of a spring tensioning component 190. The upper surface of the neck 184 includes a plurality of markings 186 indicative of the tensioning direction and tensioning gradation of the spring 174. The bottom edge of the neck 181 of the top barrel cap 180 includes a first engaging surface 202 provided in the form of a sawtooth profile.

Figure 16:
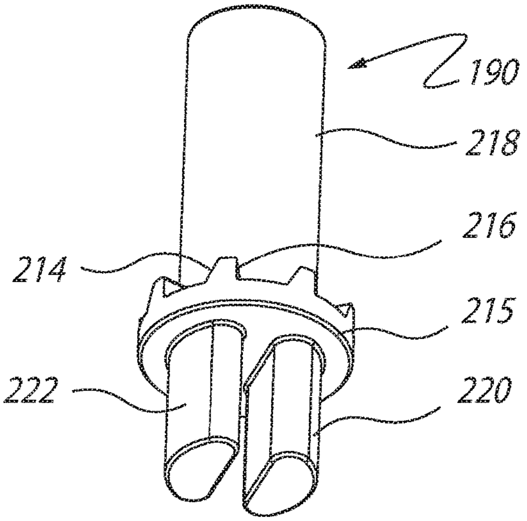
FIG. 16 is a bottom perspective view of the spring tensioning assembly of FIG. 15.

Referring to FIGS. 11, 15 and 16, the spring tensioning component 190 is configured to cooperate with the top barrel cap 180. The spring tensioning component 190 is located within the inner neck 207 of the top barrel cap 180. The spring tensioning component 190 has a neck 218 which extends from a shoulder 215. An upper surface of the shoulder 215 has a second engaging surface 213 which cooperatively engages with the first engaging surface 202 of the neck 181 of top barrel cap 180 to restrict rotational movement of the spring tensioning component 190 relative to the top barrel cap 180. The spring tensioning component 190 is coupled to a first end of the spring 174. In particular, the spring 174 includes a diametrically extending tail 198 defining a first and second cavity 197, 199 with an inner surface of the coils of the spring 174. The spring tensioning component 190 includes a pair of protrusions 220, 222 which are received within the respective first and second cavities 197, 199 of the spring 174 to enable the rotational force applied to the spring tensioning component 190 to be transferred to the spring 174 to adjust the tension of the spring 174. The protrusions 220, 220 have a "D-shaped" cross-sectional profile. The spring 174 includes a further diametrically extending tail 200 at the opposite end of the spring which is received within an aperture 242 located in a wall 241 extending across the intermediate knuckle 240 of the barrel 173 which is part of the first hinge leaf assembly 110. The wall 241 extending across the lower end of the intermediate knuckle 240 includes upwardly extending protrusions 248, 250 which are received within corresponding cavities 202, 204 defined by coils of the spring and the further diametrically extending tail 200 to couple the spring 174 to the barrel 173. The upper end of the neck of the spring tensioning component 190 includes a tool hole 194 to allow an operator to apply a rotatable force to the spring tensioning component to adjust the tension of the spring. In use, a user applies a rotational force to the spring tensioning component 190 via a tool like an Allen key or the like. When a rotational force is applied, the trailing edges 214 slide over the leading edges 204 to allow the rotational movement of the spring tensioning component 190 relative to the top barrel cap 180, which in turn increases the tension of the spring 174. Each tooth of the first engaging surface 202 has a substantially vertical trailing edge 206 which cooperates with a substantially vertical leading edge 216 of a respective tooth of the second engaging surface 213. The vertical edges 206, 216 engage against each other and restrict rotational movement of the top barrel cap 180 relative to the spring tensioning cap 190 which is under bias from the spring 174. In the event that a downward force is transferred by the user along the hinge axis 10 to compress the spring 174 within the barrel 173 to disengage the first engaging surface 202 from the second engaging surface 213, the spring tension can be decreased as the spring tensioning component 190 can rotate under bias from the spring 174 relative to the top barrel cap 180.

As discussed above, the rear leaf component 116 includes a plurality of hole pairs to enable the hinge 400 to be mounted to panel 1010 having differently spaced holes. As such, at least one pair of holes provided by the rear leaf component 116 may not be used once the hinge 400 is installed. In one form, each unused hole may be covered with a hole cap 260. The hole cap of hinge 100 is the same as that used for hinge 400 and thus the hole cap 260 of FIGS. 22 and 23 are relevant to hinge 400. Each hole cap 260 includes a planar circular body 262, wherein a plurality of resilient legs 264 extend from the planar circular body 262 and are configured to resiliently couple within the respective unused hole.

During retrofittable installation of the hinge 400, the method initially includes decoupling another hinge coupled to the panel 1010 and mounting structure. The method next includes mounting the second leaf assembly 403 via the mounting component 404 to the mounting structure. The method next includes locating the first front leaf component 114 and first rear leaf component 116 on opposing sides of the first panel 1010 and coupling the first and front leaf components 114, 116 together to clamp about the panel 1010 by locating the fasteners 20 to extend through the holes 1015 of the panel 1010. The user can then use a tool to rotatably move the spring tensioning component 190 relative to the top barrel cap 180 to adjust the spring tension such that the panel 1010 is sufficiently biased to the closed position whilst the dampening assembly 131 provides sufficient dampening to slow the final portion of hinged movement toward the closed position to reduce mechanical wear and tear on the hinge 400 and panel 1010. It will be appreciated that these steps may be performed in a different order. For example, the first hinge assembly 110 may be coupled to the panel 1010 prior to securing the second hinge assembly 112 to the mounting structure.

Figure 59:
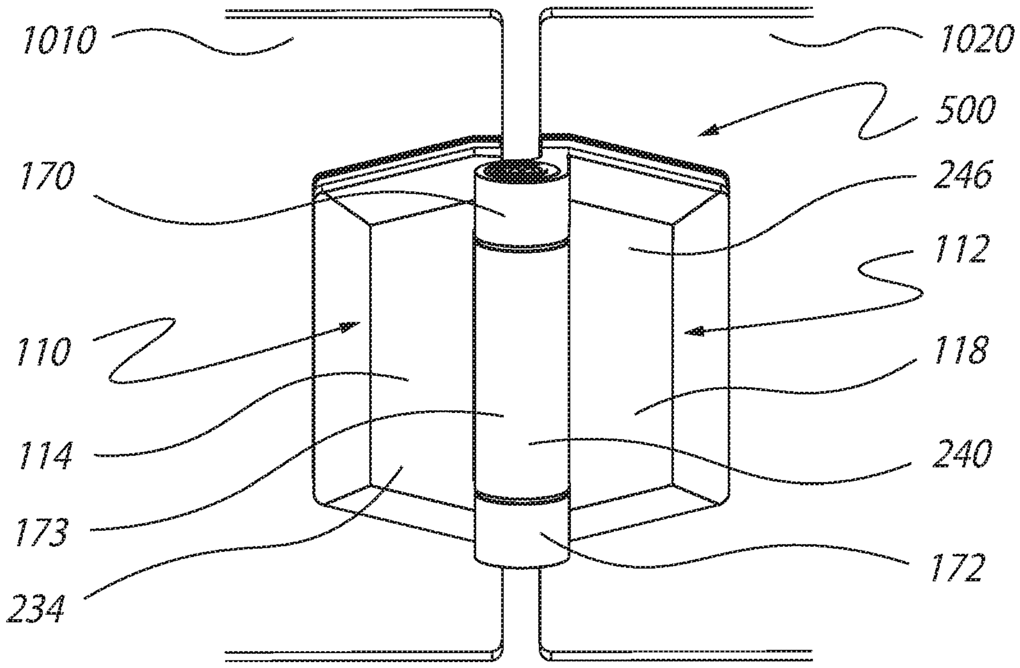
FIG. 59 is a front view of a further example of a hinge coupled to a pair of panels.
Figure 60:
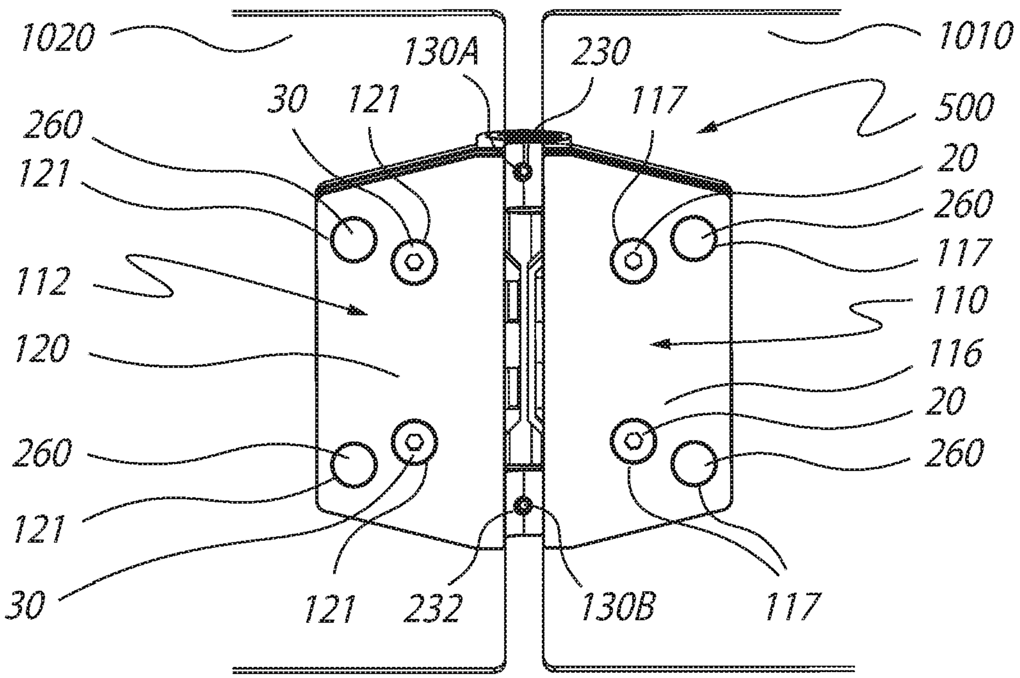
FIG. 60 is a rear view of the hinge of FIG. 59 coupled to the pair of panels.

Referring to FIGS. 59 and 60 there is shown a further example of a hinge 500. The hinge 500 shares like reference numerals to hinges 100 and 400. The same reference numbers have been used to denote that these integers operate in the same manner as described above for hinge 100 and 400.

Figure 61:
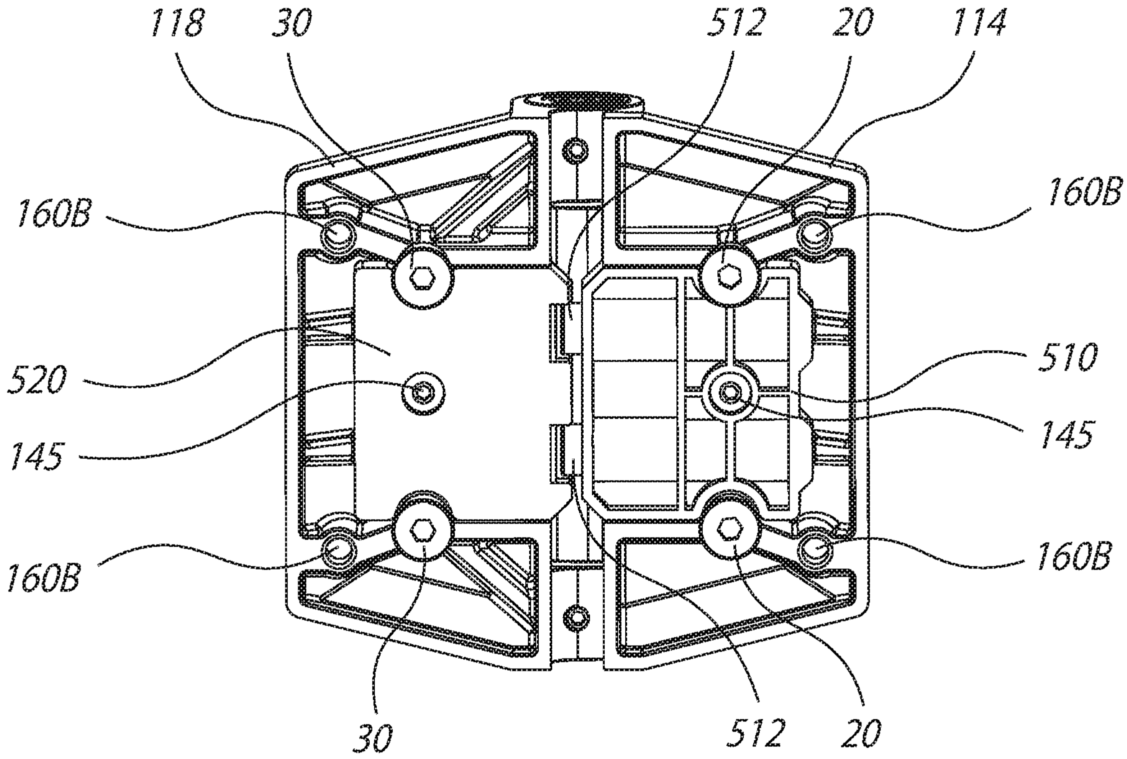
FIG. 61 is a rear view of the hinge of FIG. 59 with the rear leaf components and gaskets removed.
Figure 62:
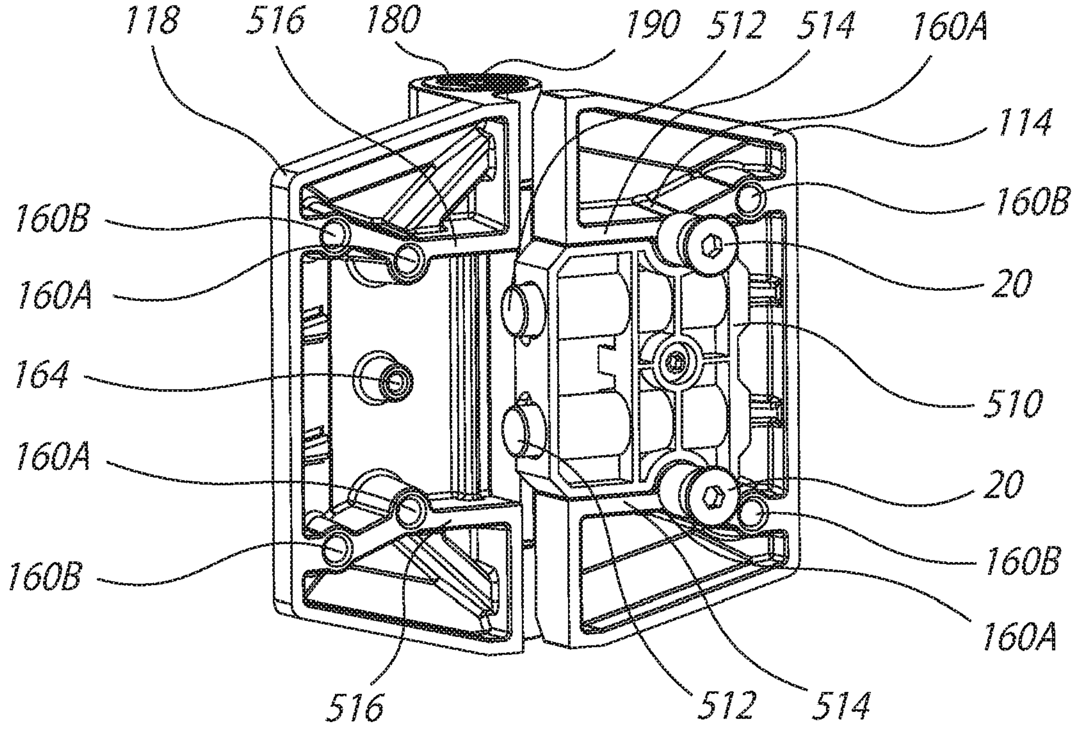
FIG. 62 is perspective view of the hinge of FIG. 61.
Figure 63:
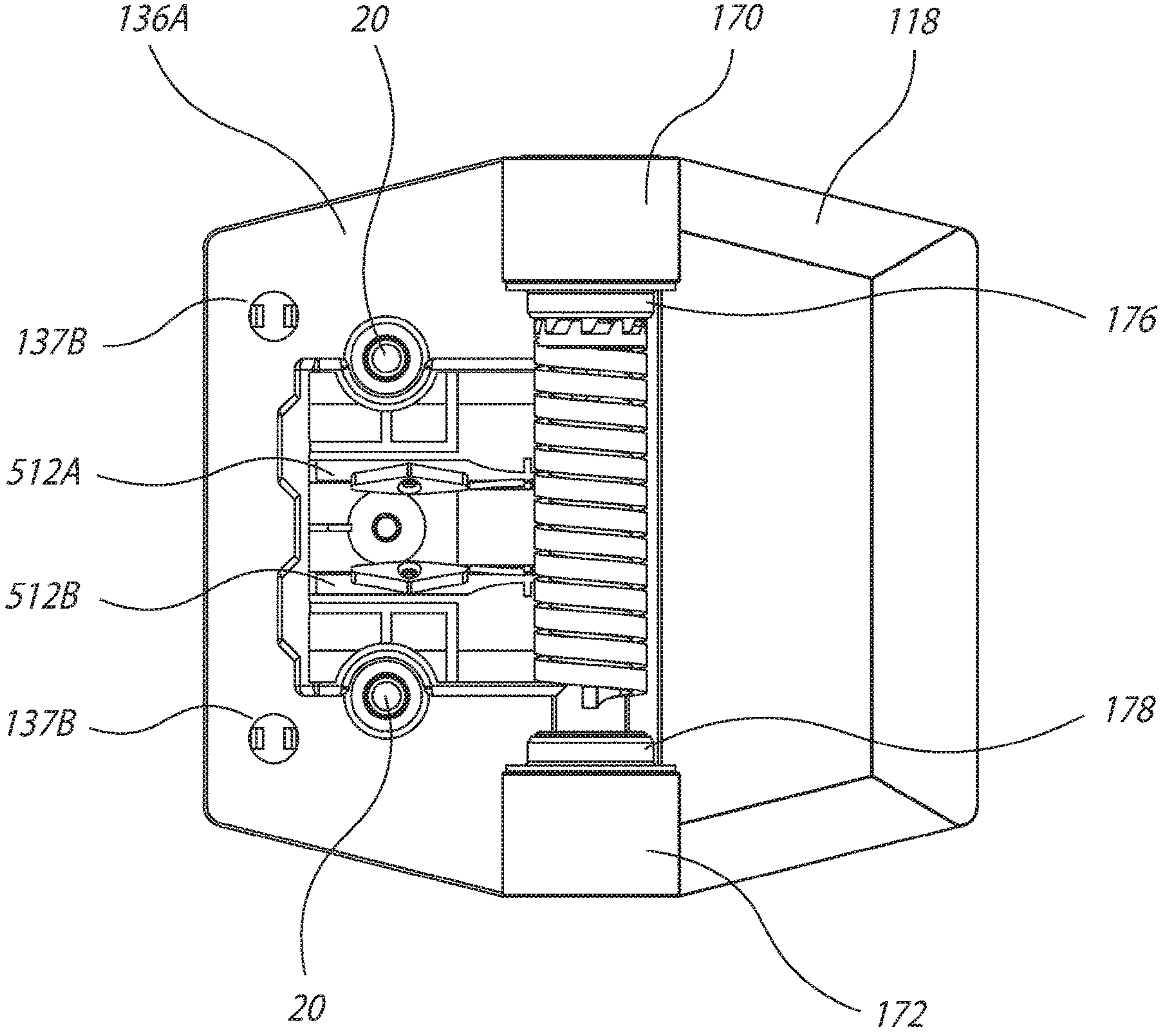
FIG. 63 is a front view of the hinge of FIG. 61 with the first front leaf component removed.
Figure 64:
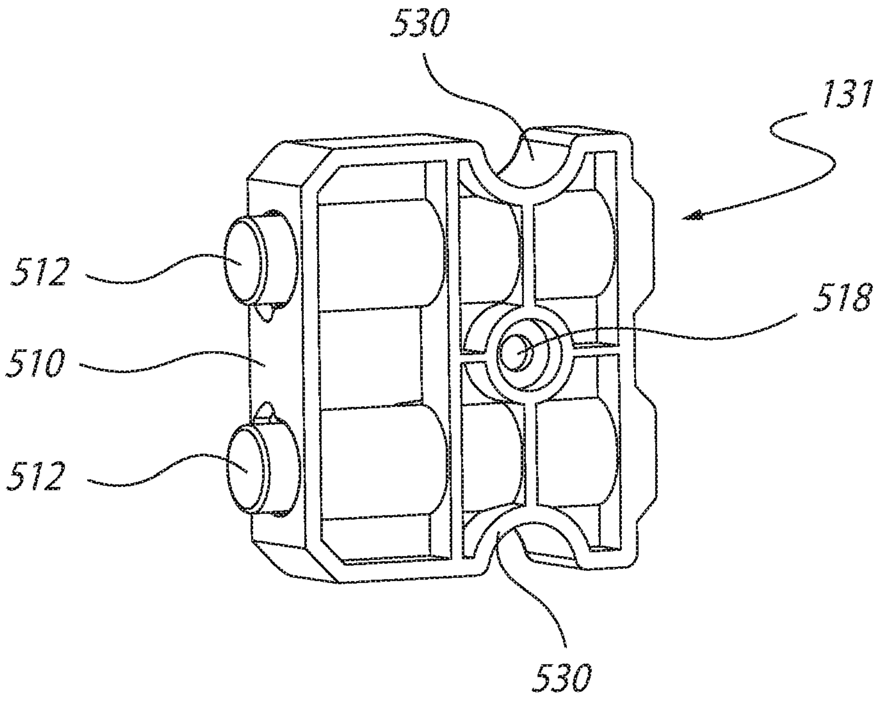
FIG. 64 is a rear perspective view of the dampener assembly.

The hinge 500 includes a first leaf assembly 110 hingedly coupled to a second leaf assembly 112 about a hinge axis 10. As shown in FIGS. 61 and 62, the hinge 500 further includes one or more dampeners 512. As shown in FIG. 63, the hinge 100 also includes a spring 174.

Referring to FIGS. 59 and 60, the first leaf assembly 110 includes a first front leaf component 114 coupled to a first rear leaf component 116 for accommodating therebetween a portion of a first panel 1010 having a first pair of holes 1015A. A first pair of fasteners 20 extend between the first front and rear leaf components 114, 116 and through the pair of holes 1015A in the first panel 1010 to clamp the portion of the first panel 1010 to the first leaf assembly 110.

The second leaf assembly 112 comprises a second front leaf component 118 coupled to second rear leaf component 120 for accommodating therebetween a portion of a second panel 1020 having a second pair of holes 1025A. A second pair of fasteners 30 extend between the second front and rear leaf components 118, 120 and through the pair of holes 1025A in the second panel 1020 to clamp the portion of the second panel 1020 to the second leaf assembly 112.

The spring 174 is operatively coupled to the first and second leaf assemblies 110, 112 to bias the first and second leaf assemblies 110, 112 to move from an open position to a closed position. The spring 174 is operatively coupled to the first and second leaf assemblies 110, 112 in the same manner as described and shown in relation to hinges 100, 400. The spring 174 is preferably a torsional spring.

The dampener 512 is configured to slow movement of the first and second leaf assemblies 110, 112 to the closed position which is under bias to move toward the closed position by the spring 174. In one form, a portion of the second hinge assembly 112 contacts the dampener 512 in an extended position when approaching the closed position, wherein the dampener 512 slowly moves to a retracted position whilst absorbing some of the momentum and force of the hinge 500 approaching the closed position. In this specific example, the longitudinal axis of the dampener 512 extends orthogonal to the hinge axis 10. In this arrangement, at least a portion of the dampener 512 protrudes outwardly from a dampener housing 510 of the first hinge assembly 110 when the hinge 500 is located in the non-closed position. When the hinge 500 approaches the closed position, the extended portion of the dampener 512 comes into contact with a portion of the second hinge assembly 112 and slowly retracts within the dampener housing 510. When the hinge 100 is moved from the closed position to an open position under an external force (i.e. a user opens a hinge gate which includes the hinge 100), a portion of the dampener body 170 extends from the cavity 320 under the bias of a spring contained within the dampener body 170.

Advantageously, the longitudinal axis of the dampener 512 is located between the hinge axis 10 and the first panel 1010. In a preferable form, the longitudinal axis of the dampener 124 is substantially equidistantly located between the hinge axis 10 and the first panel 1010. This arrangement means that unlike the soft close hinge disclosed in PCT/AU2017/050133 where the dampener is located coplanar with the panel, the dampener 512 in the current hinge 500 is located behind the panel 1010 and between the hinge axis 10 and the face of the panel 1010. As such, the hinge 500 can be installed to panels which have a pair of spaced mounting holes (see FIG. 21) without the need to either replace the panel or to arrange for a "mouse ear" profiled hole to be cut into the edge of the panel. As discussed in relation to hinge 100, this arrangement of hinge 500 is particularly useful for retrofittable installation to hinged panels.

As shown in FIGS. 61, 62, 64 and 65, the dampener 512 is part of a dampener assembly 131 including a dampener housing 510 having a cavity 550 for housing at least a portion of the dampener 512. 124 As shown in these figures, the hinge 500 may include a plurality of dampeners 512. However, it will be appreciated that depending upon the amount of bias provided by the spring 174, a single dampener 512 may be sufficient, in which case the dampener assembly 131 may be selectively installed to include a single dampener 512.

The dampener housing 510 is secured to an inner surface of the first front leaf component 114 as shown in FIGS. 61 and 62. In particular, a screw 145 is located through hole 518 which fastens the dampener assembly 131 to a threaded hole 144 provided on the inner surface of the first front hinge component 110.

Unlike the dampener housing 132 of hinges 100 and 400, the dampener housing 510 includes a recess 530 in each of the upper and lower edge surfaces. The dampener housing 510 has an upper and lower support surface which are receivable between upper and lower ribs 514 extending from an inner surface of the front leaf component 114. The upper and lower support ribs have a threaded stem 160A which threadably engage the first set of fasteners 20, wherein the upper and lower support surfaces of the dampener housing include the recess 530 to tight fittingly accommodate a portion of the respective threaded stems 160A. In particular, each recess 530 accommodates a portion of the threaded stem 160A extending from the inner surface of the first front leaf component 114. Each recess 530 accommodates approximately half of the respective threaded stem 160A which is part of a rib on the inner surface of the first front leaf component 114. This arrangement provides mechanical strength against torque applied to the dampener housing 510. The shape of each recess 530 close-fittingly receives a portion of the threaded stems 160A of the first front leaf component 114. The first pair of fasteners 20 provided in the form of a pair of threaded bolts 20 sit within the recesses of the upper and lower surfaces of the dampener housing 510 when passing through the holes 1015A of the portion of the first panel 1010. The pair of fasteners 20 threadably fasten with the threaded stems 160A to clamp the portion of the first panel 1010 between the first front leaf component 114 and the first rear leaf component 116. A portion of dampener housing 510 protrudes out of the front leaf component 114 via a gap 166.

As shown in FIGS. 64 to 67, the dampener housing 510 has front and rear surfaces defined by a plurality of ribs which sit flush against the planar surface of the first panel 1010. The plurality of ribs of the dampener housing 512 directly clamp against the first front gasket 136A, which in turn is clamped directly against the face of the first panel 1010. The front gasket 136A can be provided in the form of a soft material such as rubber, silicone, or the like which protects the panel 1010 from contacting harder surfaces of the hinge 100 which can be made from steel, particularly in applications where the panel 1010 is made of glass. The front gasket 136A includes a plurality of holes 137A for allowing the respective threaded bolts 20 to pass therethrough to clamp the front and rear leaf components 114, 116 together with the portion of the panels 1010 clamped therebetween under compression. The front gasket 136A can include a cylindrical sheath 138 extending from and surrounding the hole 137A which protects the panel 1010 from the stems 160A and bolts 20.

Figure 65:
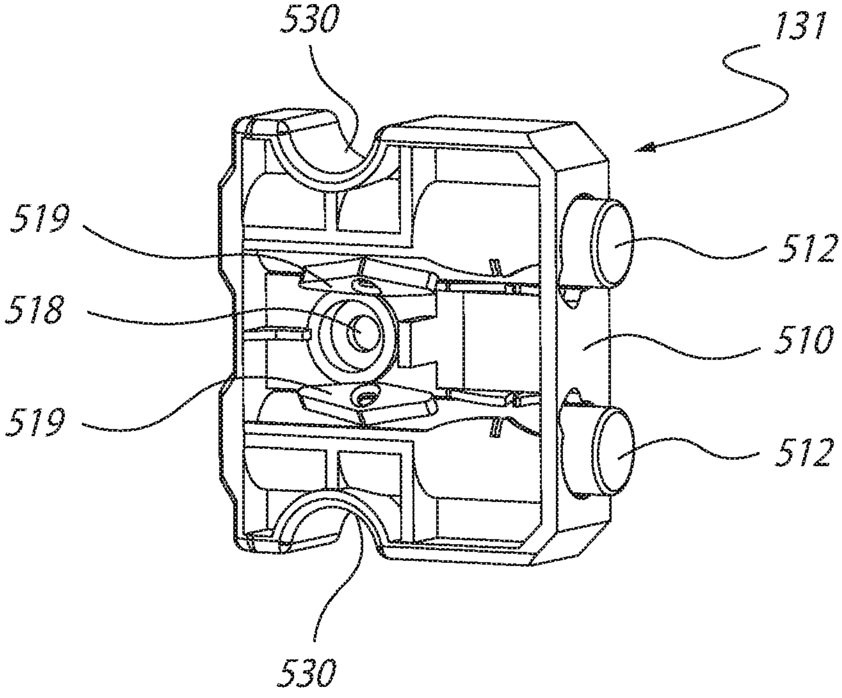
FIG. 65 is a front perspective view of the dampener assembly of FIG. 64.
Figure 66:
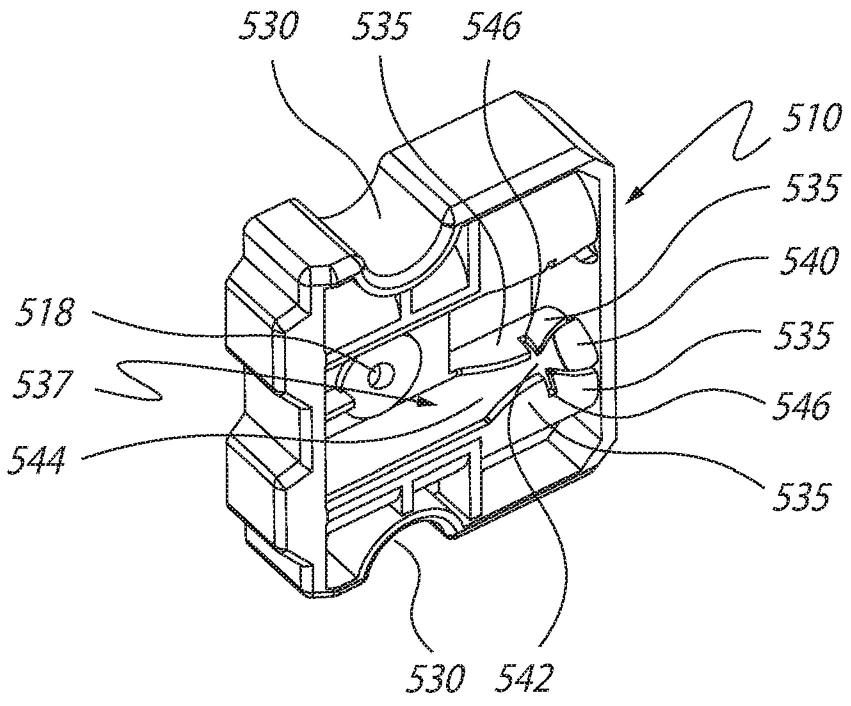
FIG. 66 is a front perspective view of the dampener housing of the dampener assembly of FIG. 64.
Figure 67:
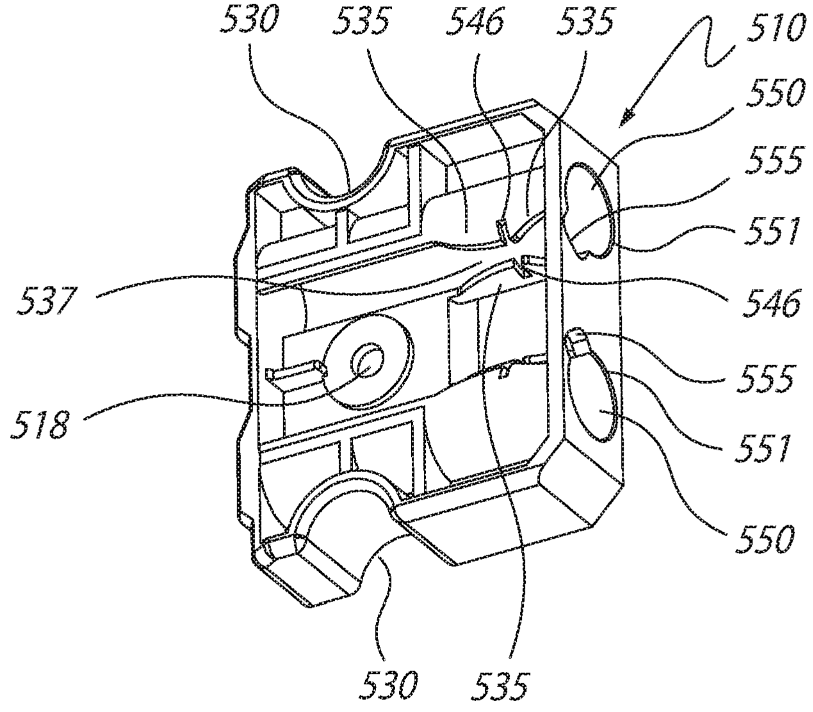
FIG. 67 is a further front perspective view of the dampener housing of the dampener assembly of FIG. 64.
Figure 68:
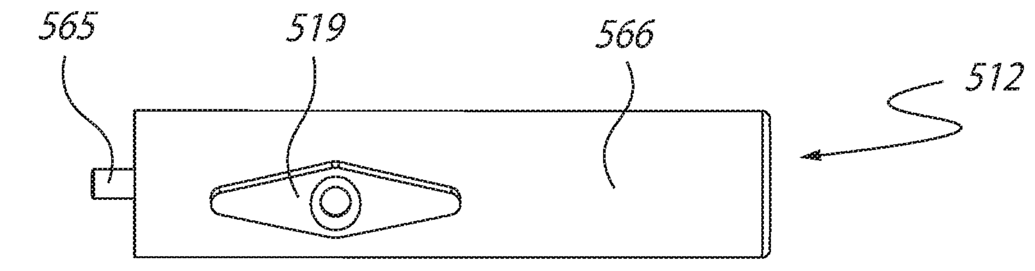
FIG. 68 is a front view of a dampener of the dampener assembly of FIG. 64.

Referring to FIG. 65, the dampener housing 131 can include one or more cavities 550 defined by one or more curved resilient walls 535. A gap 537 is located between adjacent edges of the cavity wall 535. The width of the gap 537 varies along the longitudinal axis of the cavity 550. As shown in FIG. 66, a first portion of the gap 537 proximate to the hinge axis 10 has a first widened section 540 which then narrows to a narrowed section 542 as it progresses away from the cavity opening 551 and then subsequently re-widens to a second widened section 544 as the cavity progresses toward the cavity end wall. The narrowed section 542 of the gap 537 includes a slit 546 in each curved wall 535, wherein each slit 546 extends orthogonal to the cavity axis about a portion of the perimeter of the cavity 550. As shown in FIGS. 65 and 68, the dampener 512 includes a dampener body 566 having a dampener pin 565 which is biased to extend from the dampener body 566. The external surface of the dampener body 566 has a substantially cylindrical profile with a protrusion 519 extending therefrom. The protrusion 519 has an elongated tapered profile, such as a kite-like cross-sectional profile wherein the cross-sectional profile is elongated along the dampener axis. The protrusion 519 is located closer to the end of the dampener body 566 where the pin 565 extends therefrom. When installing the hinge 500, the installer can selectively insert one of the dampeners 512 into one of the cavities 550, wherein the end having the pin 565 in initially inserted into the cavity opening 551. The cavity opening 551 has a cylindrical profile with a notch 555 to receive the protrusion 519 of the dampener body 566. The tapered leading surfaces of the protrusion 519 are received through the narrowed portion 542 of the gap 537 until the midsection of the protrusion 519 presses against both the edges of the gap 537 of the cavity walls 535 and is therefore restricted from progressing into the cavity 550. The installer can then apply a sufficient force to the dampener 512 to cause the walls of the cavity 550 to resiliently deform and widen the gap 537 to allow the midsection of the protrusion 519 to pass therethrough, wherein the dampener 512 progresses further within the cavity 550 such that the protrusion 519 is received within the second widened portion of the gap 544. After the midsection of the protrusion 519 passes through the narrowed section 542 of the gap 537 of the cavity walls 535, the walls 535 of the cavity 550 resiliently return to their original configuration such that the dampener 512 cannot fall out of the cavity 550 without a deliberate force being applied to the dampener 512 to resiliently deform the cavity walls 535. The orthogonal slits 546 in the cavity walls 535 promote the resilient deformation of the cavity walls 535 as portions of the walls 535 can move toward each other when sufficient force is applied to the dampener 512. This arrangement is highly advantageous to retain each dampener 512 within the respective cavity 550 of the dampener housing 510 as a deliberate force needs to be applied to the dampener 512 in order to cause the resilient deformation of the cavity walls 535.

Figure 69:
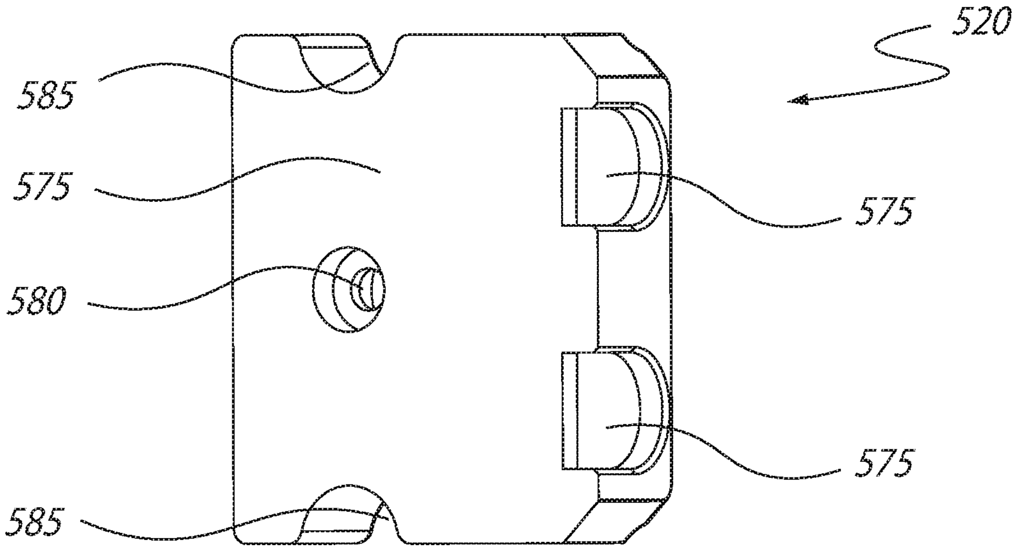
FIG. 69 is a rear perspective view of the striking component of the hinge of FIG. 59.
Figure 70:
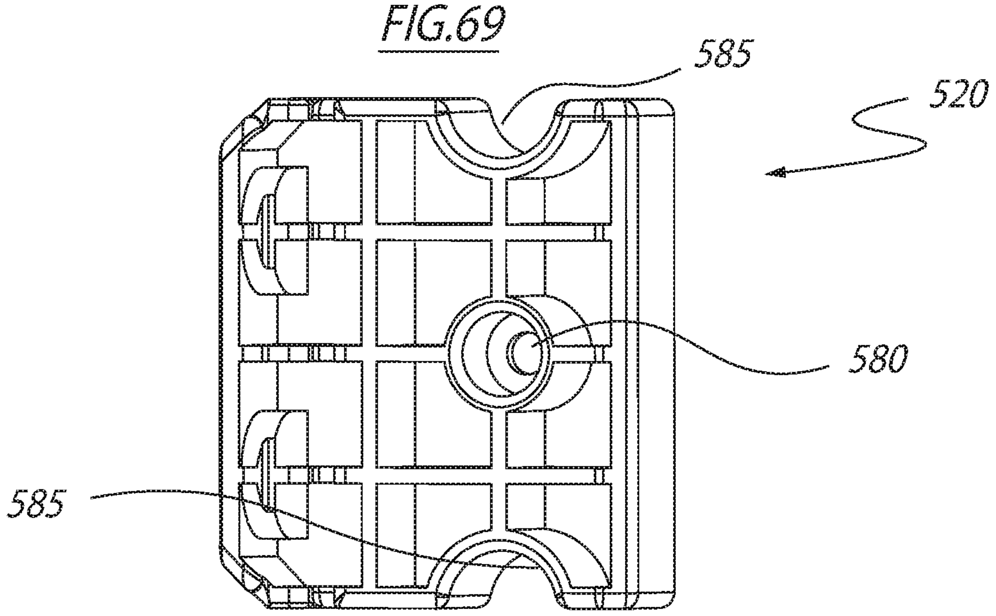
FIG. 70 is a front perspective view of the striking component of FIG. 69.

Referring to FIGS. 69 and 70, the hinge 500 further includes a striking component 520 which is secured to an inner surface of the second front hinge component 118 via a screw 145 which is located within hole 580 and threadably fastens with a threaded hole 164. The striking component 134 is located between the hinge axis 10 and second panel 1020.

The striking component 134 includes a striking surface which is located in an adjacent and opposing orientation relative to the dampener assembly 131 in the closed position. The striking surface includes one or more indents 570, wherein the end of each dampener body 270 is configured to contact a respective indent 570 when moving toward the closed position. The striking component 134 has a planar rear surface 575 which sits flush against the portion of the second panel 1020. In particular, the planar rear surface 575 of the striking component 134 directly clamped against a gasket 128 which in turn is directly clamped against the panel 1020. As mentioned above, the gasket 128 can be made from a soft material such as rubber or silicone which protects the panel 1020 from the harder surfaces of the hinge 100, but also provides a clamping surface having a high coefficient of friction which is highly advantageous for clamping the second panel 1020.

The striking component 134 has an upper and lower support surface which are received between upper and lower ribs 516 extending from an inner surface of the second front leaf component 118. The upper and lower ribs 516 have a respective threaded stem 160A which is configured to threadably engage with the second set of fasteners 30, wherein the upper and lower support surfaces of the dampener housing include a respective recess 585. Similar to the dampening housing 512, the striking component 134 includes the plurality of recesses 585 in the upper and lower edge surfaces, wherein each recess is configured to accommodate a portion of the threaded stem 160A extending from the inner surface of the second front hinge leaf component 118. A second set of fasteners 30 are received through corresponding holes 121 in the rear second leaf component 120 and threadably fasten with one of the threaded stems 160A, 160B extending from the inner surface of the second front hinge leaf component 118 to clamp the portion of the second panel 1020 between the second front and second rear leaf components 118, 120. This arrangement provides mechanical strength against torque applied to the striking component. The shape of the recesses 585 close-fittingly receive a portion of the threaded stems 160A of the second front leaf component. The first pair of fasteners 30 provided in the form of a pair of threaded bolts sit within the recesses 585 of the upper and lower surfaces of the dampener housing 510 when passing through the holes 1025A of the portion of the second panel 1020. The pair of fasteners 30 threadably fasten with the threaded stems 160A or 160B to clamp the portion of the second panel 1020 between the second front leaf component 118 and the second rear leaf component 120. A portion of the striking component 520 protrudes out of the second front leaf component 118 via a gap 168. The spacing between the protruding portions of the dampener housing 132 and the string component 134 minimises torque applied to the dampener 512 when contacting the second hinge assembly 112.

The hinge 400 also includes a pair of rear gaskets 140A, 140B. The rear hinge leaf components 116, 120 directly clamp against the rear face of the panels 1010, 1020. The rear gaskets 140A, 140B can be provided in the form of a soft material such as rubber, silicone, or the like which protects the panels 1010, 1020 from contacting harder surfaces of the hinge 400 which can be made from steel, particularly in applications where the panel 1010 is made of glass. The rear gaskets 140A, 140B includes a plurality of holes 141A, 141B for allowing the respective threaded bolts 20, 30 to pass therethrough to clamp the front and rear leaf components 114, 116, 118, 120 together with the portion of the panels 1010, 1020 clamped therebetween under compression. The rear gaskets 140A, 140B can include a cylindrical sheath 138 extending from and surrounding the hole 141A which protects the panels 1010, 1020 from the stems 160A, 160B and bolts 20, 30.

As will be appreciated from the above description of the dampening assembly 131 and the striking component 520, the dampener housing 512 and striking component 520 have a similar shape, albeit the cavities 550 not being provided in the striking component 520, such that the dampener assembly 131 and striking component 520 have substantially matching perimeter profiles. This arrangement is advantageous as portions of tooling for manufacturing the dampener housing 512 and striking component 520 can be duplicated.

The barrel and spring tensioning arrangement of hinge 500 are configured in the same manner as previously described in relation to hinge 100. Therefore, the barrel and spring tensioning arrangement of hinge 500 will now be described with reference to FIGS. 10 to 19.

Referring to FIG. 10, the first hinge leaf assembly 110 includes a plurality of knuckles 170, 172, 240 specifically top and bottom knuckles 170, 172, and the second leaf assembly includes a further knuckle, specifically an intermediate knuckle 240. The knuckles 170, 172, 240 are coaxially aligned to define a barrel 173 housing the spring 174. The first front leaf component 114 includes a body 234 having the pair of knuckles 170, 172 extending from an inner side surface. The knuckles 170, 172 have a substantially ring-like profile. The second front leaf component 118 has a body 246 having the intermediate knuckle 240 extending from an inner side surface. A pair of bushes 176, 178 can be located between the adjacent surfaces of the end and intermediate knuckles 170, 172, 240 to minimise friction between the first and second leaf assemblies 110, 112 during rotational movement.

The hinge 400 includes a top and bottom barrel cap 180, 185 to substantially enclose the barrel 173 of the hinge 100. As shown in FIG. 10, the end knuckles 170, 172 include a hole 230, 232 extending through the ring-shaped wall. The top and bottom barrel caps 180, 185 also include a hole 182, 188 in an outer neck 181 which aligns with the holes 230, 232 in the top and bottom knuckles 170, 172. Fasteners, such as grub screws 130A, 130B, can be received through the aligned holes 230, 232 in the top and bottom knuckles 170, 172 with the holes 182, 188 of the top and bottom barrel caps 180, 185 such that the top and bottom caps 180, 185 are coupled to the second hinge leaf assembly 112. Thus, the barrel caps 180, 185 do not rotate relative to the second hinge leaf assembly 112 in the event that the grub screws 130A, 130B are in place.

The top barrel cap 180 includes an outer neck 181 and an inner neck 207, wherein the inner neck 207 has a void 209 which houses a neck portion 218 of a spring tensioning component 190. The upper surface of the neck 184 includes a plurality of markings 186 indicative of the tensioning direction and tensioning gradation of the spring 174. The bottom edge of the neck 181 of the top barrel cap 180 includes a first engaging surface 202 provided in the form of a sawtooth profile.

The spring tensioning component 190 cooperates with the top barrel cap 180. The spring tensioning component 190 is located within the inner neck 207 of the top barrel cap 180. The spring tensioning component 190 has a neck 218 which extends from a shoulder 215. An upper surface of the shoulder 215 has a second engaging surface 213 which cooperatively engages with the first engaging surface 202 of the neck 181 of top barrel cap 180 to restrict rotational movement of the spring tensioning component 190 relative to the top barrel cap 180. The spring tensioning component 190 is coupled to a first end of the spring 174. In particular, the spring includes a diametrically extending tail 198 defining a first and second cavity 197, 199 with coils of the spring 174. The spring tensioning component 190 includes a pair of protrusions 220, 222 which are received within the respective first and second cavities 197, 199 of the spring 174 to enable the rotational force applied to the spring tensioning component 190 to be transferred to the spring 174 to adjust the tension of the spring 174. The spring 174 includes a further diametrically extending tail 200 received within an aperture 242 located in a wall 241 extending across the intermediate knuckle 240 of the barrel 173 which is part of the first hinge leaf assembly 110. The wall 241 extending across the lower end of the intermediate knuckle 240 includes upwardly extending protrusions 248, 250 which are received within corresponding cavities 202, 204 defined by coils of the spring and the further diametrically extending tail 200 to couple the spring 174 to the barrel 173. The upper end of the neck of the spring tensioning component 190 includes a tool hole 194 to allow an operator to apply a rotatable force to the spring tensioning component to adjust the tension of the spring. In use, a user applies a rotational force to the spring tensioning component 190 via a tool like an Allen key or the like. When a rotational force is applied, the trailing edges 214 slide over the leading edges 204 to allow the rotational movement of the spring tensioning component 190 relative to the top barrel cap 180, which in turn increases the tension of the spring 174. Each tooth of the first engaging surface 202 has a substantially vertical trailing edge 206 which cooperates with a substantially vertical leading edge 216 of a respective tooth of the second engaging surface 213. The vertical edges 206, 216 engage against each other and restrict rotational movement of the top barrel cap 180 relative to the spring tensioning cap 190 which is under bias from the spring 174. In the event that a downward force is transferred by the user along the hinge axis 10 to compress the spring 174 within the barrel 173 to disengage the first engaging surface 202 from the second engaging surface 213, the spring tension can be decreased as the spring tensioning component 190 can rotate under bias from the spring 174 relative to the top barrel cap 180.

As discussed above, each of the first and second rear leaf components 116, 120 include a plurality of holes 117, 121 to enable the hinge 400 to be mounted to panels 1010, 1020 having differently spaced holes. As such, at least some of the holes 117, 121 provided by the first and second rear leaf components 116, 120 may not be used. In one form, each unused hole may be covered with a hole cap 260. The hole cap of hinge 100 is the same as that used for hinge 500 and thus the hole cap 260 of FIGS. 22 and 23 are relevant to hinge 500. Each hole cap 260 includes a planar circular body 262, wherein a plurality of resilient legs 264 extend from the planar circular body 262 and are configured to resiliently couple within the respective unused hole.

During retrofittable installation of the hinge 500, the method initially includes decoupling another hinge coupled to the first and second panel 1010, 1020. The method next includes locating the first front leaf component 114 and first rear leaf component 116 on opposing sides of the first panel 1010 and coupling the first and front leaf components 114, 116 together to clamp about the portion of the first panel 1010 by locating the fasteners 20 to extend through the holes 1015 of the first panel 1010. The method next includes locating the second front leaf component 118 and second rear leaf component 120 on opposing sides of the second panel 1020 and coupling the second front and read leaf components 118, 120 together to clamp about the portion of the second panel 1020 by locating the second set of fasteners 30 to extend through the holes 1025 of the second panel 1020. The spring tensioning component 190 can then be adjusted accordingly to ensure that the hinge 100 returns to the closed position under appropriate bias from the spring 174 whilst being sufficient dampened by the dampening assembly 131. It will be appreciated that the order of the steps of this method can be rearranged. For example, the second hinge assembly 112 can be coupled to the second panel 1020 prior to the first hinge assembly 110 being coupled to the first panel 1010.

Figure 71:
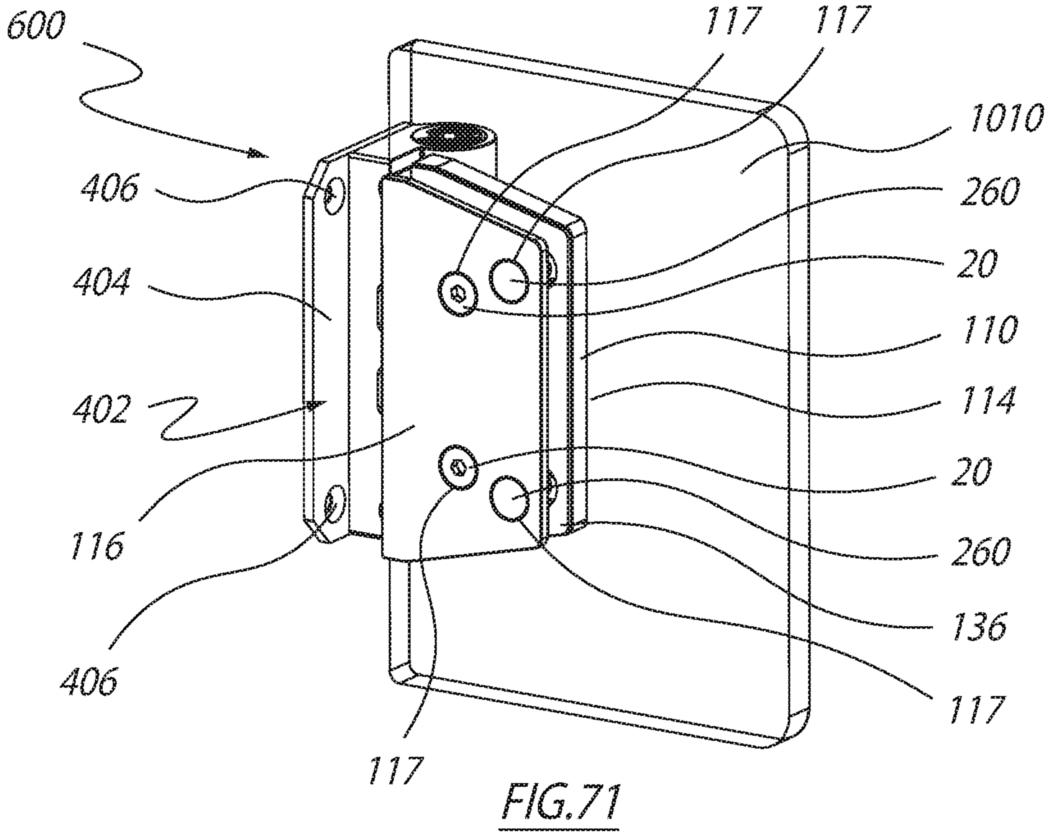
FIG. 71 is a rear perspective view of a further example of a hinge coupled to a panel.
Figure 72A:
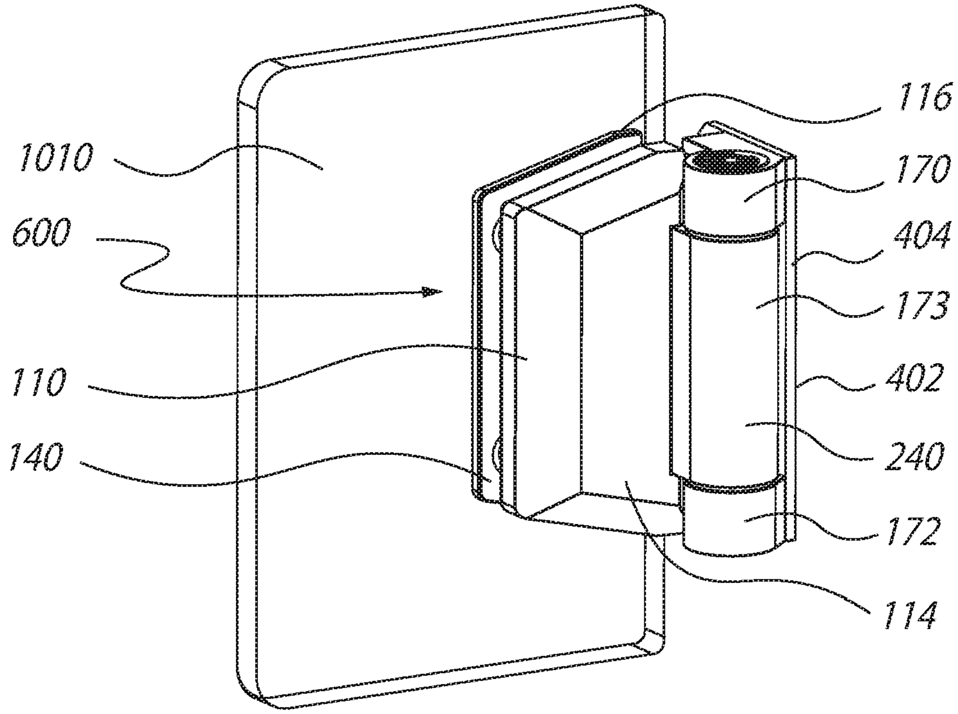
FIG. 72A is a front perspective view of the hinge of FIG. 71 coupled to the panel.
Figure 72B:
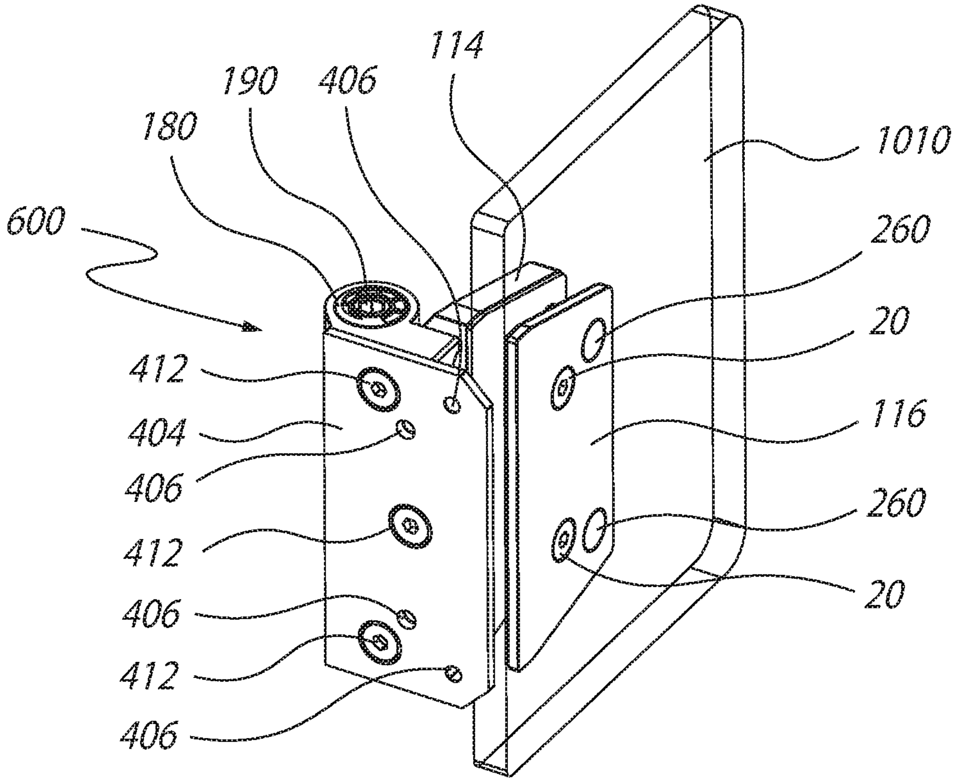
FIG. 72B is a further rear perspective view of the hinge of FIG. 71 coupled to the panel.

Referring to FIG. 71, there is shown a further example of a hinge 600. The hinge 600 includes a first leaf assembly 110, a second leaf assembly 402, a spring 174, and a dampener 512.

The first leaf assembly 110 includes a front leaf component 114 coupled to a rear leaf component 116 for accommodating therebetween a portion of a panel 1010 having a first pair of holes 1015. A first pair of fasteners 20 extend between the front and rear leaf components 114, 116 and through the pair of holes 1015 in the first panel 1010 to clamp the portion of the panel 1010 to the first leaf assembly 110.

The second leaf assembly 402 is hingedly coupled to the first leaf assembly 110 about a hinge axis 10. The second leaf assembly 402 includes a mounting component 404 to mount the second leaf assembly 402 to a mounting structure separate to the hinge 600.

Figure 73A:
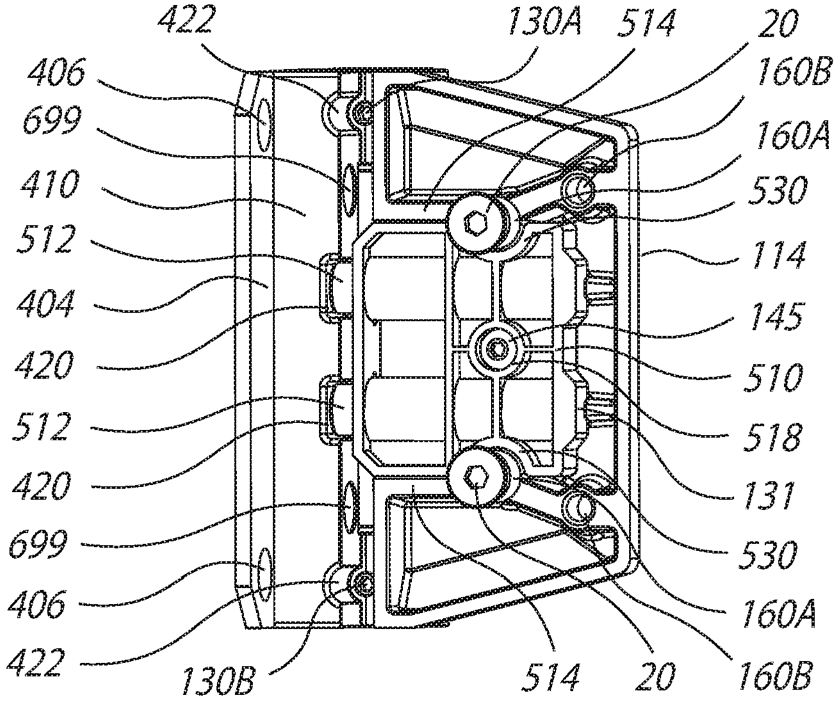
FIG. 73A is a rear perspective view of the hinge of FIG. 71 with the rear leaf component and gaskets removed.
Figure 73B:
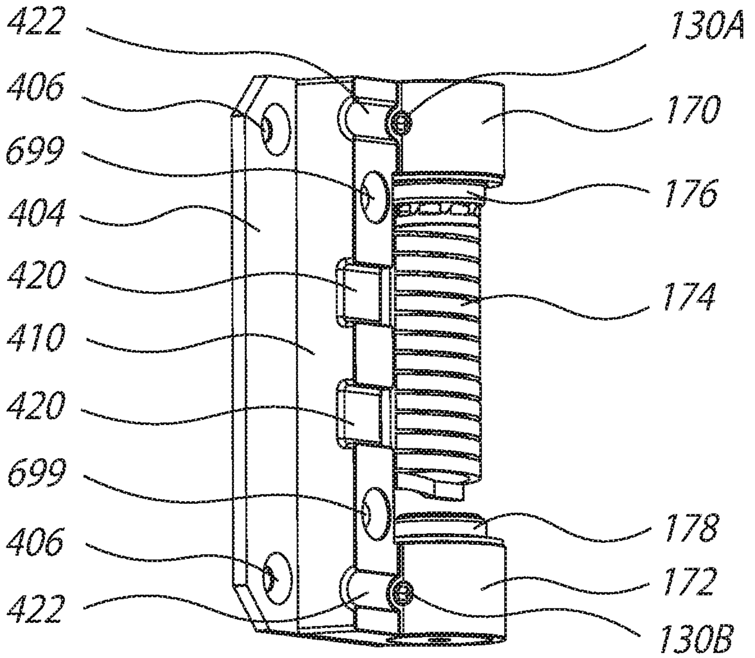
FIG. 73B is a rear perspective view of the hinge of FIG. 73A with the second hinge leaf assembly removed.
Figure 74:
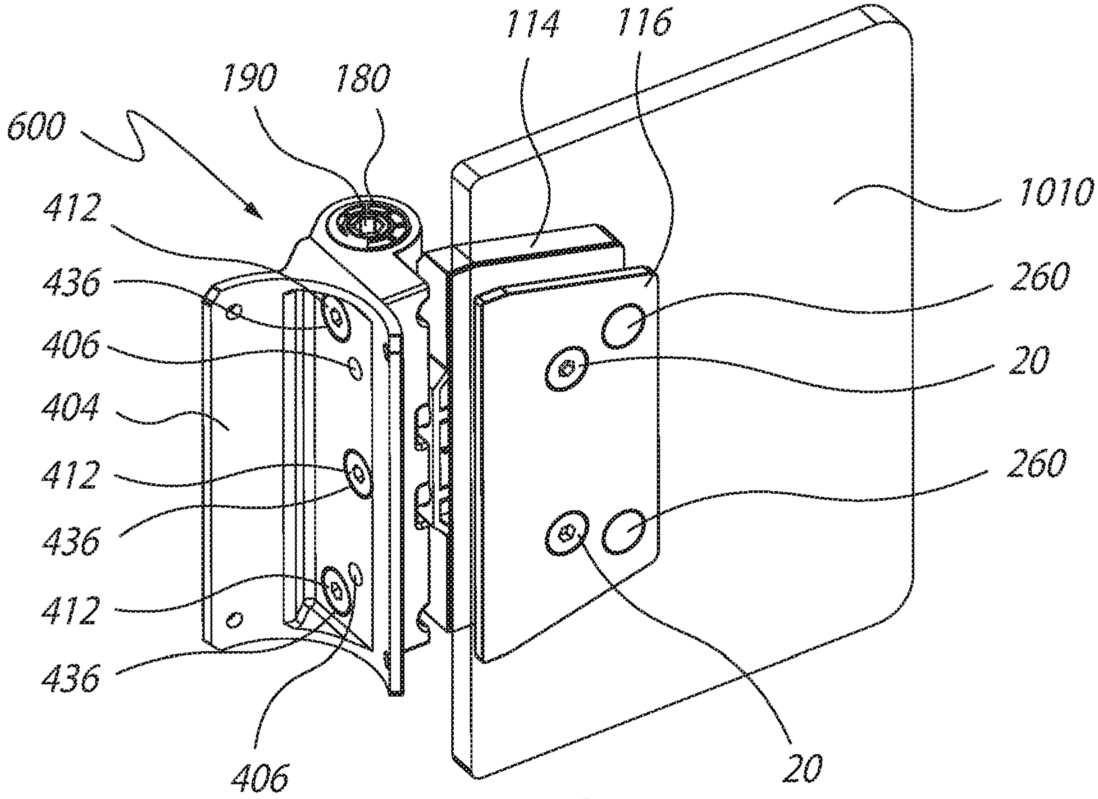
FIG. 74 is a rear perspective view of a further example of hinge including a curved mounting component coupled to a panel.
Figure 75:
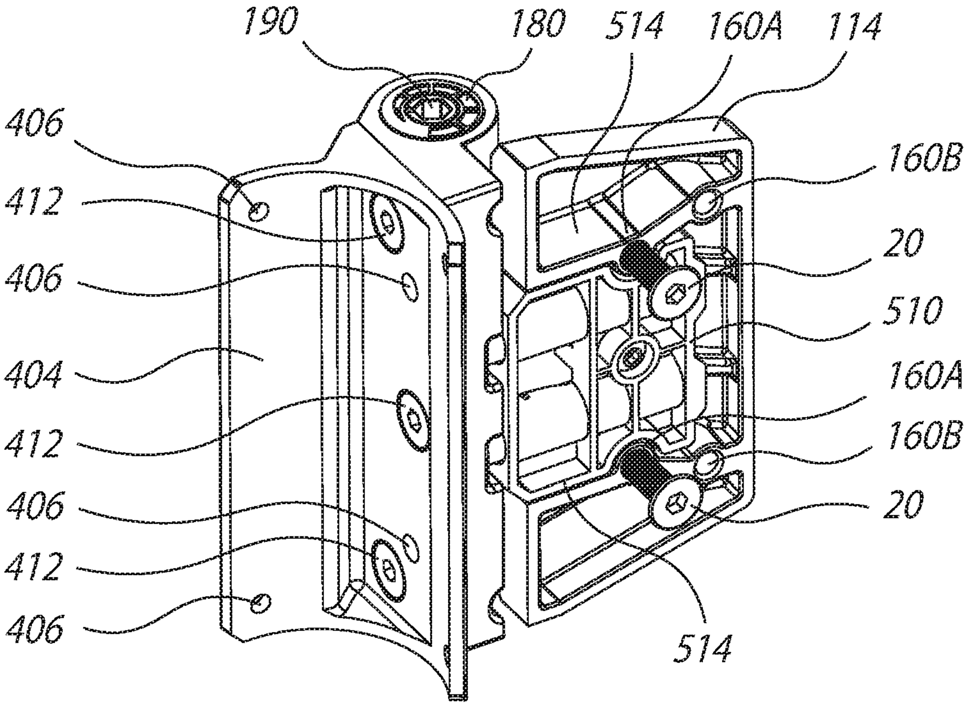
FIG. 75 is a rear perspective view of the hinge of FIG. 74 with the rear leaf component and gaskets removed.
Figure 76:
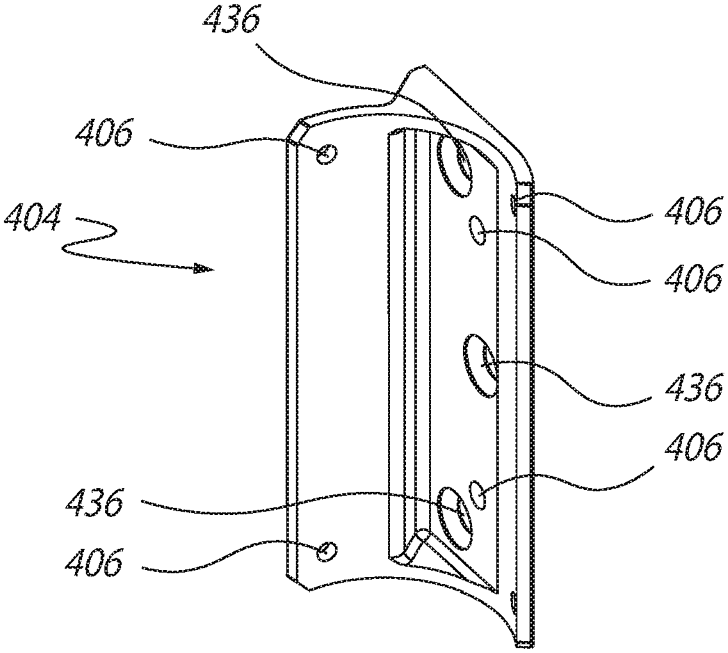
FIG. 76 is a perspective view of the curved mounting component of the hinge of FIG. 74.

The spring 174 (see FIG. 73B) is coupled to the first and second leaf assemblies 110, 402 to bias the first and second leaf assemblies 110, 402 to move from an open position to a closed position.

The dampener 512 has a longitudinal axis and is configured to slow movement of the first and second leaf assemblies 110, 402 to the closed position. Advantageously, the longitudinal axis of the dampener 512 is located between the hinge axis 10 and the first panel 1010. In a preferable form, the longitudinal axis of the dampener 124 is substantially equidistantly located between the hinge axis 10 and the first panel 1010. As such, the hinge 600 can be installed to a panel 1010 which has pairs of mounting holes 1015 rather than a "mouse ear" profiled hole. This arrangement is particularly useful for retrofittable installation of the hinge 600 to a panel 1010 where another hinge is uncoupled from the panel 1010 which does not include the "mouse ear" profiled hole.

The hinge 600 of FIG. 71 can be used for hingedly securing a glass panel 1010 to a mounting structure, such as a swimming pool fence or a wall. In other arrangements, the hinge 600 of FIG. 71 can be secured to other mounting structures such as posts or the like.

As shown in the figures, the hinge 600 can include a plurality of dampeners 512A, 512B although a single dampener 512 is possible. The dampener 512 is configured to slow movement of the first and second leaf assemblies 110, 112 to the closed position which is under bias to move toward the closed position by the spring 174. In one form, the dampener 512 in an extended position contacts a portion of the second hinge assembly 112 when approaching the closed position, wherein the dampener 512 slowly moves to a retracted position whilst absorbing some of the momentum and force of the hinge 600 whilst approaching the closed position. In this specific example, the longitudinal axis of the dampener 512 extends orthogonal to the hinge axis 10. In this arrangement, at least a portion of the dampener 512 protrudes outwardly from a dampener housing 510 of the first hinge assembly 110 when the hinge 600 is located in the non-closed position. When the hinge 600 approaches the closed position, the extended portion of the dampener 512 comes into contact with a portion of the second hinge assembly 112 and slowly retracts within the dampener housing 510. When the hinge 600 is moved to the open position under an external force (i.e. a user opens a hinge gate which includes the hinge 600), a portion of the dampener body extends from the cavity 320 under the bias of a spring contained within the dampener body.

Advantageously, the longitudinal axis of the dampener 512 is located between the hinge axis 10 and the first panel 1010. In a preferable form, the longitudinal axis of the dampener 124 is substantially equidistantly located between the hinge axis 10 and the first panel 1010. This arrangement means that unlike the soft close hinge disclosed in PCT/AU2017/050133 where the dampener is located coplanar with the panel, the dampener 512 in the current hinge 600 is located behind the panel 1010 and between the hinge axis 10 and the face of the panel 1010. As such, the hinge 600 can be installed to panels which have a pair of spaced mounting holes (see FIG. 21) without the need to either replace the panel or to arrange for a "mouse ear" profiled hole to be cut into the edge of the panel. As discussed in relation to hinge 100, this arrangement of hinge 600 is particularly useful for retrofittable installation to hinged panels.

As shown in FIGS. 61, 62, 64 and 65, the dampener 512 is part of a dampener assembly 131 including a dampener housing 510 having a cavity 550 for housing at least a portion of the dampener 512. As shown in these figures, the hinge 500 may include a plurality of dampeners 512A, 512B. However, it will be appreciated that depending upon the amount of bias provided by the spring 174, a single dampener 512 may be sufficient, in which case the dampener assembly 131 may be selectively installed to include a single dampener 512.

The dampener housing 510 is secured to an inner surface of the front leaf component 114 as shown in FIGS. 61 and 62. In particular, a screw 145 is located through hole 518 which fastens the dampener assembly 131 to a threaded hole 144 provided on the inner surface of the front hinge component 110.

The dampener housing 510 and dampener assembly 131 of hinge 600 is the same as the dampener housing 510 and dampener assembly 131 of hinge 500. As such, the dampener housing 510 and dampener assembly 131 of hinge 600 will be described with reference to FIGS. 64 to 68.

Unlike the dampener housing 132 of hinges 100 and 400, referring to FIGS. 64 to 67 the dampener housing 510 includes a recess 530 in each of the upper and lower edge surfaces. Each recess 530 accommodates a portion of a threaded stem 160A extending from the inner surface of the first front leaf components 114. Each recess 530 accommodates approximately half of the respective threaded stem 160A which is part of a rib 514 on the inner surface of the front leaf component 114. The inner surface of the first hinge leaf component 114 has upper and lower support ribs 514 which a pair of threaded stems 160A which threadably engage the first set of fasteners 20. The upper and lower support surfaces of the dampener housing 510 include the recesses 530 to tight fittingly accommodate a portion of the respective threaded stems 160A. This arrangement provides mechanical strength against torque applied to the dampener housing 510. The shape of each recess 530 close-fittingly receives a portion of the threaded stems 160A of the front leaf component 114. The first pair of fasteners 20 provided in the form of a pair of threaded bolts 20 sit within the recesses of the upper and lower surfaces of the dampener housing 510 when passing through the holes 1015A of the portion of the panel 1010. The pair of fasteners 20 threadably fasten with the threaded stems 160A to clamp the portion of the panel 1010 between the front leaf component 114 and the first rear leaf component 116. A portion of dampener housing 510 protrudes out of the front leaf component 114 via a gap 166.

The dampener housing 510 has front and rear surfaces defined by a plurality of ribs which sit flush against the planar surface of the panel 1010. The plurality of ribs of the dampener housing 512 directly clamp against the front gasket 136, which in turn is clamped directly against the face of the panel 1010. The hinge 600 also includes a rear gasket 140 which is directly clamped between the rear face of panel 1010 and the inner surface of the rear leaf component 116. The front and rear gasket 136, 140 can be provided in the form of a soft material such as rubber, silicone, or the like which protects the panel 1010 from contacting harder surfaces of the hinge 600 which can be made from steel, particularly in applications where the panel 1010 is made of glass. The hinge 600 includes a front and rear gasket 136, 140, wherein each gasket includes a plurality of holes 137A, 141A for allowing the respective threaded bolts 20 to pass therethrough to clamp the front and rear leaf components 114, 116 together with the portion of the panels 1010 clamped therebetween under compression. One of the front or rear gaskets 136, 140 can include a cylindrical sheath 138 which extends from and surrounds the hole 137, 141 which protects the panel 1010 from the threaded stem 160A, 160B or bolts 20. However, the cylindrical sheath may be separate to the front and rear gaskets 136, 140.

The dampener housing 131 can include one or more cavities 550 defined by one or more curved resilient walls 535. A gap 537 is located between adjacent edges of the cavity walls 535. The width of the gap 537 varies along the longitudinal axis of the cavity 550. A first portion of the gap 537 proximate to the hinge axis 10 has a first widened section 540 which then narrows to a narrowed section 542 as it progresses away from the cavity opening 551 and then subsequently re-widens to a second widened section 544. The narrowed section 542 of the gap 537 includes a slit 546 in each curved wall 535, wherein each slit 546 extends orthogonal to the cavity axis about a portion of the perimeter of the cavity 550. As shown in FIGS. 65 and 68, the dampener 512 includes a dampener body 566 having a dampener pin 565 which is biased to extend from the dampener body 566. The external surface of the dampener body 566 has a substantially cylindrical profile with a protrusion 519 extending therefrom. The protrusion 519 has a tapered profile such as a kite-like cross-sectional profile wherein the cross-sectional profile is elongated along the dampener axis. The protrusion 519 is located closer to the end of the dampener body 566 where the pin 565 extends therefrom. When installing the hinge 600, the installer can selectively insert one of the dampeners 512 into one of the cavities 550, wherein the end having the pin 565 in initially inserted into the cavity opening 551. The cavity opening 551 has a cylindrical profile with a notch 555 to receive the protrusion 519 of the dampener body 566. The tapered leading surfaces of the protrusion 519 are received through the narrowed portion 542 of the gap 537 until the midsection of the protrusion 519 presses against both the edges of the gap 537 of the cavity walls 535 and is therefore restricted from progressing into the cavity 550. The installer can then apply a sufficient force to the dampener 512 to cause the walls of the cavity 550 to resiliently deform and widen the gap 537 to allow the midsection of the protrusion 519 to pass therethrough, wherein the dampener 512 progresses further within the cavity 550 such that the protrusion 519 is received within the second widened portion 544 of the gap 547. After the midsection of the protrusion 519 passes through the narrowed section 542 of the gap 537 of the cavity walls 535, the walls 535 of the cavity 550 resiliently return to their original configuration such that the dampener 512 cannot fall out of the cavity 550 without a deliberate force being applied to the dampener 512 to resiliently deform the cavity walls 535. The orthogonal slits 546 in the cavity walls 535 promote the resilient deformation of the cavity walls 535 as portions of the walls 535 can move toward each other when sufficient force is applied to the dampener 512. This arrangement is highly advantageous to retain each dampener 512 within the respective cavity 550 of the dampener housing 510 as a deliberate force needs to be applied to the dampener 512 in order to cause the resilient deformation of the cavity walls 535.

The second hinge leaf assembly 402 includes a plurality of knuckles 170, 172, specifically top and bottom knuckles 170, 172 and the first leaf assembly includes a further knuckle, specifically an intermediate knuckle 240 which has a longitudinal length corresponding to the spacing between the top and bottom knuckles 170, 172 along the hinge axis. The knuckles 170, 172, 240 are coaxially aligned, wherein the intermediate knuckle 240 is located between the top and bottom end knuckles 170, 172, to define a barrel 173 housing the spring 174 and spring tensioning component 190.

The second hinge leaf assembly 402 includes an elongate body 410 which the top and bottom knuckles 170, 172 extend therefrom. The elongate body provides a striking surface which is configured to contact the dampener 124 when approaching the closed position. The striking surface includes one or more indents 420 which the one or more dampeners 124 of the dampener assembly 131 are configured to contact when moving toward the closed position.

The rear surface of the elongate body 410 has a groove 422 at the top and bottom ends thereof which align with the holes in the outer wall of the top and bottom knuckles 170, 172 to allow for an operator's tool to access and engage the grub screws 130A, 130B of the upper and lower knuckles 170, 172 due to close proximity to the longitudinal body 410. For example, a shaft of a screwdriver could be at least partially accommodated within the groove 422 to allow access to grub screw 130A, 130B.

The mounting component 404 is releasably coupled via holes 436 and fasteners 412 to a side surface of the longitudinal body 410. The hinge 600 is coupled to the mounting structure via fasteners which are received through holes 406. At least a portion of the holes 406 align with holes 699 provided in the elongate body 410, wherein the fasteners protrude through the aligned holes 699, 406. The mounting component 404 is a bracket having a planar profile to enable mounting of the hinge 600 to a planar mounting structure, such as a wall or the like. However, the mounting component 404 may be a bracket having a curved profile to enable mounting of the hinge 600 to a curved mounting structure such as a post or pole having a curved outer surface. Other shaped mounting components 404 having differently shaped mounting surfaces will also be appreciated by those skilled in the art. The mounting component includes a plurality of holes 436 to allow the mounting component 404 to be coupled to the elongate member 404 via fasteners 412 and threaded holes 432.

The barrel and spring tensioning arrangement of hinge 600 are configured in the same manner as previously described in relation to hinge 100. Therefore, the barrel and spring tensioning arrangement of hinge 600 will now be described with reference to FIGS. 10 to 19.

Referring to FIG. 10, the hinge 600 includes a top and bottom barrel cap 180, 185 to substantially enclose the barrel 173 of the hinge 600. The end knuckles 170, 172 include a hole 230, 232 extending through the ring-shaped wall. The top and bottom barrel caps 180, 185 also include a hole 182, 188 in an outer neck 181 which aligns with the holes 230, 232 in the top and bottom knuckles 170, 172. A fastener, such as a grub screw 130A, 130B, can be received through the aligned holes 230, 232 in the top and bottom knuckles 170, 172 with the holes 182, 188 top and bottom barrel caps 180, 185 such that the top and bottom caps 180, 185 are coupled to the second hinge leaf assembly 112. Thus, the barrel caps 180, 185 do not rotate relative to the second hinge leaf assembly 112 in the event that the grub screws 130A, 130B are in place.

The top barrel cap 180 includes an outer neck 181 and an inner neck 207, wherein the inner neck 207 has a void 209 which houses a neck portion 218 of a spring tensioning component 190. The upper surface of the neck 184 includes a plurality of markings 186 indicative of the tensioning direction and tensioning gradation of the spring 174. The bottom edge of the neck 181 of the top barrel cap 180 includes a first engaging surface 202 provided in the form of a sawtooth profile.

The spring tensioning component 190 cooperates with the top barrel cap 180. The spring tensioning component 190 is located within the inner neck 207 of the top barrel cap 180. The spring tensioning component 190 has a neck 218 which extends from a shoulder 215. An upper surface of the shoulder 215 has a second engaging surface 213 which cooperatively engages with the first engaging surface 202 of the neck 181 of top barrel cap 180 to restrict rotational movement of the spring tensioning component 190 relative to the top barrel cap 180. The spring tensioning component 190 is coupled to a first end of the spring 174. In particular, the spring includes a diametrically extending tail 198 defining a first and second cavity 197, 199 with coils of the spring 174. The spring tensioning component 190 includes a pair of protrusions 220, 222 which are received within the respective first and second cavities 197, 199 of the spring 174 to enable the rotational force applied to the spring tensioning component 190 to be transferred to the spring 174 to adjust the tension of the spring 174. The spring 174 includes a further diametrically extending tail 200 received within an aperture 242 located in a wall 241 extending across the intermediate knuckle 240 of the barrel 173 which is part of the first hinge leaf assembly 110. The wall 241 extending across the lower end of the intermediate knuckle 240 includes upwardly extending protrusions 248, 250 which are received within corresponding cavities 202, 204 defined by coils of the spring and the further diametrically extending tail 200 to couple the spring 174 to the barrel 173. The upper end of the neck of the spring tensioning component 190 includes a tool hole 194 to allow an operator to apply a rotatable force to the spring tensioning component to adjust the tension of the spring. In use, a user applies a rotational force to the spring tensioning component 190 via a tool like an Allen key or the like. When a rotational force is applied, the trailing edges 214 slide over the leading edges 204 to allow the rotational movement of the spring tensioning component 190 relative to the top barrel cap 180, which in turn increases the tension of the spring 174. Each tooth of the first engaging surface 202 has a substantially vertical trailing edge 206 which cooperates with a substantially vertical leading edge 216 of a respective tooth of the second engaging surface 213. The vertical edges 206, 216 engage against each other and restrict rotational movement of the top barrel cap 180 relative to the spring tensioning cap 190 which is under bias from the spring 174. In the event that a downward force is transferred by the user along the hinge axis 10 to compress the spring 174 within the barrel 173 to disengage the first engaging surface 202 from the second engaging surface 213, the spring tension can be decreased as the spring tensioning component 190 can rotate under bias from the spring 174 relative to the top barrel cap 180.

As discussed above, the rear leaf component 116 includes a plurality of pairs of holes to enable the hinge 600 to be mounted to panel 1010 having differently spaced holes. As such, at least some of the holes 117 provided by the rear leaf component 116 may not be used. In one form, each unused hole may be covered with a hole cap 260. The hole cap 260 of hinge 100 is the same as the hole cap 260 for hinge 600. Therefore, referring to FIGS. 22 and 23, each hole cap 260 includes a planar circular body 262, wherein a plurality of resilient legs 264 extend from the planar circular body 262 and are configured to resiliently couple within the respective unused hole.

During retrofittable installation of the hinge 600, the method initially includes decoupling another hinge coupled to the first and second panel 1010, 1020. The method next includes locating the second front leaf component 118 and second rear leaf component 120 on opposing sides of the second panel 1020 and coupling the second front and read leaf components 118, 120 together to clamp about the portion of the second panel 1020 by locating the second set of fasteners 30 to extend through the holes 1025 of the second panel 1020. The method next includes locating the first front leaf component 114 and first rear leaf component 116 on opposing sides of the first panel 1010 and coupling the first and front leaf components 114, 116 together to clamp about the portion of the first panel 1010 by locating the fasteners 20 to extend through the holes 1015 of the first panel 1010. The spring tensioning component 190 can then be adjusted accordingly to ensure that the hinge 100 returns to the closed position under appropriate bias from the spring 174 whilst being sufficient dampened by the dampening assembly 131.

It will be appreciated that the example hinges 100, 400, 500, 600 disclosed can be used for many applications. In particular, the hinges 100, 400 can be used for glass doors and gates. Furthermore, the hinges 100, 400 can be used as glass shower hinges. Additionally, the hinges 100, 400 can be used for traditional hinged doors for dwellings and buildings such as wooden doors and the like.

In an optional form, the first and second hinge assembly 110, 112 may each include a dampener and a striking surface. The dampener 124A of the first hinge leaf assembly 110 contacts the striking surface of the second hinge leaf assembly 112 when approaching the closed position. Furthermore, the dampener 124B may be housed within the second hinge leaf assembly 112 which contacts the striking surface of the first hinge leaf assembly 110.

Figure 77:
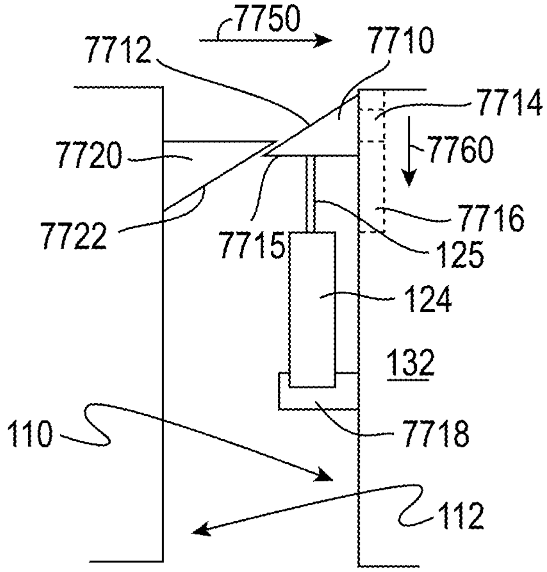
FIG. 77 is a schematic front view of a portion of another example of a hinge in an open position.
Figure 78:
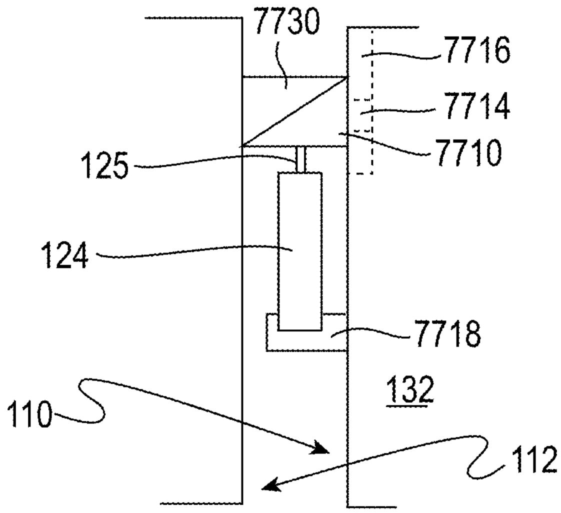
FIG. 78 is a schematic front view of the portion of the hinge shown in FIG. 77 in the closed position.

In an optional form, as shown in FIGS. 77 and 78, the dampener 124 may be arranged to be parallel with the hinge axis 10. For example, the axis of the dampener 124 can be orientated in a vertical orientation.

In one embodiment of this optional form, the striking surface can be provided in the form of a protrusion 7720 of the second hinge assembly 112 which can directly or indirectly contact the dampener 124. In one form, the protrusion 7720 at least partially protrudes within dampener housing 132 to cause the dampener 124 to dampen the speed of the hinge approaching the closed position. In another optional form, each of the first and second hinge leaf assemblies 110, 112 include a protrusion and a dampener. Thus, the protrusion of the first hinge leaf assembly 110 at least partially protrudes within the dampener housing of the second hinge leaf assembly 112 when approaching the closed position, and the protrusion of the second hinge leaf assembly 112 at least partially protrudes within the dampener housing 132 of the first hinge leaf assembly 110 when approaching the closed position.

In another embodiment of this optional form as shown in FIGS. 77 and 78, the first hinge assembly 110 includes an intermediary member 7710 movably coupled to the dampener housing 132. The intermediary member 7710 can include a foot 7714 which is retained within and travels along a vertical channel 7716 of the dampener housing. One end of the dampener 125 can contact, or come into contact, with an underside surface 7715 of the intermediary member 7710 whilst the other end of the dampener 124 is in contact with a stationary support surface 7718 of the dampener housing 132. As shown in FIG. 80, when the hinge moves toward the closed position, the protrusion 7720 of the second hinge assembly 112 contacts the intermediary member 7710 under force from the spring, wherein in response the intermediary member 7710 moves downwardly in the direction shown by arrow 7760 relative to the dampener housing 132 which in turn transmits the force to the dampener 124, causing the dampener pin of the dampener 124 to retract along the longitudinal vertical dampener axis. In this arrangement, the angular rotational force shown by arrow 7750 about the hinge axis is retransmitted in a vertical direction shown by arrow 7760 along the vertical axis of the dampener 124. The protrusion 7720 may have a ramped underside surface 7722 which directly or indirectly contacts and moves relatively to a ramped upper surface 7712 of the intermediary member 7710, thereby allowing for the angular rotational force to be redirected in a vertical direction. It will be appreciated that when the hinge is opened, the spring loaded pin of the dampener lifts the intermediary member 7710 thereby resetting the position of the intermediary member 7710 as shown in FIG. 77.

Many modifications will be apparent to those skilled in the art without departing from the scope of the present invention.

What is claimed is:

1. A hinge comprising:

a first leaf assembly including a first front leaf component coupled to a first rear leaf component for accommodating therebetween a portion of a panel having a first pair of holes, wherein a first pair of fasteners extend between the first front and rear leaf components and through the pair of holes in the panel to clamp the portion of the panel to the first leaf assembly;

a second leaf assembly, hingedly coupled to the first leaf assembly about a hinge axis, comprising a second front leaf component coupled to second rear leaf component for accommodating therebetween a portion of a second panel having a second pair of holes, wherein a second pair of fasteners extend between the second front and rear leaf components and through the pair of holes in the second panel to clamp the portion of the second panel to the second leaf assembly;

a spring coupled to the first and second leaf assemblies to bias the first and second leaf assemblies to move from an open position to a closed position; and a dampener having a longitudinal axis, and acting between the first and second leaf assemblies to slow movement of the first and second leaf assemblies to the closed position, wherein the longitudinal axis of the dampener is located between the hinge axis and the first panel.

2. The hinge according to claim 1, wherein the longitudinal axis of the dampener is substantially equidistantly located between the hinge axis and the first panel.

3. The hinge according to claim 1, further including a dampener assembly having a dampener housing with a cavity for housing at least a portion of the dampener.

4. The hinge according to claim 3, wherein the dampener has a substantially cylindrical body having a protrusion extending orthogonally therefrom relative to the longitudinal axis of the dampener, wherein at least a portion of the cavity resiliently deforms to receive the protrusion of the dampener within the cavity to at least partially house the dampener.

5. The hinge according to claim 4, wherein the cavity comprises one or more cavity walls including a pair of curved walls, wherein edges of the walls are define a gap varying in width along a longitudinal axis of the cavity, wherein the protrusion has a width that is greater that a narrowed section of the gap, wherein a sufficient force applied to the dampener causes the walls to deform in order for at least a portion of the dampener to be housed and retained within the cavity.

6. The hinge according to claim 5, wherein the gap includes a first section adjacent to the narrowed section which the protrusion is able to be received therein when progressively being inserted into the cavity, and a second section opposingly adjacent to the narrowed section which the protrusion is able to be received therein after the sufficient force is applied to the dampener to cause the resilient deformation of the walls.

7. The hinge according to claim 5, wherein the protrusion is tapered and elongated along a longitudinal axis of the dampener.

8. The hinge according to claim 3, wherein the dampener housing has an upper and lower support surface which are receivable between upper and lower ribs extending from an inner surface of the first front leaf component.

9. The hinge according to claim 8, wherein the upper and lower ribs have a threaded stem which threadably engage the first set of fasteners, wherein the upper and lower support surfaces of the dampener housing include a recess to tight fittingly accommodate a portion of the respective threaded stems.

10. The hinge according to claim 3, wherein the dampener housing has a pair of arms extending from a housing body, the pair of arms including a pair of holes for receiving therethrough the first set of fasteners.

11. The hinge according to claim 10, wherein the dampener housing includes a plurality of pairs of holes, wherein during installation of the hinge the first set of fasteners are selectively threaded through one of the pairs of holes which align with the pair of holes in the portion of the first panel.

12. The hinge according to claim 1, wherein the first and second leaf assemblies include a plurality of knuckles defining a barrel housing the spring, wherein a longitudinal axis of the spring being coaxial with the hinge axis, wherein the hinge further includes:

a barrel cap having an inner and outer neck, wherein the outer neck has a first engaging surface, the barrel cap being received within one end of the barrel; and a spring tensioning component located within a void defined by the inner neck, the spring tensioning component being coupled to a first end of the spring, the spring tensioning component having a second engaging surface which engages with the first engaging surface to restrict rotational movement of the spring tensioning component relative to the barrel cap whilst under bias of the spring;

wherein a sufficient rotational force applied to the spring tensioning component causes the rotational movement of the spring tensioning component relative to the barrel cap to increase the tension of the spring.

13. The hinge according to claim 12, wherein the first and second engaging surfaces have corresponding sawtooth profiles.

14. The hinge according to claim 12, wherein the spring includes a diametrically extending tail defining a first and second cavity with at least some of the coils of the spring, wherein the spring tensioning component includes a pair of protrusions which are received within the respective first and second cavities to enable rotational force applied to the spring tensioning component to be transferred to the spring to adjust the tension of the spring.

15. The hinge according to claim 14, wherein the spring includes a further diametrically extending tail receivable within an aperture located in a wall of the first front leaf component, the wall having protrusions extending therefrom which are receivable within cavities defined by at least some of the coils of the spring and the further diametrically extending tail to couple the spring to the first front leaf component.

16. The hinge according to claim 1, wherein the hinge further includes a striking component which is secured to an inner surface of the second front hinge component, wherein the striking component includes a striking surface which is adjacent to the dampener assembly in the closed position, wherein striking component is located between the hinge axis and the second panel.

17. The hinge according to claim 16, wherein the striking component has an upper and lower support surface which are received between upper and lower ribs extending from an inner surface of the second front leaf component.

18. The hinge according to claim 17, wherein the upper and lower ribs have a threaded stem which are configured to threadably engage with the second set of fasteners, wherein the upper and lower support surfaces of the striking component include a recess to tight fittingly accommodate a portion of the respective threaded stems.

19. The hinge according to claim 1, wherein each of the first and second rear leaf components include a plurality of pairs of holes to enable different spaced holes in the first and second panels to be secured to the hinge, wherein each unused hole of the first and second rear leaf components are covered with a hole cap.

20. The hinge according to claim 19, wherein each hole cap includes a planar circular body, wherein a plurality of resilient legs extending from the planar circular body and are configured to resiliently couple within the respective unused hole.

* * * * *